(12) United States Patent
Yabu et al.

(10) Patent No.: US 7,096,684 B2
(45) Date of Patent: Aug. 29, 2006

(54) AIR CONDITIONER

(75) Inventors: Tomohiro Yabu, Osaka (JP); Yoshinori Narikawa, Osaka (JP); Satoshi Ishida, Osaka (JP)

(73) Assignee: Daikin Industries Ltd., Osaka (JP)

( * ) Notice: Subject to any disclaimer, the term of this patent is extended or adjusted under 35 U.S.C. 154(b) by 32 days.

(21) Appl. No.: 10/523,693

(22) PCT Filed: Aug. 4, 2003

(86) PCT No.: PCT/JP03/09850

§ 371 (c)(1),
(2), (4) Date: Feb. 3, 2005

(87) PCT Pub. No.: WO2004/013541

PCT Pub. Date: Feb. 12, 2004

(65) Prior Publication Data

US 2006/0162367 A1 Jul. 27, 2006

(30) Foreign Application Priority Data

Aug. 5, 2002 (JP) .............................. 2002-227806

(51) Int. Cl.
*F25D 23/00* (2006.01)
*F25B 49/00* (2006.01)

(52) U.S. Cl. ........................... 62/271; 62/93; 62/176.1

(58) Field of Classification Search .................... 62/93, 62/94, 176.1, 271, 304, 309, 314
See application file for complete search history.

(56) References Cited

U.S. PATENT DOCUMENTS

| 5,230,466 A | * | 7/1993 | Moriya et al. | ............. 236/44 A |
| 5,426,953 A | * | 6/1995 | Meckler | ....................... 62/271 |
| 5,860,204 A | * | 1/1999 | Krengel et al. | ............... 29/460 |

FOREIGN PATENT DOCUMENTS

| JP | 5-064716 A | 3/1993 |
| JP | 7-000755 A | 1/1995 |
| JP | 9-329371 A | 12/1997 |
| JP | 10-309429 A | 11/1998 |

* cited by examiner

*Primary Examiner*—Melvin Jones
(74) *Attorney, Agent, or Firm*—Birch, Stewart, Kolasch & Birch, LLP

(57) ABSTRACT

A humidity control device includes a first adsorption element (81) and a second adsorption element (82). A first filter (301) is provided under the first adsorption element (81), while a second filter (302) is provided under the second adsorption element (82). The humidity control device performs first operation and second operation alternately. Directions of air flowing through the respective filters (301, 302) are reversed between the first operation and the second operation. Reversal of the direction of the air flowing through each filter (301, 302) removes dust and the like from each filter (301, 302).

15 Claims, 39 Drawing Sheets

⇨ first air
➡ second air

①: dehumidification
②: humidification

①: dehumidification
②: humidification

AIR CONDITIONER

TECHNICAL FIELD

The present invention relates to an air conditioner for supplying treated air into a room and the like.

BACKGROUND ART

Conventionally, a ventilation system including a generally-called total heat exchanger (503) has been known as one type of air conditioners. As shown in FIG. 39, the ventilation system includes an air supply path (501) for supplying outdoor air indoors, and an air exhaust path (502) for discharging room air outdoors. Wherein, "OA", "SA", "RA", and "EA" mean outdoor air, air (supply air) supplied indoors, room air, and air (exhaust air) discharged outdoors, respectively.

The total heat exchanger (503) includes a first passage (504) and a second passage (505), wherein the first passage (504) is arranged in the air supply path (501) and the second passage (505) is arrange in the air exhaust path (502). At each upstream side of the first passage (504) and the second passage (505), a filter (506, 507) is provide so that no dust or the like enters inside of the total heat exchanger (503).

In the above ventilation system, outdoor air sucked in the air supply path (501) passes through the first passage (504) of the total heat exchanger (503), to be supplied indoors, while room air sucked in the air exhaust path (502) passes through the second passage (505) of the total heat exchanger (503), to be discharged outdoors. In the total heat exchanger (503), heat and moisture are exchanged between the outdoor air passing through the first passage (504) and the room air passing through the second passage (505).

Further, a humidity control device as disclosed in, for example, Japanese Patent Application Laid Open Publication No. 9-329371A has been known as another air conditioner. This humidity control device, which includes an adsorption element for adsorbing moisture in air, dehumidifies supply air for ventilation by the adsorption element, to supply the dehumidified air indoors, and regenerates the adsorption element by exhaust air for ventilation.

The present inventors applied the above ventilation system with the total heat exchanger (503), to devise a ventilation system with an adsorption element having the following humidity control and cooling passages, in lieu to the total heat exchanger (503) in the aforementioned ventilation system. Namely, the humidity control passage for allowing the adsorption element to adsorb moisture in the air flowing therein and the cooling passage for cooling the adsorption element warmed by adsorption heat by the air flowing therein are provided at the air supply path (501) and at the air exhaust path (502), respectively. With this construction, outdoor air is dehumidified and supplied indoors and the adsorption element is cooled by utilizing the room air to be discharged outdoors.

Means of Solving the Problems

However, direct application to the conventional construction involves the following problems.

Conventionally, the air in each air path flows in one direction, and therefore, considerable amounts of dust and the like are deposited on the filters after long-term operation, thereby inviting performance degradation and lifetime shortening of the total heat exchanger and the adsorption element. For example, in a ventilation system installed in a building facing a road, outdoor air includes a large amount of dust and much dust is deposited on filters on the outdoor side. This is the significant problem.

To tackling this problem, periodic filter cleaning is considered for preventing performance degradation and lifetime shortening of the total heat exchanger and the adsorption element. However, the device for which periodic cleaning is inevitable involves a considerable burden on maintenance and may invite increase in maintenance cost.

In an air conditioner including an air conditioning element such as a total heat exchanger, an adsorption element, and the like, the present invention has been made in view of the above problems and has its object of preventing performance degradation and extending lifetime of the air conditioning element while reducing a burden on maintenance and maintenance const.

SUMMARY OF THE INVENTION

In the present invention, a filter is provided for an air conditioning element of an air conditioner and the direction of air flowing in paths are reversed between in normal operation and in cleaning operation, so that the filter captures dust during the normal operation and dust and the like adhered to the filter is removed automatically by air during the cleaning operation.

The first invention in the above invention is directed to an air conditioner, comprising: air paths (53, 54, . . . ) that communicate with either or both of a first space (311) and a second space (312); an air conditioning element (81, 82, . . . ) for adjusting at least one of temperature and humidity of air flowing in the air paths (53, 54, . . . ) toward the second space (312); a filter (301, 302, . . . ) for capturing a foreign matter in air flowing in the air paths (53, 54, . . . ) from the first space (311) toward the air conditioning element (81, 82, . . . ); and air conveying means (95, 96) that conveys the air in the air paths (53, 54, . . . ), wherein the air of which at least one of temperature and humidity is adjusted is supplied to the second space (312). In the air conditioner, normal operation in which air passes in the air paths (53, 54, . . . ) through the filter (301, 302, . . . ), and then, through the air conditioning element (81, 82, . . . ), to be supplied to the second space (312); and cleaning operation in which air passes in the air paths (53, 54, . . . ) through the air conditioning element (81, 82, . . . ), and then, through the filter (301, 302, . . . ), to be discharged to the first space (311) are performable.

In the air conditioner of the first invention, during the normal operation, the air taken in from the first space (311) passes through the filter (301, 302, . . . ), and then, flows into the air conditioning element (82, 82, . . . ) in the air paths (53, 54, . . . ). When the air passes through the filter (301, 302, . . . ), dust and the like included in the air are captured at the filter (301, 302, . . . ). In the normal operation, dust and the like removed from the air are gradually deposited on the filter (301, 302, . . . ). The air cleaned by the filter (301, 302, . . . ) is subjected to treatment in the air conditioning element (81, 82, . . . ) so that either or both the temperature and the humidity thereof is/are adjusted. The air that has been subjected to the treatment in the air conditioning element (81, 82, . . . ) is supplied to the second space (312).

On the other hand, during the cleaning operation in the above air conditioner, the air taken in from the second space (312) passes through the air conditioning element (81, 82, . . . ), and then, through the filter (301, 302, . . . ). In other words, the direction of the air flowing through the filter (301, 302, . . . ) is reversed between the cleaning operation and the normal operation. In this connection, dust and the like deposited on the filter in the normal operation are removed from the filter (301, 302, . . . ) by the air flow in the cleaning operation, and then, are discharged to the first space (311). In this way, dust and the like deposited on the filter (301, 302, . . . ) in the normal operation are removed automatically to clean the filter (301, 302, . . . ) in the cleaning operation.

The second invention is directed to the air conditioner of the first invention, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), and adsorption operation as the normal operation, in which the air from the first space (311) flows through the filter (301, 302) and the adsorption element (81, 82) in this order to allow the adsorption element (81, 82) to adsorb moisture in the air, and then, is supplied to the second space (312); and regeneration operation as the cleaning operation in which the air from the second space (312) flows through the adsorption element (81, 82) and the filter (301, 302) in this order to regenerate the adsorption element (81, 82) by the air, and then, is discharged to the first space (311) are performed selectively.

In the air conditioner of the second invention, the air from the first space (311) passes through the filter (301, 302) and the adsorption element (81, 82) in this order during the adsorption operation. This air is cleaned by the filter (301, 302), is dehumidified by the adsorption element (81, 82), and then, is supplied to the second space. In this treatment, dust and the like removed from the air is deposited on the filter (301, 302). On the other hand, during the regeneration operation, the air from the second space (312) passes through the adsorption element (81, 82) and the filter (301, 302) in this order. This air regenerates the adsorption element (81, 82), removes dust and the like from the filter (301, 302), and then, is discharged to the first space (311). Namely, dust and the like deposited on the filter (301, 302) in the adsorption operation are removed automatically to clean the filter (301, 302) in the regeneration operation.

The third invention is directed to the air conditioner of the first invention, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), a first space side filter (301a, 302a) as the filter is provided on the first space (311) side of the adsorption element (81, 82) in the air paths (53 to 56), a second space side filter (301b, 302b) is provided on the second space (312) side of the adsorption element (81, 82) in the air paths (53 to 56), and adsorption operation as the normal operation in which the air from the first space (311) flows through the first space side filter (301a, 302a), the adsorption element (81, 82), and the second space side filter (301b, 302b) in this order to allow the adsorption element (81, 82) to adsorb moisture in the air, and then, is supplied to the second space (312); and regeneration operation as the cleaning operation in which the air from the second space (312) flows through the second space side filter (301b, 302b), the adsorption element (81, 82), and the first space side filter (301a, 302a) in this order to regenerate the adsorption element (81, 82) by the air, and then, is discharged to the first space (311) are performed selectively.

In the air conditioner of the third invention, the filter is provided on each side of the adsorption element (81, 82), thereby effectively preventing performance degradation of the adsorption element (81, 82). In the adsorption operation, dust and the like are deposited on the first space side filter (301a, 302a), while dust on the second space side filter (301b, 302b) is removed automatically to clean the second space side filter (301b, 302b). On the other hand, in the regeneration operation, dust and the like are deposited on the second space side filter (301b, 302b), while dust on the first space side filter (301a, 302a) is removed automatically to clean the first space side filter (301a, 302a).

The air conditioner of the fourth invention is directed to the second or third invention, wherein the first space serves as an outdoor space (311), while the second space serves as an indoor space (312), and the adsorption operation dehumidifies the indoor space (312) by.

In the air conditioner of the fourth invention, dehumidification is performed for the indoor space (312).

The air conditioner of the fifth invention is directed to the first invention, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), and regeneration operation as the normal operation in which the air from the first space (311) flows through the filter (301, 302) and the adsorption element (81, 82) in this order to regenerate the adsorption element (81, 82) by the air, and then, is supplied to the second space (312); and adsorption operation as the cleaning operation in which the air from the second space (312) flows through the adsorption element (81, 82) and the filter (301, 302) in this order to allow the adsorption element (81, 82) to adsorb moisture in the air, and then is discharged to the first space (311) are performed selectively.

In the air conditioner of the fifth invention, the air from the first space (311) passes through the filter (301, 302) and the adsorption element (81, 82) in this order during the regeneration operation. This air is cleaned by the filter (301, 302), regenerates the adsorption element (81, 82), and then, is supplied to the second space (312). During this treatment, dust and the like in the air is captured by and deposited on the filter (301, 302). On the other hand, during the adsorption operation, the air from the second space (312) passes through the adsorption element (81, 82) and the filter (301, 302) in this order. This air is dehumidified by the adsorption element (81, 82), removes dust and the like from the filter (301, 302), and then, is discharged to the first space (311). Namely, dust and the like deposited on the filter (301, 302) in the regeneration operation are removed automatically to clean the filter (301, 302) in the adsorption operation.

The air conditioner of the sixth invention is directed to the first invention, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), a first space side filter (301a, 302a) as the filter is provided on the first space (311) side of the adsorption element (81, 82) in the air paths (53 to 56), a second space side filter (301b, 302b) is provided on the second space (312) side of the adsorption element (81, 82) in the air paths (56 to 56), and regeneration operation as the normal operation in which the air from the first space (311) flows through the first space side filter (301b, 302b), the adsorption element (81, 82), and the second space side filter (301a, 302a) in this order to regenerate the adsorption element (81, 82) by the air, and then, is supplied to the second space (312); and adsorption operation as the cleaning operation in which the air from the second space (312) flows through the second space side filter (301a, 302a), the adsorption element (81, 82), and the first space side filter (301b, 302b) in this order to allow the adsorption element (81, 82) to adsorb moisture in the air, and then, is discharged to the first space (311) are performed selectively.

In the air conditioner of the sixth invention, the filter is provided on each side of the adsorption element (81, 82), thereby effectively preventing quality degradation of the adsorption element (81, 82). In the regeneration operation, dust and the like are deposited on the first space side filter (301a, 302a), while dust on the second space side filter (301b, 302b) is removed automatically to clean the second space side filter (301b, 302b). On the other hand, in the adsorption operation, dust and the like are deposited on the second space side filter (301b, 302b), while the dust on the first space side filter (301a, 302a) is removed automatically to clean the first space side filter (301a, 302a).

The air conditioner of the seventh invention is directed to the fifth or sixth invention, wherein the first space serves as an outdoor space (311), while the second space serves as an indoor space (312), and the regeneration operation humidifies the indoor space (312).

In the air conditioner of the seventh invention, humidification is performed for the indoor space (312).

The air conditioner of the eighth invention is directed to the first invention, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), and first adsorption operation as the normal operation in which the air from the first space (311) flows through the filter (301, 302) and the adsorption element (81, 82) in this order to allow the adsorption element (81, 82) to adsorb moisture in the air, and then, is supplied to the second space (312); first regeneration operation as the cleaning operation in which the air from the second space (312) flows through the adsorption element (81, 82) and the filter (301, 302) in this order to regenerate the adsorption element (81, 82) by the air, and then is discharged to the first space (311); second adsorption operation as the cleaning operation in which the air from the second space (312) flows through the adsorption element (81, 82) and the filter (301, 302) in this order to allow the adsorption element (81, 82) to adsorb moisture in the air, and then is discharged to the first space (311); and second regeneration operation as the normal operation in which the air from the first space (311) flows through the filter (301, 302) and the adsorption element (81, 82) in this order to regenerate the adsorption element (81, 82) by the air, and then, is supplied to the second space (312) are performed selectively.

In the air conditioner of the eighth invention, during the first adsorption operation, the air from the first space (311) passes through the filter (301, 302) and the adsorption element (81, 82) in this order. This air is cleaned by the filter (301, 302), is dehumidified by the adsorption element (81, 82), and then, is supplied to the second space (312). During the first regeneration operation, the air from the second space (312) passes through the adsorption element (81, 82) and the filter (301, 302) in this order. This air regenerates the adsorption element (81, 82), removes dust and the like on the filter (301, 302), and then, is discharge to the first space (311). In this way, dust and the like deposited on the filter (301, 302) in the first adsorption operation are removed automatically to clean the filter (301, 302) in the first regeneration operation.

Also, in the air conditioner in this invention, during the second regeneration operation, the air from the first space (311) passes through the filter (301, 302) and the adsorption element (81, 82) in this order. This air is cleaned by the filter (301, 302), regenerates the adsorption element (81, 82), and then, is supplied to the second space (312). During the second adsorption operation, the air from the second space (312) passes through the adsorption element (81, 82) and the filter (301, 302) in this order. This air is dehumidified by the adsorption element (81, 82), removes dust and the like from the filter (301, 302), and then, is discharged to the first space (311). In this way, dust and the like deposited on the filter (301, 302) in the second regeneration operation are removed automatically to clean the filter (301, 302) in the second adsorption operation.

The air conditioner of the ninth invention is directed to the first invention, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), a first space side filter (301a, 302a) as the filter is provided on the first space (311) side of the adsorption element (81, 82) in the air paths (53 to 56), a second space side filter (301b, 302b) is provided on the second space (312) side of the adsorption element (81, 82) in the air paths (53 to 56), and first adsorption operation as the normal operation in which the air from the first space (311) flows through the first space side filter (301a, 302a), the adsorption element (81, 82), and the second space side filter (301b, 302b) in this order to allow the adsorption element (81, 82) to adsorb moisture in the air, and then, is supplied to the second space (312); first regeneration operation as the cleaning operation, in which the air from the second space (312) flows through the second space side filter (301b, 302b), the adsorption element (81, 82), and the first space side filter (301a, 302a) in this order to regenerate the adsorption element (81, 82) by the air, and then is supplied to the first space (311); second adsorption operation as the cleaning operation in which the air from the second space (312) flows through the second space side filter (301b, 302b), the adsorption element (81, 82), and the first space side filter (301a, 302a) in this order to allow the adsorption element (81, 82) to adsorb moisture in the air, and then is supplied to the first space (311); and second regeneration operation as the normal operation in which the air from the first space (311) flows through the first space side filter (301a, 302a), the adsorption element (81, 82), and the second space side filter (301b, 302b) in this order to regenerate the adsorption element (81, 82) by the air, and then, is supplied to the second space (312) are performed selectively.

In the air conditioner of the ninth invention, the filter is provided on each side of the adsorption element (81, 82), thereby effectively preventing performance degradation of the adsorption element (81, 82). In the first adsorption operation and the second regeneration operation, dust and the like are deposited on the first space side filter (301a, 302a), while dust and the like on the second space side filter (301b, 302b) are removed automatically to clean the second space side filter (301b, 302b). On the other hand, in the first regeneration operation and the second adsorption operation, dust and the like are deposited on the second space side filter (301b, 302b), while dust on the first space side filter (301a, 302a) is removed automatically to clean the first space side filter (301a, 302a).

The air conditioner of the tenth invention is directed to the eight or ninth invention, wherein the first space serves as an outdoor space (311), while the second space serves as an indoor space (312), and the first adsorption operation dehumidifies the indoor space (312), while the second regeneration operation humidifies the indoor space (312).

In the air conditioner of the tenth invention, dehumidification and humidification are performed for the indoor space (312).

The air conditioner of the eleventh invention is directed to any one of the second, third, fifth, sixth, eighth, and ninth invention, wherein the first adsorption element (81) and the first filter (301) are provided in the first air path (53, 54), while the second adsorption element (82) and the second filter (302) are provided in the second air path (55, 56), and first operation in which the adsorption operation for the first adsorption element (81) and the regeneration operation for the second adsorption element (82) are performed simultaneously; and second operation in which the regeneration operation for the first adsorption element (81) and the adsorption operation for the second adsorption element (82) are performed simultaneously are performed alternately.

In the air conditioner of the eleventh invention, the first operation and the second operation are performed alternately, which is generally called batch operation. Whereby, dehumidification or humidification can be performed continuously.

The air conditioner of the twelfth invention is directed to the first invention, wherein air flows from the first space (311) to the second space (312) in the first air path (251), while air flows from the second space (312) to the first space (311) in the second air path (252), a rotating rotary adsorption element (253) that has an adsorbent and is arranged so as to cross the first air path (251) and the second air path (252) is provided as the air conditioning element, a rotary filter (254) for rotating integrally with the rotary adsorption element (253) which is arranged on the first space (311) side of the rotary adsorption element (253) so as to cross the first air path (251) and the second air path (252) is provided as the filter, and operation in which air flows through the rotary filter (254) and the rotary adsorption element (253) in this order in the first air path (251) to allow the rotary adsorption element (253) to adsorb moisture in the air, and then, is supplied to the second space (312) is performed as the normal operation, and simultaneously therewith, operation, in which air flows through the rotary adsorption element (253) and the rotary filter (254) in this order in the second air path (252) to regenerate the rotary adsorption element (253) by the air, and then, is discharged to the first space (311), is performed as the cleaning operation.

In the air conditioner of the twelfth invention, the air from the first space (311) flows in the first air path (251) through the rotary filter (254) and the rotary adsorption element (253) in this order in the first air path (251) to allow the rotary filter to capture dust and the like in the air and to allow the rotary adsorption element (253) to adsorb moisture in the air. On the other hand, in the second air path (312), the air from the second space (312) flows through the rotary adsorption element (253) and the rotary filter (254) in this order to perform regeneration of the rotary adsorption element (253) and to perform automatic removal of dust from the rotary filter (254) for cleaning the rotary filter (254).

The air conditioner of the thirteenth invention is directed to the first invention, wherein air flows from the second space (312) to the first space (311) in the first air path (251), while air flows from the first space (311) to the second space (312) in the second air path (252), a rotating rotary adsorption element (253) that has an adsorbent and is arranged so as to cross the first air path (251) and the second air path (252) is provided as the air conditioning element, a rotary filter (254) for rotating integrally with the rotary adsorption element (253) which is arranged on the first space (311) side of the rotary adsorption element (253) so as to cross the first air path (251) and the second air path (252) is provided as the filter, and operation in which air flows through the rotary adsorption element (253) and the rotary filter (254) in this order in the first air path (251) to allow the rotary adsorption element (253) to adsorb moisture in the air, and then, is discharged to the first space (311), is performed as the normal operation, and simultaneously therewith, operation in which air flows through the rotary filter (254) and the rotary adsorption element (253) in this order to in the second air path (252) regenerate the rotary adsorption element (253) by the air, and then, is supplied to the second space (312) is performed as the cleaning operation.

In the air conditioner of the thirteenth invention, the air from the first space (311) flows in the second air path (252) through the rotary filter (254) and the rotary adsorption element (253) in this order to allow the rotary filter (254) to capture dust and the like in the air and to allow the rotary adsorption element (253) to be regenerated. On the other hand, in the first air path (251), the air from the second space (312) flows through the rotary adsorption element (253) and the rotary filter (254) in this order to perform adsorption by the rotary adsorption element (253) and to perform automatic removal of dust from the rotary filter (254) for cleaning the rotary filter (254).

The air conditioner of the fourteenth invention is directed to the twelfth or thirteenth invention, wherein the first space serves as an outdoor space (311), while the second space serves as an indoor space (312).

In the air conditioner of the fourteenth invention, dehumidification or humidification is performed for the indoor space (312) continuously.

The air conditioner of the fifteenth invention is directed to the first invention, wherein air flows from the second space (312) to the first space (311) in the first air path (361), while air flows from the first space (311) to the second space (312) in the second air path, and a total heat exchanger (363) for exchanging heat and moisture between the air flowing in the first air path (251) and the air flowing in the second air path (252) is provided as the air conditioning element.

In the air conditioner of the fifteenth invention, the total heat exchanger (363) is provided as the air condoning element. The air flowing in the first air path (251) and the air flowing in the second air path (252) are introduced to the total heat exchanger (363). The air flowing in the first air path (251) is cleaned when passing through the filter (366), and then, flows into the total heat exchanger (363). The heat exchanger (363) performs exchange between heat and moisture for the two kinds of introduced airs. Specifically, in the total heat exchanger (363), both sensible heat and latent heat are exchanged between the air from the second space (312) toward the first space (311) and the air from the first space (311) toward the second space (312). The air taken in from the second space (312) and flowing into the first air path (251) is adjusted in temperature and humidity thereof in the total heat exchanger (363), and then, is supplied to the first space (311).

Effects

According to the present invention, the filter (301, 302, ... ) captures dust and the like in the air in the normal operation, while the dust and the like adhered to the filter (301, 302, ... ) are removed by the flowing air in the cleaning operation. In other words, the filter (301, 302, ... ) can be cleaned by performing the cleaning operation with no removal of the filter (301, 302, ... ) from the air conditioner. Accordingly, filter detachment accompanied by cleaning work becomes unnecessary, thereby reducing the steps of maintenance work for the air conditioner. As a result, labor required for the maintenance of the air conditioner can be mitigated and the maintenance cost can be reduced.

Further, according to the present invention, the cleaning operation keeps the filter (301, 302, ... ) clean effortlessly and prevents lowering of an air flow rate, which is due to clogging of the filter (301, 302, ... ). Moreover, the filter (301, 302, ... ) can capture dust an the like in air surely, performance degradation of the air conditioning element (81, 82, ... ) caused due to deposition of dust and the like is suppressed, and the lifetime of the air conditioning element (81, 82, ... ) can be extended.

According to the second and third inventions, in the air conditioner including the adsorption element (81, 82) as the air conditioning element and capable of dehumidification of air supplied to the second space (312), performance degradation caused due to clogging of the filter (301, 302) can be prevented, a burden on the maintenance can be mitigated, and the maintenance cost can be reduced.

According to the fifth and sixth inventions, in the air conditioner including the adsorption element (81, 82) as the air conditioning element and capable of humidification of air supplied to the second space (312), performance degradation caused due to clogging of the filter (301, 302) can be prevented, a burden on the maintenance can be mitigated, and the maintenance cost can be reduced.

According to the eighth and ninth inventions, in the air conditioner including the adsorption element (81, 82) as the air conditioning element and capable of dehumidification and humidification of air supplied to the second space (312), performance degradation caused due to clogging of the filter (301, 302) can be prevented, a burden on the maintenance can be mitigated, and the maintenance cost can be reduced.

Especially, in the third, sixth, and ninth inventions, the filter (301a, 301b, ... ) is provided on each side of the adsorption element (81, 82), thereby effectively preventing performance degradation of the adsorption element (81, 82). Moreover, further lifetime extension of the adsorption element (81, 82) is enabled.

According to the eleventh invention, alternate performance is carried out between the first operation of the adsorption operation for the first adsorption element (81) and the regeneration operation for the second adsorption element (82); and the second operation of the regeneration operation for the first adsorption element (81) and the adsorption operation for the second adsorption element (82) as batch operation, so that dehumidification and humidification can be performed continuously.

According to the twelfth and thirteenth inventions, the rotary adsorption element (253) and the rotary filter (254) are arranged over the first air path (251) and the second air path (252) and are rotated. Therefore, it becomes possible to perform the adsorption operation in a part of the rotary adsorption element (253) while performing the regeneration operation in the other part thereof, thereby enabling continuous performance of adsorption and regeneration. Further, the rotary filter (254) captures dust in the first air path (251) while cleaning the rotary filter (254) in the second air path (252), thereby enabling continuous performance of dust capture and cleaning of the rotary filter (254).

BEST MODE FOR CARRYING OUT THE INVENTION

Embodiments of the present invention will be described below in detail with reference to the drawings.

First Embodiment

Figure 1:
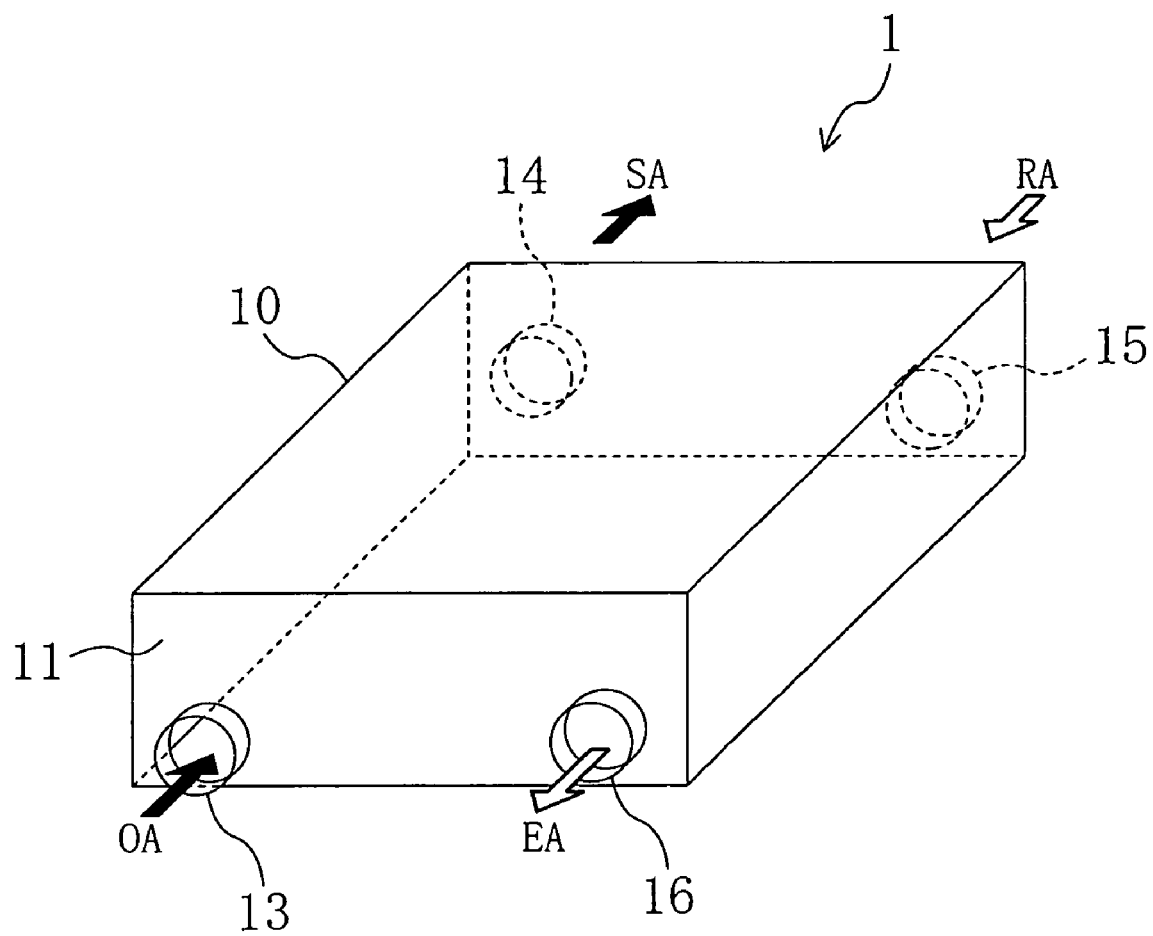
FIG. 1 is a perspective view of a humidity control device according to the first embodiment.

A humidity control device of the first embodiment is constituted by an air conditioner according to the present invention, and performs indoor dehumidification and ventilation. As shown in FIG. 1, the humidity control device (1) according the first embodiment includes: a casing (10) in a rather flat, rectangular solid shape; an air inlet (13) that sucks outdoor air; an air outlet (14) that blows out air indoors; an air inlet (15) that sucks room air; and an air outlet (16) that blows out air outdoors.

Figure 2:
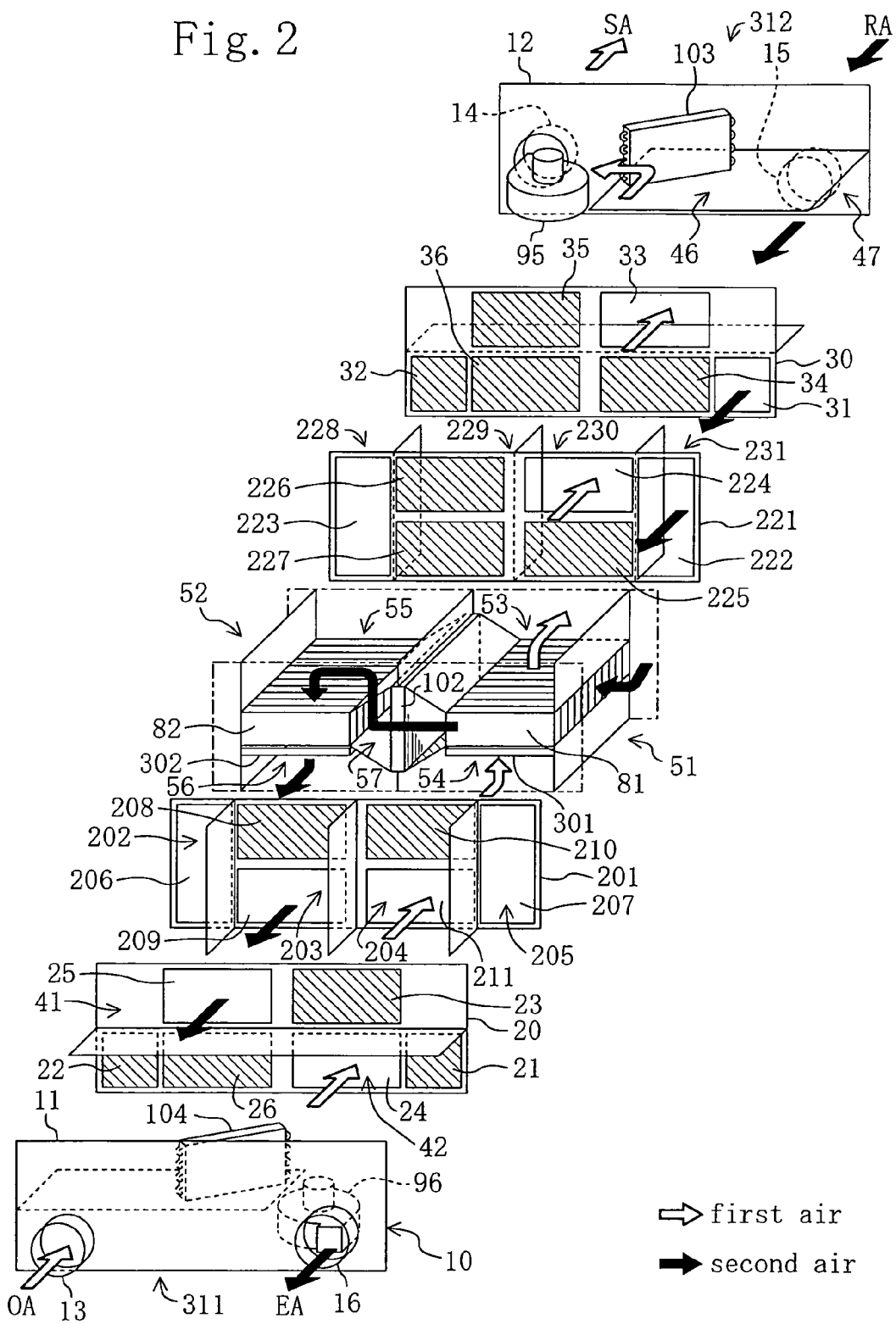
FIG. 2 is an exploded perspective view showing first operation of the humidity control device according to the first embodiment.

As shown in FIG. 2, a first adsorption element (81) and a second adsorption element (82) are accommodated in the casing (10). The first adsorption element (81) and the second adsorption element (82) compose air conditioning elements, respectively. Further, a regeneration heat exchanger (102), a first heat exchanger (103), and a second heat exchanger (104) are provided in the casing (10). These heat exchangers (102, 103, 104) are provided in a refrigeration circuit (not shown) so that refrigerant flows therein.

Figure 3:
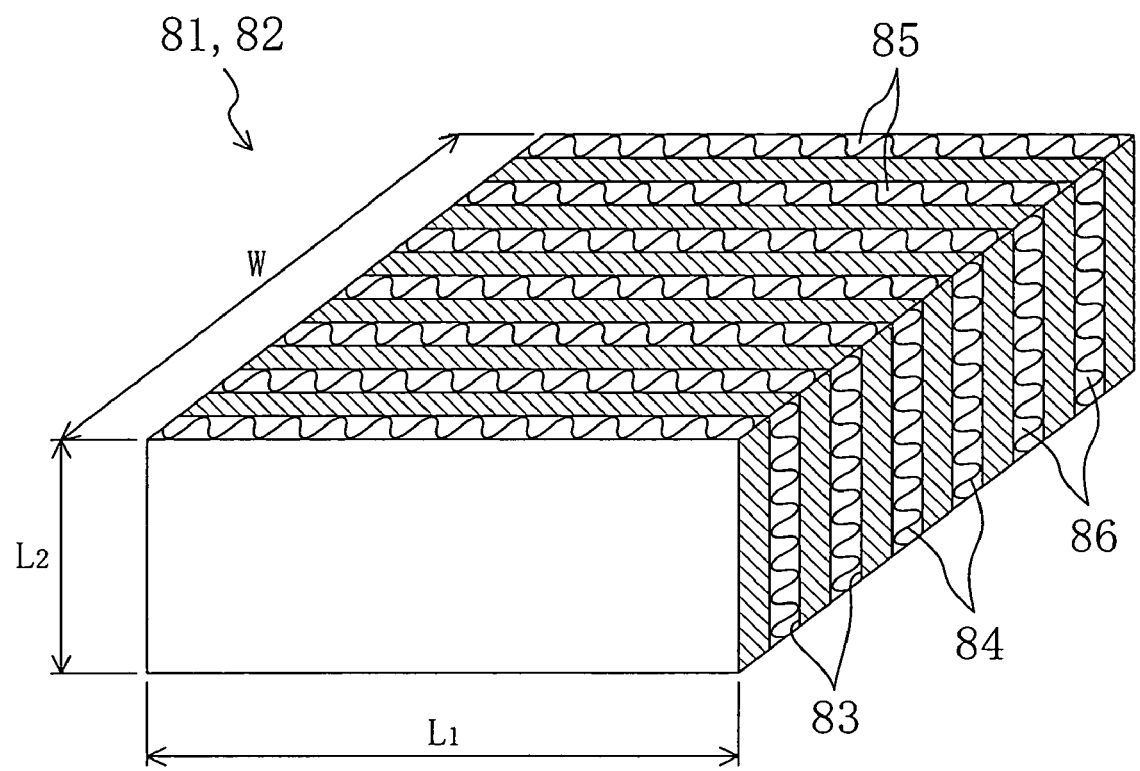
FIG. 3 is a schematic perspective view of an adsorption element.

As shown in FIG. 3, each adsorption element (81, 82) is composed of alternately stuck layers of flat plate members (83) and corrugated plate members (84). The flat plate members (83) are formed in a rectangular shape having a length $L_1$ of the long side 2.5 times a length $L_2$ of the short side. In short, each flat plate member (83) has a size of $L_1/L_2=2.5$. Wherein, the numeric values indicated herein are mere examples and each side length is not limited thereto particularly. The corrugated plate members (84) are stuck so as to shift by 90 degrees to the respective edge lines of adjacent corrugated plate members (84). Each adsorption element (81, 82) is formed in a rectangular solid shape or a square pole as a whole.

In each adsorption element (81, 82), humidity control side paths (85) and cooling side paths (86) are alternately defined and formed in the direction of the stuck layers of the flat plate members (83) and the corrugated plate members (84), with the flat plate members (83) interposed. In each adsorption element (81, 82), the humidity control side paths (85) open to the side face on the long side of the flat plate members (83), while the cooling side paths (86) open to the side face on the short side of the flat plate members (83). Further, the end faces in the front and back of each adsorption element (81, 82) in the drawing are closed faces open to neither the humidity control side paths (85) nor the cooling side paths (86).

In each adsorption elements (81, 82), an adsorbent for adsorbing moisture in air, that is, water vapor is applied on the surfaces of the flat plate member (83) facing the humidity control side paths (85) and the surfaces of the corrugated plate members (84) in the humidity control side paths (85). Silica gel, zeolite, ion exchange resin and the like may be listed as the adsorbent of this kind.

In the casing (10), as shown in FIG. 2, an outdoor side panel (11) and an indoor side panel (12) are provided at the front end and back end of the casing (10). The air inlet (13) is formed left-hand of the outdoor side panel (11), while the air outlet (16) is formed right-hand of the outdoor side panel (11). The air outlet (14) is formed left-hand of the indoor side panel (12), while the air inlet (15) is formed right-hand of the indoor side panel (12).

There are provided inside of the casing (10) a first partition plate (20), a second partition plate (201), a third partition plate (221), and a fourth partition plate (30) in this order from the front to the back. The inner space of the casing (10) is partitioned in the longitudinal direction by these partition plates (20, 201, 221, 30).

The space between the outdoor side panel (11) and the first partition plate (20) is divided into an upper space (41) and a lower space (42). The upper space (41) communicates with an outdoor space (311) through the air outlet (16). The lower space (42) communicates with the outdoor space (311) through the air inlet (13).

On the right hand of the upper space (41), an exhaust fan (96) is provided. Also, the second heat exchanger (104) is provided in the upper space (41). The second heat exchanger (104) is generally called a finned tube heat exchanger of cross fin type, and heats or cools air flowing in the upper space (41) toward the exhaust fan (96). In short, the second heat exchanger (104) is provided for heating or cooling air to be discharged outdoors.

The space between the first partition plate (20) and the second partition plate (201) is divided into a left end space (202), a left center space (203), a right center space (204), and a right end space (205) from the left side to the right side in this order.

In the first partition plate (20), there are formed a right side opening (21), a left side opening (22), an upper right opening (23), a lower right opening (24), an upper left opening (25), and a lower left opening (26). Each opening (21 to 26) includes an opening/closing shutter capable of opening and closing.

The upper space (41) communicates with the left center space (203) through the upper left opening (25). The upper space (41) communicates with the right center space (204) through the upper right opening (23). The lower space (42) communicates with the left end space (202) through the left side opening (22). The lower space (42) communicates with the left center space (203) through the lower left opening (26). The lower space (42) communicates with the right center space (204) through the lower right opening (24). The lower space (42) communicates with the right end space (205) through the right side opening (21).

In the second partition plate (201), there are also formed a right side opening (207), a left side opening (206), an upper right opening (210), a lower right opening (211), an upper left opening (208), and a lower left opening (209). Each of the upper left opening (208), the lower left opening (209), the upper right opening (210), and the lower right opening (211) includes an opening/closing shutter capable of opening and closing.

The first adsorption element (81) and the second adsorption element (82) are provided between the second partition plate (201) and the third partition plate (221). These adsorption elements (81, 82) are arranged right and left with a predetermined space left. Specifically, the first adsorption element (81) is arranged right-handed and the second adsorption element (82) is arranged left-handed.

The first adsorption element (81) and the second adsorption element (82) are arranged so that the directions of stuck layers of the flat plate members (83) and the corrugated plate members (84) thereof agree with the longitudinal direction of the casing (10) (the direction from the front toward the back in FIG. 2), and the directions of stuck layers of the flat plate members (83) and the like thereof are parallel to each other. Further, each adsorption element (81, 82) is arranged so that the right and left faces thereof are in parallel to the side plate of the casing (10), the upper and lower faces thereof are in parallel to the ceiling and the bottom plates of the casing (10), and the front and back end faces thereof are in parallel to the outdoor side panel (11) and the indoor side panel (12).

A first filter (301) is provided on the lower face of first adsorption element (81). A second filter (302) is provided on the lower face of the second adsorption element (82).

Further, the cooling side paths (86) open at the right and left side faces of each adsorption element (81, 82) in the casing (10). Namely, one of the side face open to the cooling side paths (86) in the first adsorption element (81) and one of the side face open to the cooling side paths (86) in the second adsorption element (82) face each other.

The space between the second partition plate (201) and the third partition plate (221) is divided into a right side passage (51), a left side passage (52), an upper right passage (53), a lower right passage (54), an upper left passage (55), a lower left passage (56), and a center passage (57).

The right side passage (51) is formed on the right side of the first adsorption element (81) so as to communicate with the cooling side paths (86) of the first adsorption element (81). The left side passage (52) is formed on the left side of the second adsorption element (82) so as to communicate with the cooling side paths (86) of the second adsorption element (82). The upper right passage (53) is formed on the upper side of the first adsorption element (81) so as to communicate with the humidity control side paths (85) of the first adsorption element (81). The lower right passage (54) is formed on the lower side of the first adsorption element (81) (strictly, the lower side of the first filter (301)) so as to communicate with the humidity control paths (85) of the first adsorption element (81). The upper left passage (55) is formed on the upper side of the second adsorption element (82) so as to communicate with the humidity control side paths (85) of the second adsorption element (82). The lower left passage (56) is formed on the lower side of the second adsorption element (82) (strictly, the lower side of the second filter (302)) so as to communicate with the humidity control side paths (85) of the second adsorption element (82).

The center passage (57) is formed between the first adsorption element (81) and the second adsorption element (85) so as to communicate with the cooling side paths (86) of both the adsorption elements (81, 82). The center passage (57) is in an octagonal shape in passage section appearing in FIG. 2.

Referring to the second partition plate (201), the left end space (202) communicates with the left side passage (52) through the left side opening (206). The right end space (205) communicates with the right side passage (51) through the right side opening (207). The left center space (203) communicates with the upper left passage (55) through the upper left opening (208). The left center space (203) communicates with the lower left passage (56) through the lower left opening (209). The right center space (204) communicates with the upper right passage (53) through the upper right opening (210). The right center space (204) communicates with the lower right passage (54) through the lower right opening (211).

The regeneration heat exchanger (102) is generally called a finned tube heat exchanger of cross fin type, and is arranged so as to heat air flowing in the center passage (57). The regeneration heat exchanger (102) is arranged in the center passage (57). Specifically, the regeneration heat exchanger (102) is arranged between the first adsorption element (81) and the second adsorption element (82) arranged right and left. Further, the regeneration heat exchanger (102) stands substantially perpendicularly to partition the center passage (57) right and left.

A shutter capable of opening and closing for separating the right side portion of the regeneration heat exchanger (102) in the center passage (57) from the upper right passage (53) is provided between the first adsorption element (81) and the regeneration heat exchanger (102). On the other hand, between the second adsorption element (82) and the regeneration heat exchanger (102), a shutter capable of opening and closing for separating the left side portion of the regeneration heat exchanger (102) in the center passage (57) from the upper left passage (55) is provided.

The third partition plate (221) has the same structure as that of the second partition plate (201). Namely, there are formed in the third partition plate (221) a right side opening (222), a left side opening (223), an upper right opening (224), a lower right opening (225), an upper left opening (226), and a lower left opening (227). The each of the upper left opening (226), the lower left opening (227), the upper right opening (224), and the lower right opening (225) includes an opening/closing shutter capable of opening and closing.

The space between the third partition plate (221) and the fourth partition plate (30) is divided into a left end space (228), a left center space (229), a right center space (230), and a right end space (231) from the left side to the right side in this order.

The left side passage (52) communicates with the left end space (228) through the left side opening (223). The right side passage (51) communicates with the right end space (231) through the right side opening (222). The upper left passage (55) communicates with the left center space (229) through the upper left opening (226). The lower left passage (56) communicates with the left center space (229) through the lower left opening (227). The upper right passage (53) communicates with the right center space (230) through the upper right opening (224). The lower right passage (54) communicates with the right center space (230) through the lower right opening (225).

The space between the fourth partition plate (30) and the indoor side panel (12) is divided into an upper space (46) and a lower space (47). The upper space (46) communicates with the indoor space (312) through the air outlet (14). The lower space (47) communicates with the indoor space (312) through the air inlet (15).

The fourth partition plate (30) has the same structure as that of the first partition plate (20). Namely, there are formed in the fourth partition plate (30) a right side opening (31), a left side opening (32) an upper right opening (33), a lower right opening (34), an upper left opening (35), and a lower left opening (36). Each opening (31 to 36) includes an opening/closing shutter capable of opening and closing.

The left end space (228) communicates with the lower space (47) through the left side opening (32). The left center space (229) communicates with the lower space (47) through the lower left opening (36). The right center space (230) communicates with the lower space (47) through the lower right opening (34). The right end space (231) communicates with the lower space (47) through the right side opening (31). The left center space (229) communicates with the upper space (46) through the upper left opening (35). The right center space (230) communicates with the upper space (46) through the upper right opening (33).

An air supply fan (95) is provided left-hand of the upper space (46). Also, the first heat exchanger (103) is provided in the upper space (46). The first heat exchanger (103) is generally called a finned tube heat exchanger of cross fin type for heating or cooling air flowing in the upper space (46) toward the air supply fan (95). In short, the first heat exchanger (103) is provided for heating or cooling air to be supplied indoors.

Driving Operation of Humidity Control Device

The driving operation of the humidity control device (1) will be described next. The humidity control device (1) performs alternate repetition of first operation (see FIG. 2) for adsorption of the first adsorption element (81) and regeneration of the second adsorption element (82) and second operation (see FIG. 4) for adsorption of the second adsorption element (82) and the regeneration of the first adsorption element (81). In short, the humidity control system (1) performs a generally-called batch operation. The alternate repetition of the first operation and the second operation of the humidity control device (1) attains continuous indoor dehumidification.

Referring to FIG. 2, the first operation will be described first. As described above, the adsorption operation for the first adsorption element (81) and the regeneration operation for the second adsorption element (82) are performed simultaneously in the first operation. The adsorption operation for the first adsorption element (81) is normal operation, and the first filter (301) performs air cleaning during the adsorption operation. On the other hand, the regeneration operation for the second adsorption element (82) is cleaning operation, and dust is removed from the second filter (302) during the regeneration operation.

In the first partition plate (20), the lower right opening (24) and the upper left opening (25) are opened, while the right side opening (21), the upper right opening (23), the lower left opening (26), and the left side opening (22) are closed. In the second partition plate (201), the lower right opening (211) and the lower left opening (209) are opened, while the upper right opening (210) and the upper left opening (208) are closed. Wherein, the right side opening (207) and the left side opening (206) are opened. In the third partition plate (221), the upper right opening (224) is opened, while the lower right opening (225), the upper left opening (226), and the lower left opening (227) are closed. Wherein, the right side opening (222) and the left side opening (223) are opened. In the fourth partition plate (30), the upper right opening (33) and the right side opening (31) are opened, while the lower right opening (34), the upper left opening (35), the lower left opening (36), and the left side opening (32) are closed.

Outdoor air (hereinafter referred to as first air) sucked from the air inlet (13) passes through the lower space (42), the lower right opening (24) of the first partition plate (20), the right center space (204), the lower right opening (211) of the second partition plate (201) in this order, to be introduced into the lower right passage (54).

The first air introduced in the lower right passage (54) passes upward through the first filter (301) and the humidity control side paths (85) of the second adsorption element (81), to flow into the upper right passage (53). At this time, dust and the like included in the first air are captured by the first filter (301) to be removed from the first air. Also, moisture included in the first air is adsorbed by the first adsorption element (81) for dehumidification of the first air.

The first air flowing in the upper right passage (53) passes through the upper right opening (224) of the third partition plate (221), the right center space (230), the upper right opening (33) of the fourth partition plate (30), and the upper space (46) in this order to be cooled by the first heat exchanger (103) when passing through the upper space (46). Then, the first air is supplied indoors from the air outlet (14).

On the other hand, room air (hereinafter referred to as second air) sucked from the air inlet (15) passes through the lower space (47), the right side opening (31) of the fourth partition plate (30), the right end space (231), and the right side opening (222) of the third partition plate (221) in this order, to be introduced into the right side passage (51).

The second air introduced in the right side passage (51) flows into the cooling side paths (86) of the first adsorption element (81). The second air absorbs adsorption heat generated at adsorption of water vapor by the adsorbent in the humidity control side paths (85) when passing through the cooling side paths (86). In other words, the second air flows through the cooling side paths (86) as a cooing fluid to cool the first adsorption element (81). The second air that has passed through the cooling side paths (86) passes through the regeneration heat exchanger (102) next. At this time, the second air is heated by the heat exchange for the refrigerant in the regeneration heat exchanger (102). Then, the second air flows through the center passage (57) into the upper left passage (55).

The second air heated by the first adsorption element (81) and the regeneration heat exchanger (102) is introduced into the humidity control side paths (85) of the second adsorption element (82). In the humidity control side paths (85), the absorbent is heated by the second air, so that water vapor is desorbed from the adsorbent. Namely, the regeneration of the second adsorption element (82) is performed.

Next, the second air including the water vapor passes through the second filter (302). At this time, the dust and the like adhered to the second filter (302) is detached from the second filter (302), and flows with the second air. In other words, the second air removes the dust and the like adhered to the second filter (302) for cleaning the second filter (302). Then, the second air including the dust and the like flows into the lower left passage (56).

The second air flowing in the lower left passage (56) flows through the lower left opening (209) of the second partition plate (201), the left center space (203), the upper left opening (25) of the first partition plate (20), and the upper space (41), to be discharged outdoors from the air outlet (16). At this time, the dust and the like removed from the second filter (302) are also discharged outdoors together with the second air. During that time, the second heat exchanger (104) stops, so that the second air is neither heated nor cooled when flowing through the upper space (41).

After the first operation continues for a predetermined period, the second operation as follows is performed. The second operation will be described next with reference to FIG. 4.

In the second operation, which is the reverse of the first operation, the adsorption operation for the second adsorption element (82) and the regeneration operation for the first adsorption element (81) are performed simultaneously. The adsorption operation for the first adsorption element (81) is cleaning operation, and dust is removed from the first filter (301) during the adsorption operation. The regeneration operation for the second adsorption element (82) is normal operation, and the second filter (302) performs air cleaning during the regeneration operation.

Figure 4:
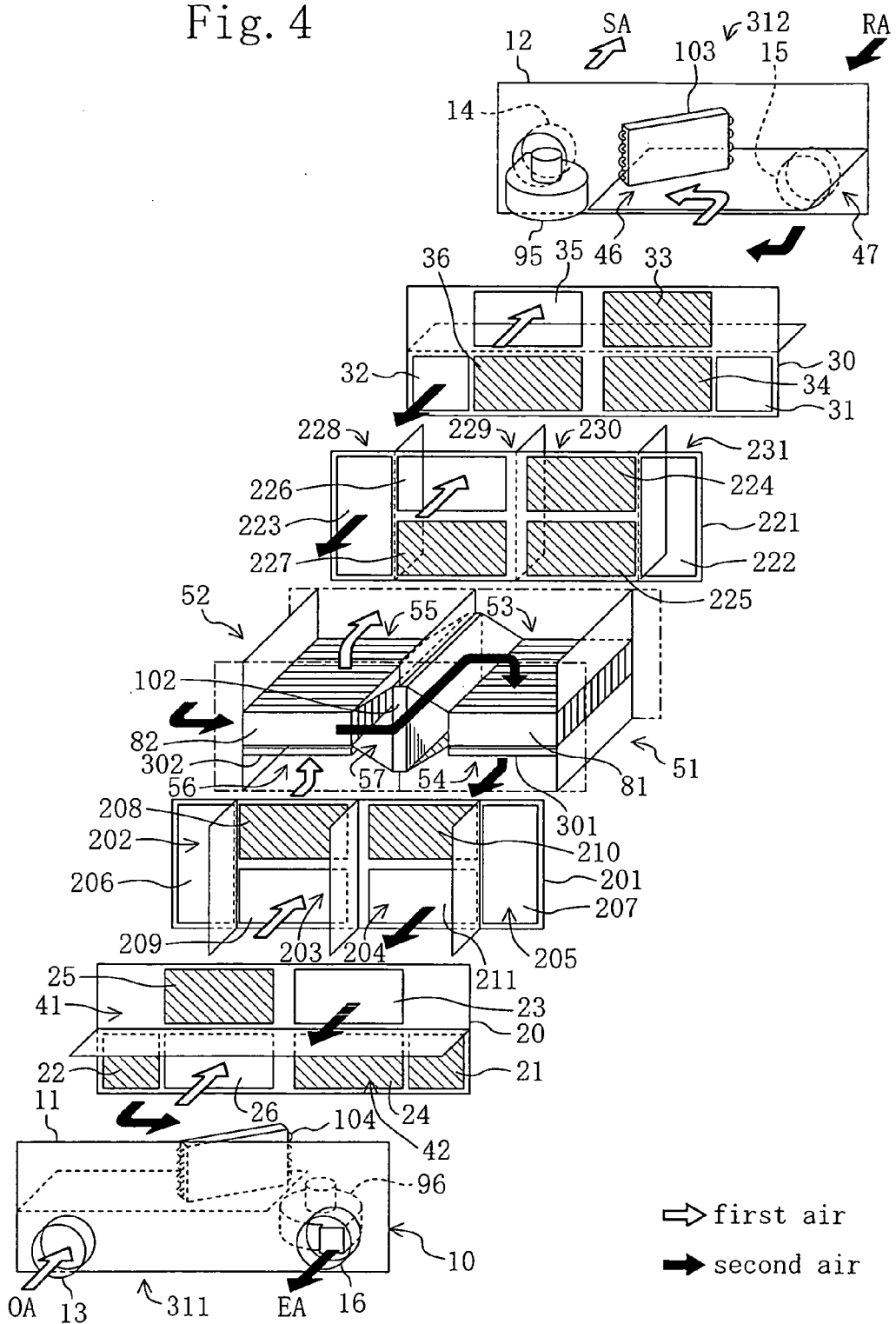
FIG. 4 is an exploded perspective view showing second operation of the humidity control device according to the first embodiment.

As shown in FIG. 4, in the first partition plate (20), the upper right opening (23) and the lower left opening (26) are opened, while the right side opening (21), the lower right opening (24), the upper left opening (25), and the left side opening (22) are closed. In the second partition plate (201), the lower right opening (211) and the lower left opening (209) are opened, while the upper right opening (210) and the upper left opening (208) are closed. Wherein, the right side opening (207) and the left side opening (206) are opened. In the third partition plate (221), the upper left opening (226) is opened, while the lower left opening (227), the upper right opening (224), and the lower right opening (225) are closed. Wherein, the right side opening (222) and the left side opening (223) are opened. In the fourth partition plate (30), the upper left opening (35) and the left side opening (32) are opened, while the lower left opening (36), the upper right opening (33), the lower right opening (34), and the right side opening (31) are closed.

Outdoor air (hereinafter referred to as first air) sucked from the air inlet (13) passes through the lower space (42), the lower left opening (26) of the first partition plate (20), the left center space (203), the lower left opening (209) of the second partition plate (201) in this order, to be introduced into the lower left passage (56).

The first air introduced in the lower left passage (56) passes upward through the second filter (302) and the humidity control side paths (85) of the second adsorption element (82), to flow into the upper left passage (55). At this time, dust and the like included in the first air are captured by the second filter (302) to be removed from the first air. Also, moisture included in the first air is adsorbed by the second adsorption element (82) for dehumidification of the first air.

The first air flowing in the upper left passage (55) passes through the upper left opening (226) of the third partition plate (221), the left center space (229), the upper left opening (35) of the fourth partition plate (30), and the upper space (46) in this order to be cooled by the first heat exchanger (103) when passing through the upper space (46). Then, the first air is supplied indoors from the air outlet (14).

On the other hand, room air (hereinafter referred to as second air) sucked from the air inlet (15) passes through the lower space (47), the left side opening (32) of the fourth partition plate (30), the left end space (228), and the left side opening (223) of the third partition plate (221) in this order, to be introduced into the left side passage (52).

The second air introduced in the left side passage (52) flows into the cooling side paths (86) of the second adsorption element (82). The second air absorbs adsorption heat generated in the humidity control side paths (85) when flowing through the cooling side paths (86). In other words, the second air flows through the cooling side paths (86) as a cooing fluid to cool the second adsorption element (82). The second air that has passed through the cooling side paths (86) passes through the regeneration heat exchanger (102) next. At this time, the second air is heated by the heat exchange for the refrigerant in the regeneration heat exchanger (102). Then, the second air flows through the center passage (57) into the upper right passage (53).

The second air heated by the second adsorption element (82) and the regeneration heat exchanger (102) is introduced into the humidity control side paths (85) of the first adsorption element (81). In the humidity control side paths (85), the absorbent is heated by the second air, so that water vapor is desorbed from the adsorbent. Namely, the regeneration of the first adsorption element (81) is performed.

Next, the second air including the water vapor passes through the first filter (301). At this time, the dust and the like adhered to the first filter (301) are detached from the first filter (301), and flows with the second air, to be discharged. In other words, the second air removes the dust and the like adhered to the first filter (301) for cleaning the first filter (301). Then, the second air including the dust and the like flows into the left side passage (52).

The second air flowing in the left side passage (52) flows through the lower right opening (211) of the second partition plate (201), the right center space (204), the upper right opening (23) of the first partition plate (20), and the upper space (41) in this order, to be discharged outdoors from the air outlet (16). At this time, the dust and the like removed from the first filter (301) are also discharged outdoors together with the second air. During that time, the second heat exchanger (104) stops, so that the second air is neither heated nor cooled when flowing through the upper space (41).

Effects in First Embodiment

As described above, in the humidity control device (1), the air flowing direction in the adsorption elements (81, 82) is reversed between the adsorption operation and the regeneration operation. In other words, the air flowing direction during the adsorption operation is opposite to that during the regeneration operation.

Specifically, the air passing through the humidity control side paths (85) of the adsorption elements (81, 82) flows upward during the adsorption operation, while flowing downward during the regeneration operation. As a result, the dust and the like included in the first air are removed by the filter (301, 302) during the adsorption operation, while the dust adhered to the filter (301, 302) is removed by the second air, to be discharged together with the second air, during the regeneration operation. The humidity control device (1) performs the batch operation so that the adsorption operation and the regeneration operation are alternately performed in each adsorption element (81, 82). Consequently, capture and detachment of dust and the like are performed in each filter (301, 302) alternately, which means automatic cleaning of the filters (301, 302). Hence, less amount of dust and the like are deposited on the filters (301, 302) for a long period of term.

Hence, lowering of the ventilation rate, which is due to clogging of the filters (301, 302), can be prevented in the humidity control device (1). Further, performance degradation of the adsorption elements (81, 82) can be prevented effectively, with a result of lifetime extension of the adsorption elements (81, 82).

Further, periodic cleaning work for the filters (301, 302) becomes unnecessary or can be reduced, with a result of mitigation of burden on the maintenance. Thus, the maintenance cost can be reduced.

First Modified Example

Figure 5A:
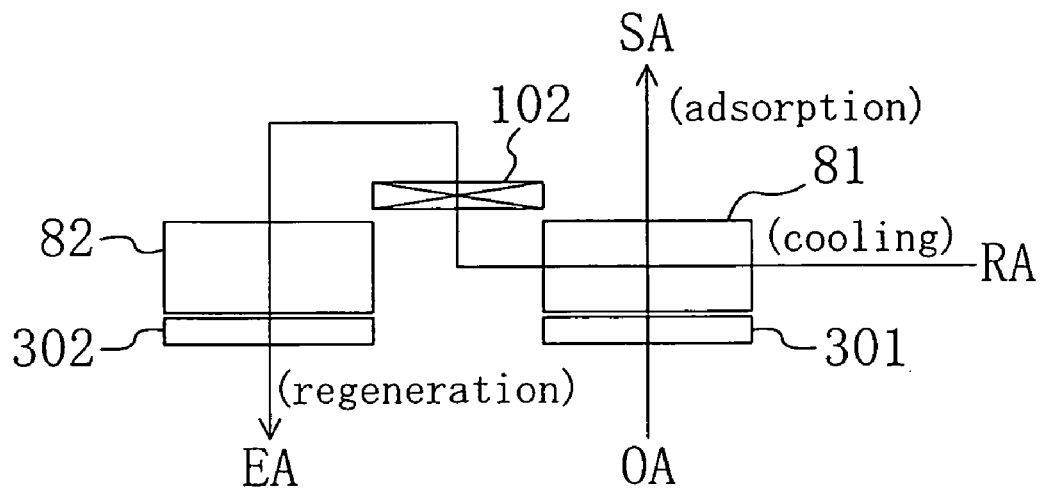
FIG. 5A is a conceptual view of the main portion showing first operation of a humidity control device according to the first modified example of the first embodiment.
Figure 5B:
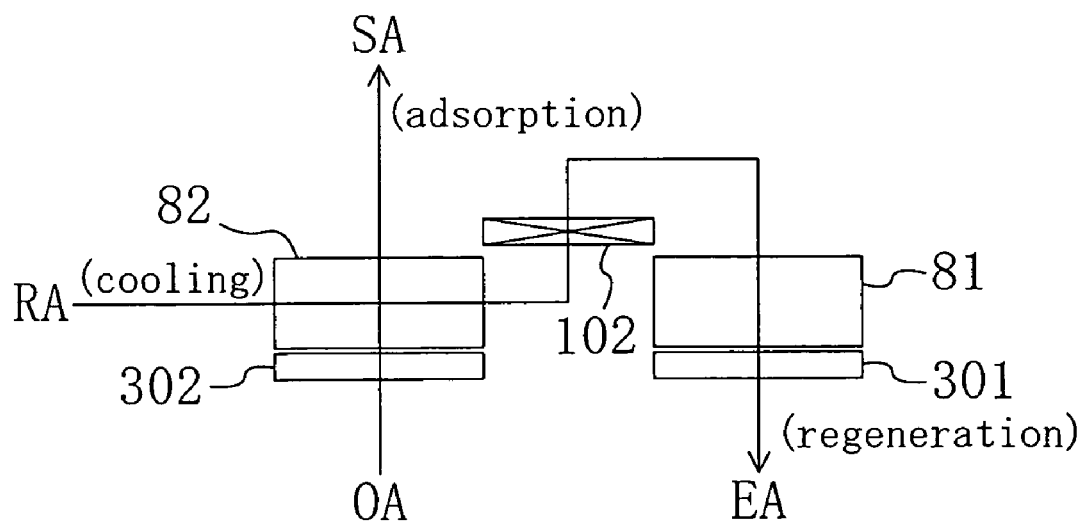
FIG. 5B is a conceptual view of the main portion showing second operation of the humidity control device according to the first modified example of the first embodiment.

In the above embodiment, the regeneration heat exchanger (102) stands upright between the first adsorption element (81) and the second adsorption element (82), but the layout of the regeneration heat exchanger (102) is not limited specifically. For example, as shown in FIG. 5A and FIG. 5B, the regeneration heat exchanger (102) may be arranged transversely so that the air flows vertically in the heat exchange.

Second Modified Example

Figure 6A:
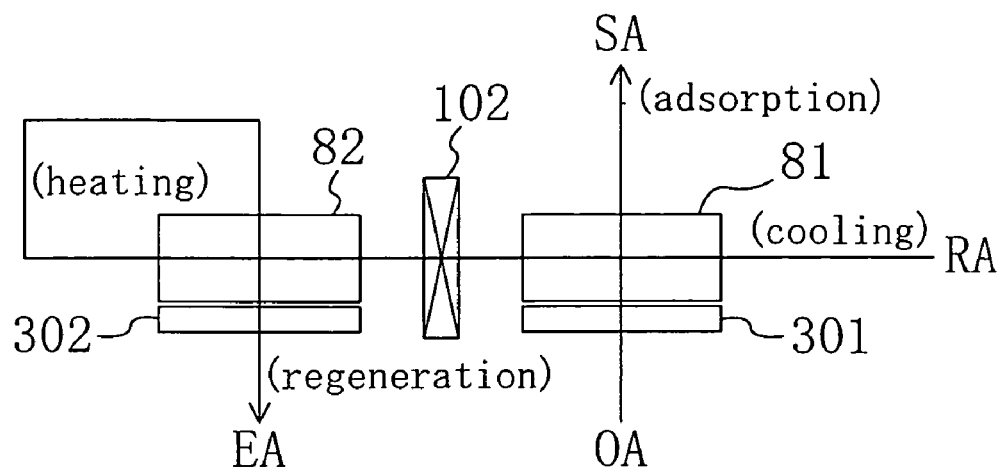
FIG. 6A is a conceptual view of the main portion showing first operation of a humidity control device according to the second modified example of the first embodiment.
Figure 6B:
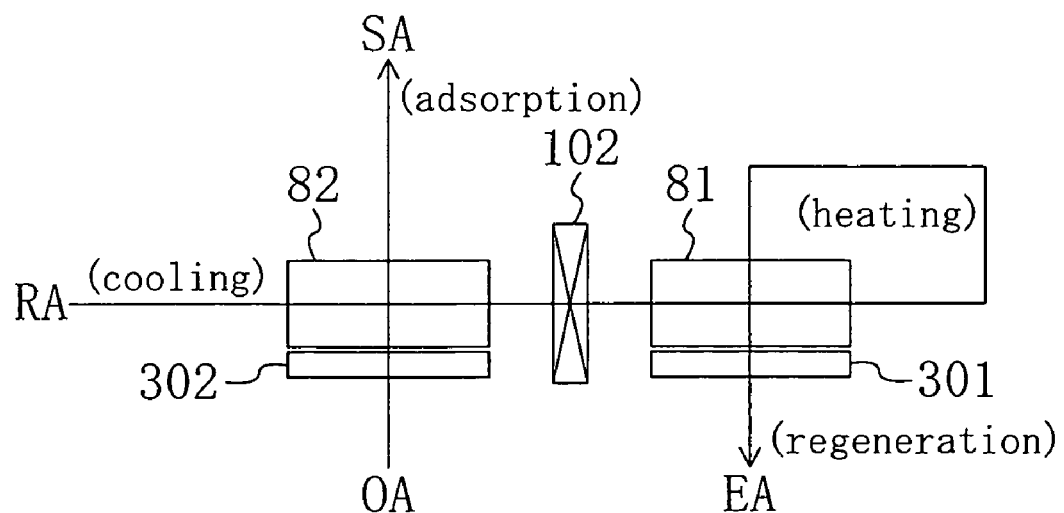
FIG. 6B is a conceptual view of the main portion showing second operation of the humidity control device according to the second modified example of the first embodiment.

The air heated by the regeneration heat exchanger (102) is immediately introduced into the humidity control side paths (85) of the adsorption element (81, 82) in the above embodiment. However, as shown in FIG. 6A and FIG. 6B, the air heated by the regeneration heat exchanger (102) may be once introduced into the cooling side paths (86) of the adsorption element (81, 82), and then, be introduced into the humidity control side paths (85). With this arrangement, the adsorption element (81, 82) to be regenerated can be heated efficiently, thereby increasing the regeneration efficiency.

Third Modified Example

Figure 7A:
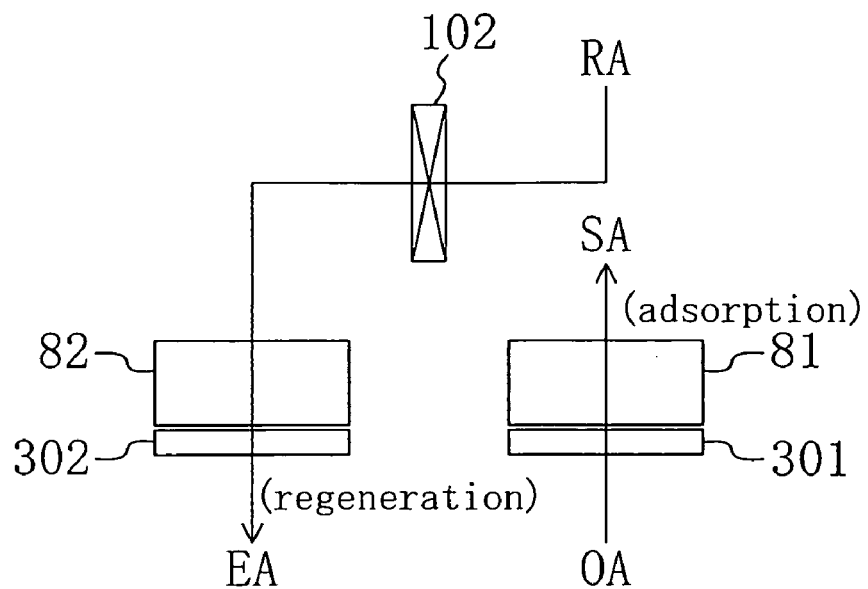
FIG. 7A is a conceptual view of the main portion showing first operation of a humidity control device according to the third modified example of the first embodiment.
Figure 7B:
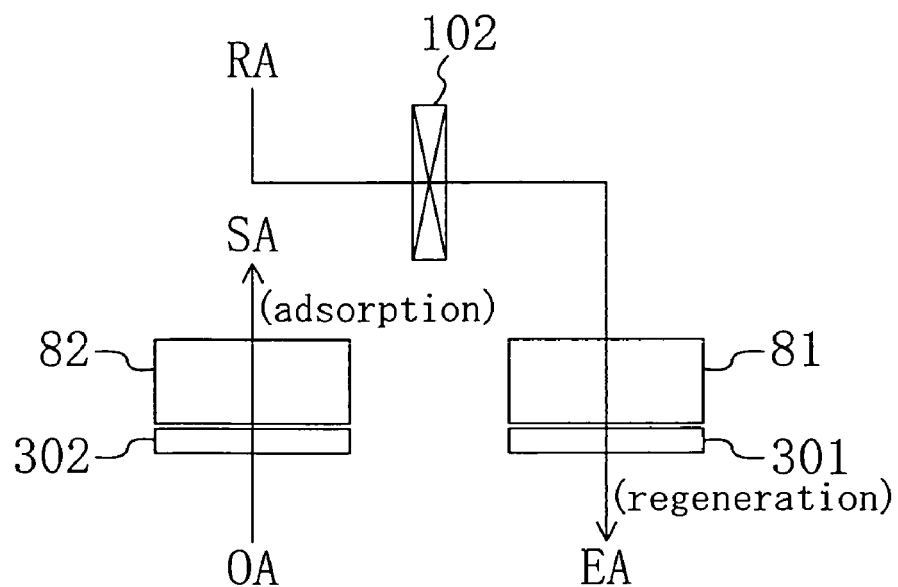
FIG. 7B is a conceptual view of the main portion showing second operation of the humidity control device according to the third modified example of the first embodiment.

Each adsorption element (81, 82) in the above embodiment includes two kinds of paths of: the humidity control side paths (85); and the cooling side paths (86). However, adsorption elements (81, 82) each including the humidity control side paths (85) only may be employed, as shown in FIG. 7A and FIG. 7B.

Fourth Modified Example

Two independent adsorption elements of: the first adsorption element (81); and the second adsorption element (82) are provided in the above embodiment. However, a single adsorption element may be provided in the present invention.

Figure 8:
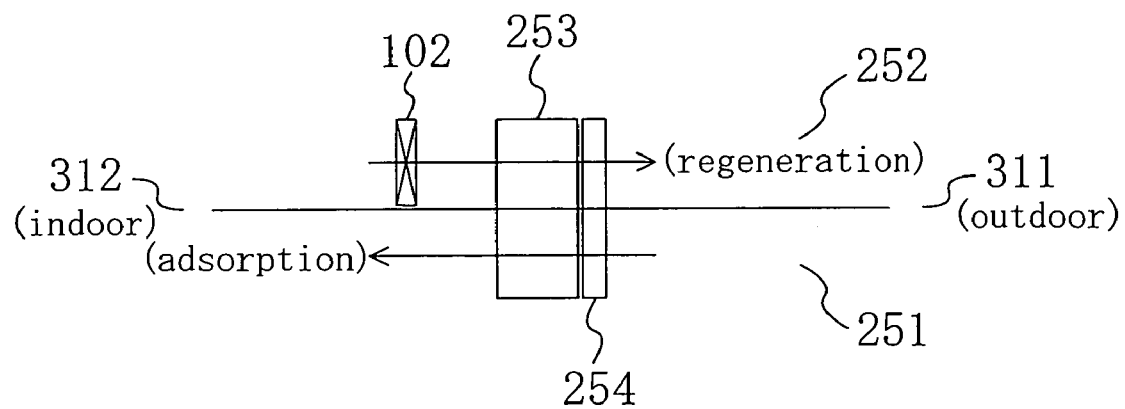
FIG. 8 is a conceptual view of the main portion of a humidity control device according to the fourth modified example of the first embodiment.

For example, as shown in FIG. 8, a single rotary adsorption element (253) composing the air conditioning element may be arranged over an adsorption path (251) and a regeneration path (252). In this modified embodiment, a rotary filter (254) that rotates integrally with the rotary adsorption element (253) is provided on the outdoor side of the rotary adsorption element (253). The regeneration heat exchanger (102) is provided on the indoor side of the rotary adsorption element (253) in the regeneration path (252).

In the present modified example, outdoor air sucked in the adsorption path (251) is cleaned by the filter (254), and then, is dehumidified by the rotary adsorption element (253). Subsequently, the cleaned and dehumidified air is supplied indoors. On the other hand, room air sucked in the regeneration path (252) is heated by the regeneration heat exchanger (102), and then, passes through the rotary adsorption element (253). At this time, the room air heats the rotary adsorption element (253) and absorbs moisture included in the rotary adsorption element (253). Whereby, the rotary adsorption element (253) is regenerated. Next, the air that has regenerated the rotary adsorption element (253) passes through the filter (254). At this time, dust and the like adhered to the filter (254) are removed from the filter (254) by the aforementioned air.

According to the present modified example, the adsorption and regeneration of the adsorption element can be performed continuously with no batch operation needed. Also, dust capture and cleaning for the filter (254) can be performed continuously.

Second Embodiment

Figure 9:
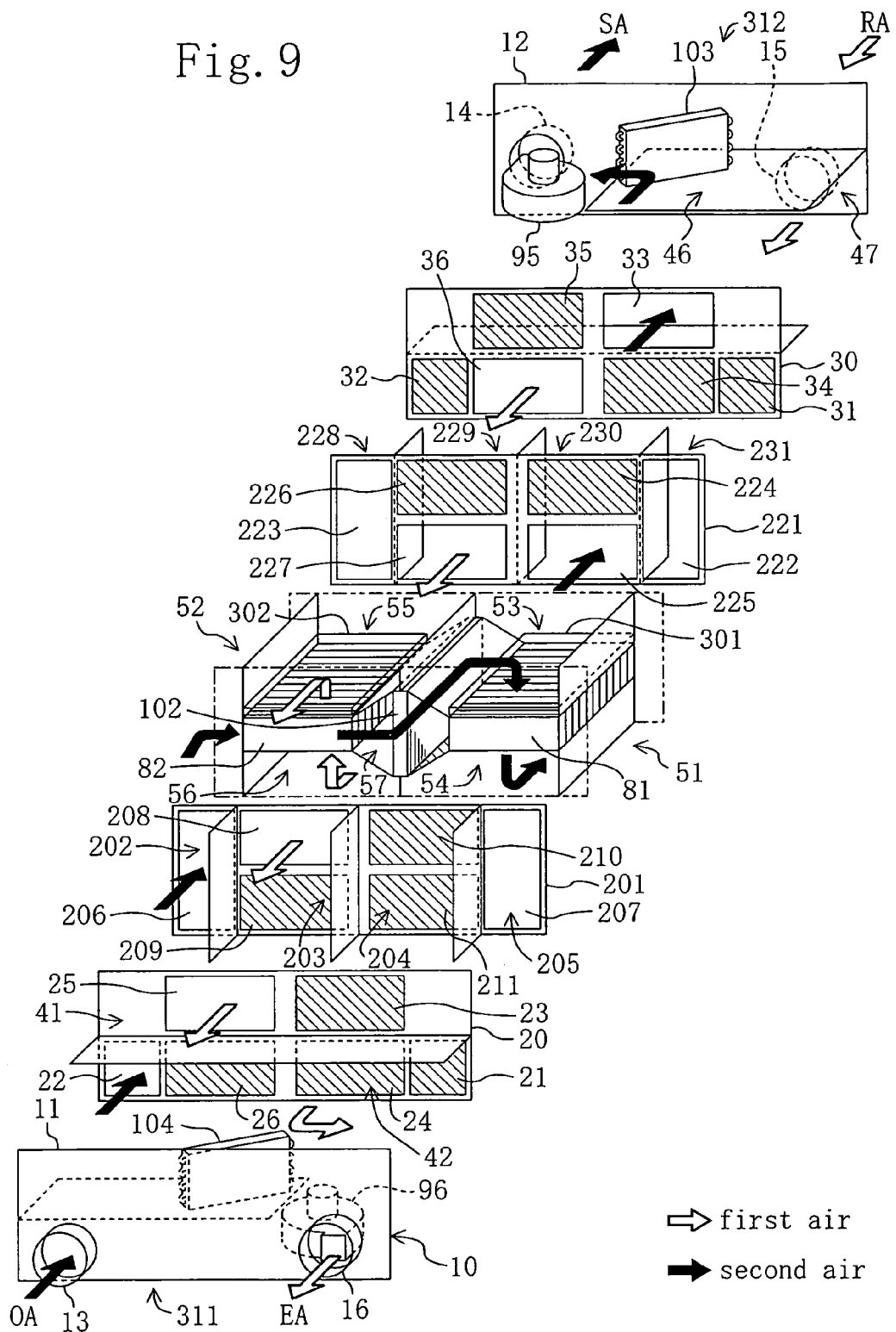
FIG. 9 is an exploded perspective view showing first operation in a humidity control device according to the second embodiment.

A humidity control device of the second embodiment is constituted by an air conditioner according to the present invention, and performs indoor humidification and ventilation. As shown in FIG. 9, the first filter (301) and the second filter (302) are provided on the upper faces of the first adsorption element (81) and the second adsorption element (82), respectively, in the humidity control device (2) according the second embodiment. The constitution of the humidity control device (2) is the same as that of the humidity control device (1) in the first embodiment, other than the layout position of the filters (301, 302). Accordingly, the description of the construction of the humidity control device (2) is omitted.

The humidity control device (2) performs alternate repetition of first operation (see FIG. 9) for regeneration of the first adsorption element (81) and adsorption of the second adsorption element (82) and second operation (see FIG. 10) for adsorption of the first adsorption element (81) and the regeneration of the second adsorption element (82). In short, the humidity control device (2) also performs a generally-called batch operation, and the alternate repetition of the first operation and the second operation attains continuous indoor humidification.

Referring to FIG. 9, the first operation will be described. In the first operation, regeneration operation for the adsorption element (81) and adsorption operation for the second adsorption element (82) are performed simultaneously. The regeneration operation for the first adsorption element (81) is normal operation, and the first filter (301) performs air cleaning during the regeneration operation. On the other hand, the adsorption operation for the second adsorption element (82) is cleaning operation, and dust is removed from the second filter (302) during the adsorption operation.

In the first partition plate (20), the upper left opening (25) and the left side opening (22) are opened, while the right side opening (21), the upper right opening (23), the lower right opening (24), and the lower left opening (26) are closed. In the second partition plate (201), the upper left opening (208) is opened, while the lower left opening (209), the upper right opening (210), and the lower right opening (211) are closed. Wherein, the left side opening (206) and the right side opening (207) are opened. In the third partition plate (221), the lower right opening (225) and the lower left opening (227) are opened, while the upper right opening (224) and the upper left opening (226) are closed. Wherein, the right side opening (222) and the left side opening (223) are opened. In the fourth partition plate (30), the upper right opening (33) and the lower left opening (36) are opened, while the right side opening (31), the left side opening (32), the lower right opening (34), and the upper left opening (35) are closed.

Outdoor air (hereinafter referred to as second air) sucked from the air inlet (13) passes through the lower space (42), the left side opening (22) of the first partition plate (20), the left end space (202), and the left side opening (206) of the second partition plate (201) in this order, to be introduced into the left side passage (52). The second air introduced in the left side passage (52) passes through the cooling side paths (86) of the second adsorption element (82) and the regeneration heat exchanger (102) in the center passage (57) to be heated by the second adsorption element (82) and the regeneration heat exchanger (102).

The heated second air flows into the upper right passage (53), and passes through the first filter (301) and the humidity control side paths (85) of the first adsorption element (81) in this order. At this time, the second air is cleaned by the first filter (301) and is humidified by the first adsorption element (81).

The humidified second air flows into the lower right passage (54), passes through the lower right opening (225) of the third partition plate (221), the right center space (230), and the upper right opening (33) of the fourth partition plate (46) in this order, and then, flows into the upper space (46). The second air flown in the upper space (46) passes through the first heat exchanger (103), to be supplied indoors from the air outlet (14). Wherein, the first heat exchanger (103) stops so that the second air is neither heated nor cooled when flowing through the first heat exchanger (103).

On the other hand, room air (hereinafter referred to as first air) sucked from the air inlet (15) passes through the lower space (47), the lower left opening (36) of the fourth partition plate (30), the left center space (229), and the lower left opening (227) of the third partition plate (221) in this order, to flow into the lower left passage (56).

The first air flowing in the lower left passage (56) passes through the humidity control side paths (85) of the second adsorption element (82) to be dehumidified by the second adsorption element (82). The first air that has passed through the humidity control side paths (85) of the second adsorption element (82) passes through the second filter (302). At this time, dust and the like adhered to the second filter (302) are removed by the first air. The first air including the dust and the like flows through the upper left passage (55), the upper left opening (208) of the second partition plate (201), the left center space (203), the upper left opening (25) of the first partition plate (20), and the upper space (41) in this order, to be discharged outdoors from the air outlet (16). Wherein, the first air is cooled when flowing through the second heat exchanger (104) in the upper space (41).

After the aforementioned first operation continues for a predetermined period, the second operation as follows is performed. The second operation will be described next with reference to FIG. 10.

In the second operation, which is the reverse of the first operation, the adsorption operation for the first adsorption element (81) and the regeneration operation for the second adsorption element (82) are performed. The adsorption operation for the first adsorption element (81) is cleaning operation, and dust is removed from the first filter (301) during the adsorption operation. The regeneration operation for the second adsorption element (82) is normal operation, and the second filter (302) performs air cleaning during the regeneration operation.

Figure 10:
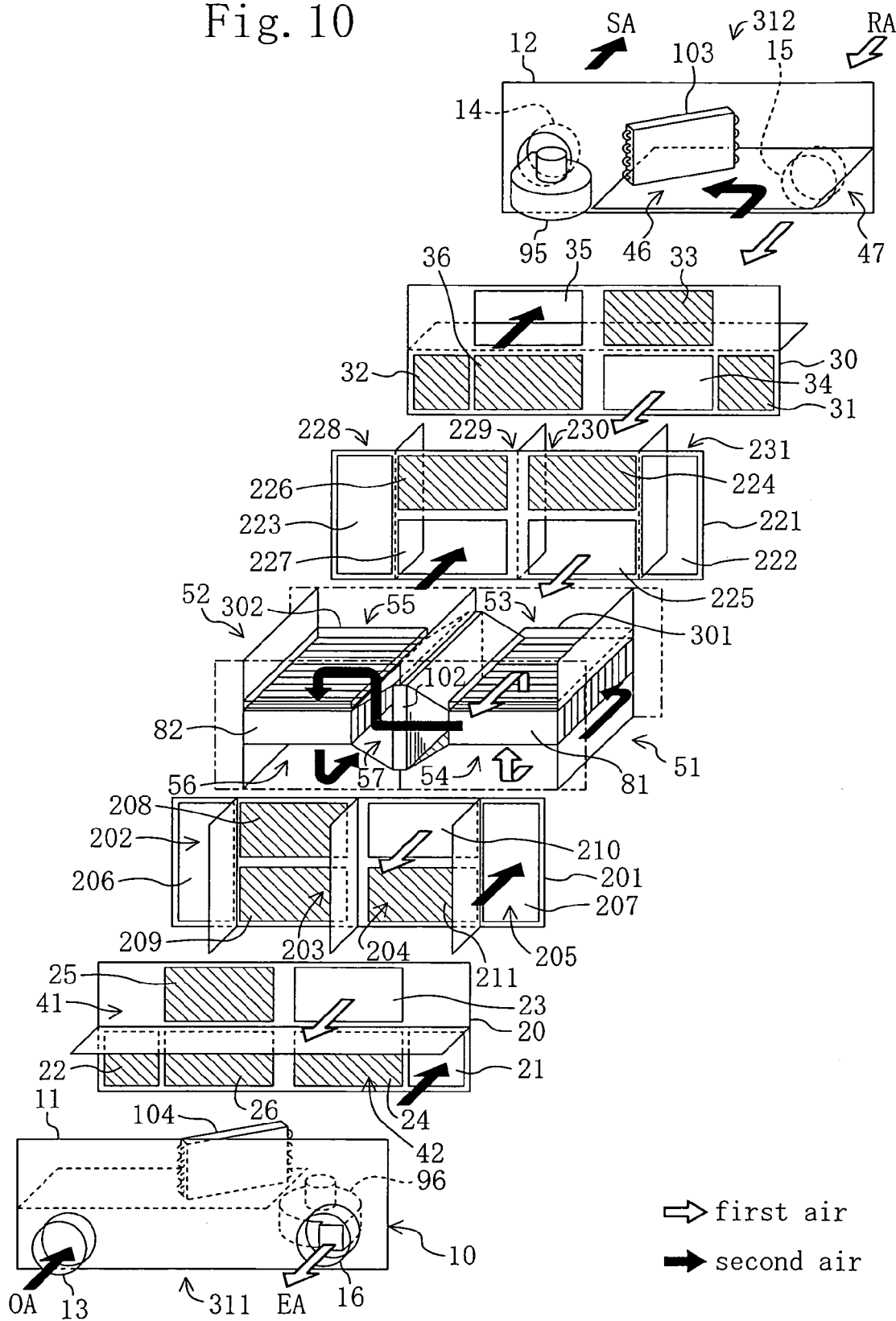
FIG. 10 is an exploded perspective view showing second operation in the humidity control device according to the second embodiment.

As shown in FIG. 10, the upper right opening (23) and the right side opening (21) are opened, while the left side opening (22), the lower right opening (24), the upper left opening (25), and the lower left opening (26) are closed in the first partition plate (20). In the second partition plate (201), the upper right opening (210) is opened, while the upper left opening (208), the lower left opening (209), and the lower right opening (211) are closed. Wherein, the left side opening (206) and the right side opening (207) are opened. In the third partition plate (221), the lower right opening (225) and the lower left opening (227) are opened, while the upper right opening (224) and the upper left opening (226) are closed. Wherein, the right side opening (222) and the left side opening (223) are opened. In the fourth partition plate (30), the lower right opening (34) and the upper left opening (35) are opened, while the right side opening (31), the left side opening (32), the upper right opening (33), and the lower left opening (36) are closed.

Outdoor air (hereinafter referred to as second air) sucked from the air inlet (13) passes through the lower space (42), the right side opening (21) of the first partition plate (20), the right end space (205), and the right side opening (207) of the second partition plate (201) in this order, to be introduced into the right side passage (51).

The second air introduced in the right side passage (51) passes through the cooling side paths (86) of the first adsorption element (81) and the regeneration heat exchanger (102) in the center passage (207) in this order to be heated by first adsorption element (81) and the regeneration heat exchanger (102).

The heated second air flows into the upper left passage (55), and passes through the second filter (302) and the humidity control side paths (85) of the second adsorption element (82) in this order. At this time the second air is cleaned by the second filter (302) and is humidified by the second adsorption element (82).

The humidified second air flows into the lower left passage (56), passes through the lower left opening (227) of the third partition plate (221), the left center space (229), and the upper left opening (35) of the fourth partition plate (30) in this order, and then, flows into the upper space (46). The first air flowing in the upper space (46) passes through the first heat exchanger (103), to be supplied indoors from the air outlet (14). Wherein, the first heat exchanger (103) stops, likewise that in the first operation, so that the second air is neither heated nor cooled by the first heat exchanger (103).

On the other hand, room air (hereinafter referred to as first air) sucked from the air inlet (15) passes through the lower space (47), the lower right opening (34) of the fourth partition plate (30), the right center space (230), and the lower right opening (225) of the third partition plate (221) in this order, to flow into the lower right passage (54).

The first air flown in the lower right passage (54) passes through the humidity control side paths (85) of the first adsorption element (81) to be dehumidified by the first adsorption element (81). The first air that has passed through the humidity control side paths (85) of the first adsorption element (81) passes through the first filter (301). At this time, dust and the like adhered to the first filter (301) are removed by the first air. Then, the first air including the dust and the like flows through the upper right passage (53), the upper right opening (210) of the second partition plate (201), the right center space (204), the upper right opening (23) of the first partition plate (20), and the upper space (41) in this order, to be discharged outdoors from the air outlet (16). Wherein, the second air is cooled when passing through the second heat exchanger (104) in the upper space (41).

Effects in Second Embodiment

As described above, also in the humidity control device (2), alternate performance of capture and removal of dust and the like in each filter (301, 302) can be performed by alternate performance of the first operation and the second operation. Hence, less amount of dust is deposited on the filters (301, 302) for a long period of term, and ability lowering of the device, which is due to clogging of the filters (301, 302), can be prevented. Further, quality degradation of the adsorption elements (81, 82) can be prevented, with a result of lifetime extension of the adsorption elements (81, 82). In addition, mitigation of burden on the maintenance and reduction of the maintenance cost can be contemplate.

First Modified Example

Figure 11A:
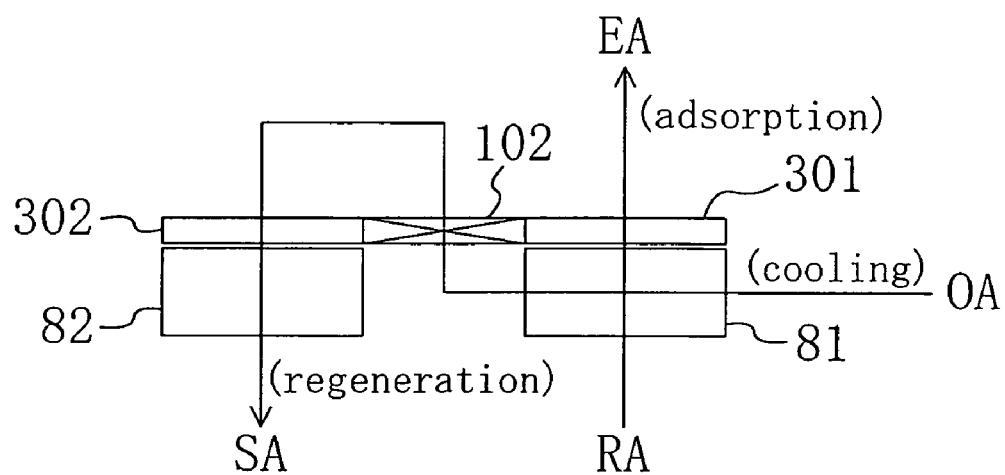
FIG. 11A is a conceptual view of the main portion showing first operation of a humidity control device according to the first modified example of the second embodiment.
Figure 11B:
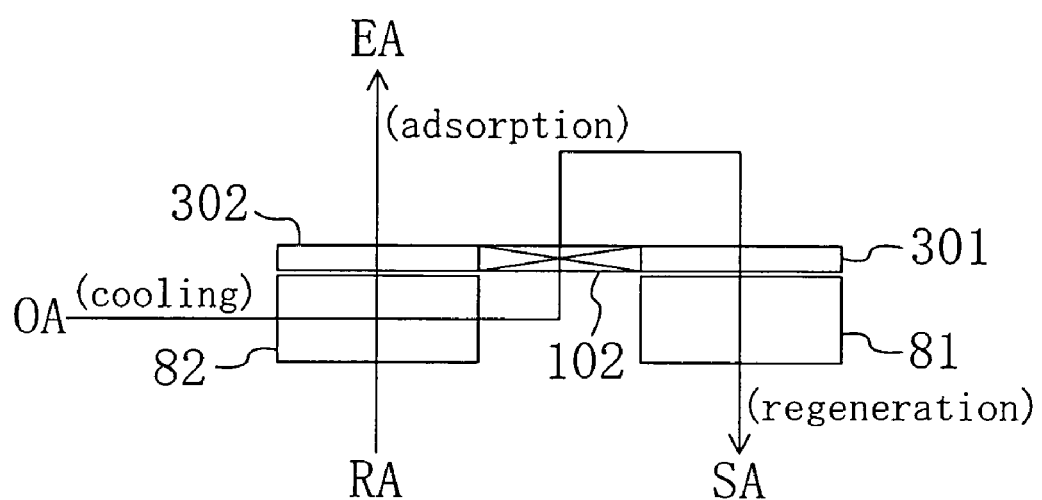
FIG. 11B is a conceptual view of the main portion showing second operation of the humidity control device according to the first modified example of the second embodiment.

In the above embodiment, the regeneration heat exchanger (102) stands upright between the first adsorption element (81) and the second adsorption element (82), but the layout of the regeneration heat exchanger (102) is not limited specifically. For example, as shown in FIG. 11A and FIG. 11B, the regeneration heat exchanger (102) may be arranged transversely so that the air flows vertically in the heat exchange.

Second Modified Example

Figure 12A:
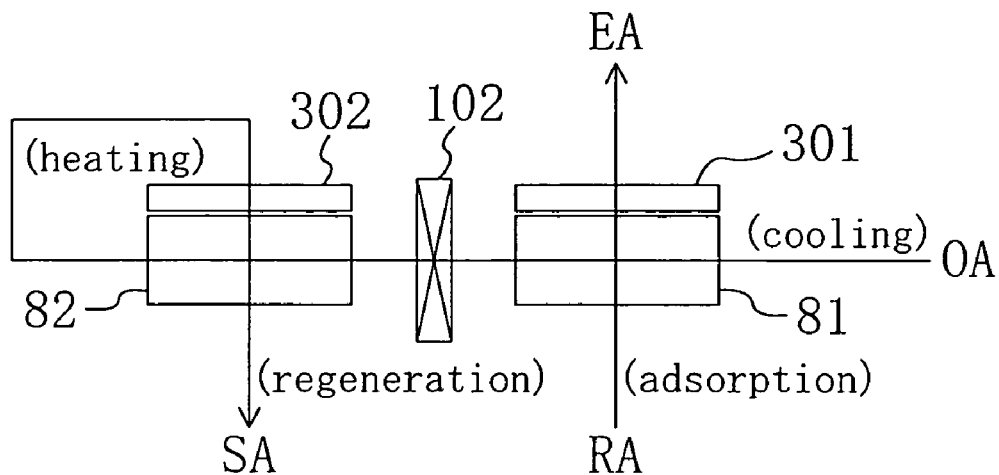
FIG. 12A is a conceptual view of the main portion showing first operation of a humidity control device according to the second modified example of the second embodiment.
Figure 12B:
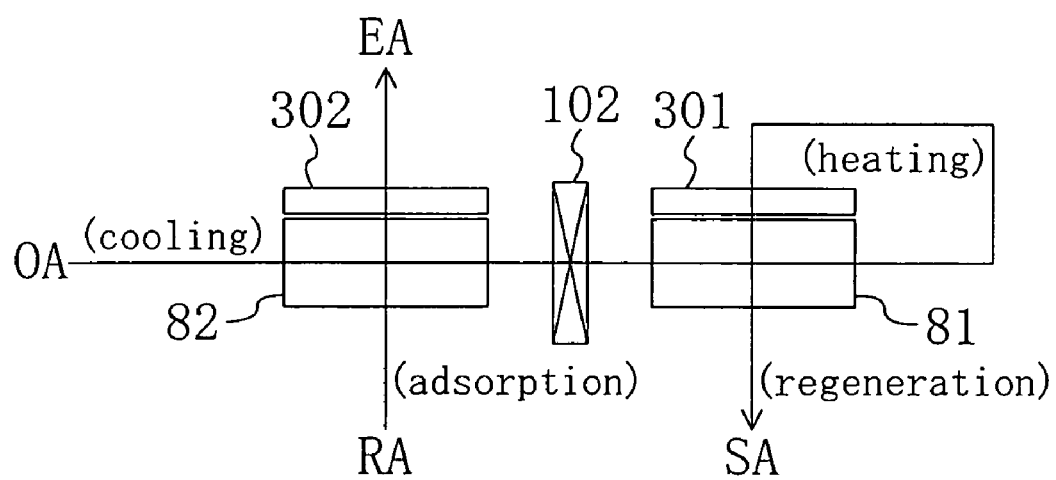
FIG. 12B is a conceptual view of the main portion showing second operation of the humidity control device according to the second modified example of the second embodiment.

The air heated by the regeneration heat exchanger (102) is immediately introduced into the humidity control side paths (85) of the adsorption element (81, 82) in the above embodiment. However, as shown in FIG. 12A and FIG. 12B, the air heated by the regeneration heat exchanger (102) may be once introduced into the cooling side paths (86) of the adsorption element (81, 82), and then, be introduced into the humidity control side paths (85). With this arrangement, the adsorption element (81, 82) to be regenerated can be heated efficiently, thereby increasing the regeneration efficiency.

Third Modified Example

Figure 13A:
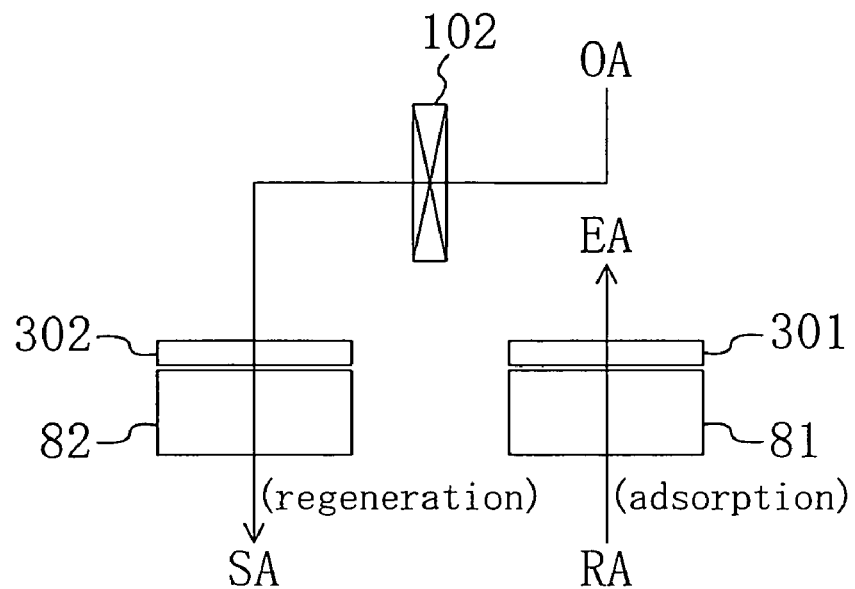
FIG. 13A is a conceptual view of the main portion showing first operation of a humidity control device according to the third modified example of the second embodiment.
Figure 13B:
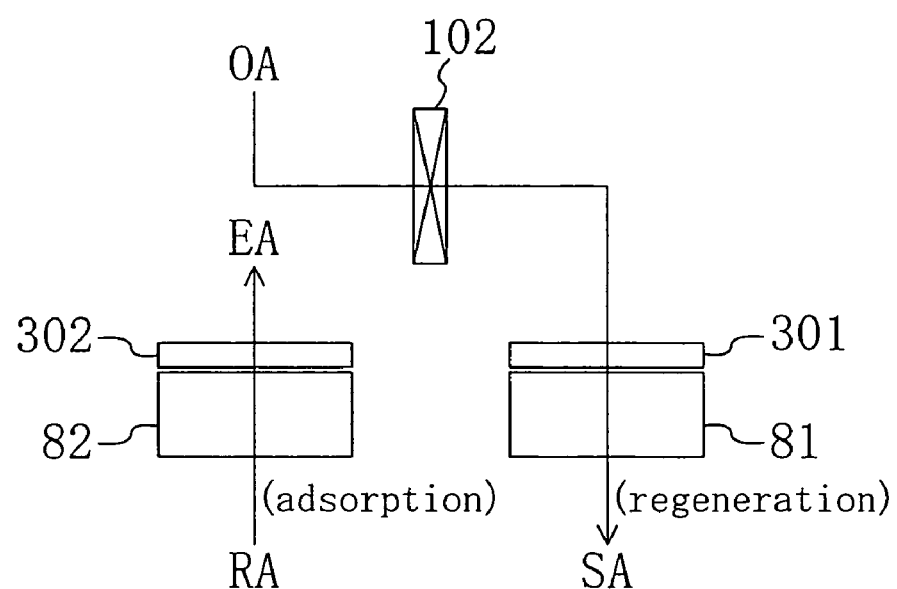
FIG. 13B is a conceptual view of the main portion showing second operation of the humidity control device according to the third modified example of the second embodiment.

Each adsorption element (81, 82) in the above embodiment includes the humidity control side paths (85) and the cooling side paths (86). However, the adsorption elements (81, 82) each including the humidity control side paths (85) only may be employed, as shown in FIG. 13A and FIG. 13B.

Fourth Modified Example

Two independent adsorption elements, that is, the first adsorption element (81) and the second adsorption element (82) are provided in the above embodiment. However, a single adsorption element may be provided in the present invention.

Figure 14:
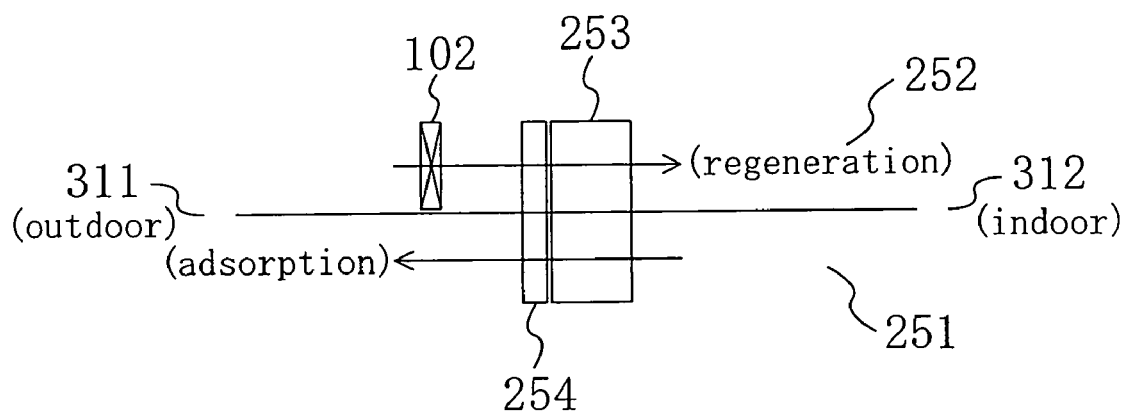
FIG. 14 is a conceptual view of the main portion of a humidity control device according to the fourth modified example of the second embodiment.

A single rotary adsorption element (253) composing the air conditioning element may be arranged over an adsorption path (251) and a regeneration path (252), as shown in FIG. 14. In this modified embodiment, a rotary filter (254) that rotates integrally with the rotary adsorption element (253) is provided on the outdoor side of the rotary adsorption element (253). The regeneration heat exchanger (102) is provided on the outdoor side of the rotary adsorption element (253) in the regeneration path (252).

In the present modified example, outdoor air sucked in the regeneration path (252) is heated by the regeneration heat exchanger (102), is cleaned by the filter (254), and then, is humidified by the rotary adsorption element (253). Subsequently, the cleaned and humidified air is supplied indoors. On the other hand, room air sucked in the adsorption path (251) passes through the rotary adsorption element (253) to be dehumidified by the rotary adsorption element (253). Then, the air dehumidified by the rotary adsorption element (253) passes through the filter (254). At this time, dust and the like adhered to the filter (254) are removed from the filter (254) by the aforementioned air.

Hence, according to the present modified example, the adsorption and regeneration of the adsorption element can be performed continuously with no batch operation needed. Also, dust capture and cleaning for the filter (254) can be performed continuously.

Third Embodiment

A humidity control device of the third embodiment performs indoor ventilation while selectively performing indoor dehumidification and humidification. As shown in FIG. 15A to FIG. 15D, first filters (301a, 301b) are provided on the lower and upper faces of the first adsorption element (81), respectively, and the second filters (302a, 302b) are provided on the lower and upper faces of the second adsorption element (82), respectively, in the humidity control device according the third embodiment. The constitution thereof is the same as that in the humidity control device (1) in the first embodiment, other than the each layout position of the filters (301a, 301b, 302a, 302b). Accordingly, the description of the other constitution is omitted.

Figure 15A:
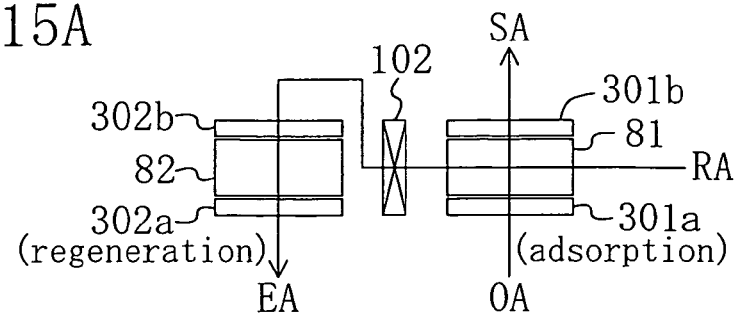
FIG. 15A is a conceptual view of the main portion showing first operation in dehumidification of a humidity control device according to the third embodiment.
Figure 15B:
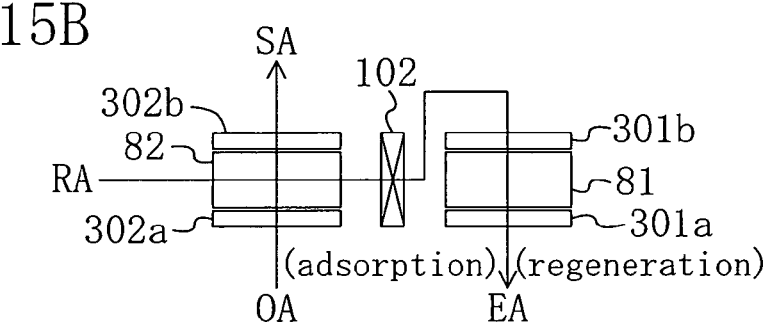
FIG. 15B is a conceptual view of the main portion showing second operation in dehumidification of the humidity control device according to the third embodiment.
Figure 15C:
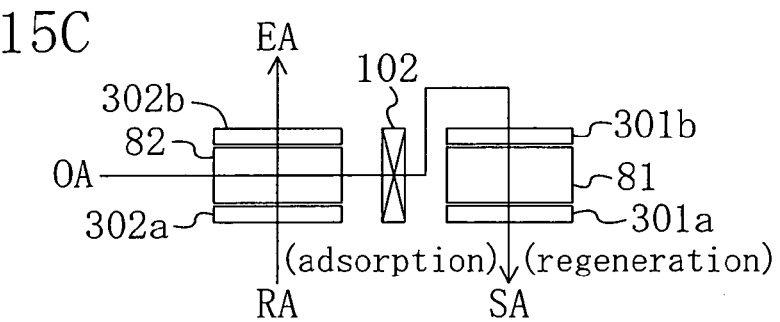
FIG. 15C is a conceptual view of the main portion showing first operation in humidification of the humidity control device according to the third embodiment.

The present humidity control device performs the same operation as that of the humidity control device (1) of the first embodiment in dehumidification operation. Namely, first operation shown in FIG. 15A and second operation shown in FIG. 15B are performed alternately during dehumidification operation.

Figure 15D:
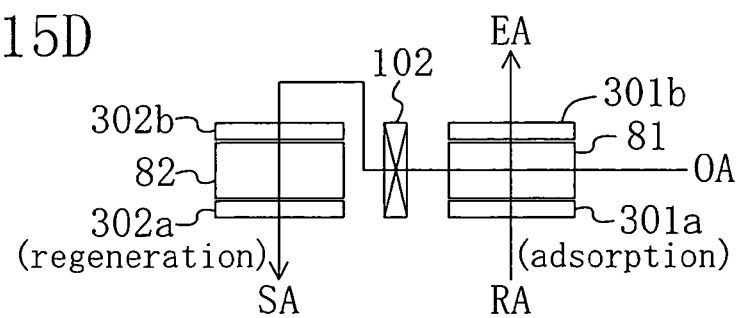
FIG. 15D is a conceptual view of the main portion showing second operation in humidification of the humidity control device according to the third embodiment.

On the other hand, the present humidity control device performs the same operation as that of the humidity control device (2) of the second embodiment in humidification operation. Namely, first operation shown in FIG. 15C and second operation shown in FIG. 15D are performed alternately during humidification operation.

According to the present embodiment, the effects in both the first and second embodiments can be attained. In addition, in the present embodiment, the filters (301a, 301b, 302a, 302b) are provided on the upper and lower faces of each adsorption element (81, 82), so that not only dust and the like from the outside of the room but also dust and the like from the room can be removed. Consequently, the performance degradation of the adsorption elements (81, 82) can be further prevented, thereby further extending the lifetime of the adsorption elements (81, 82).

First Modified Example

Figure 16A:
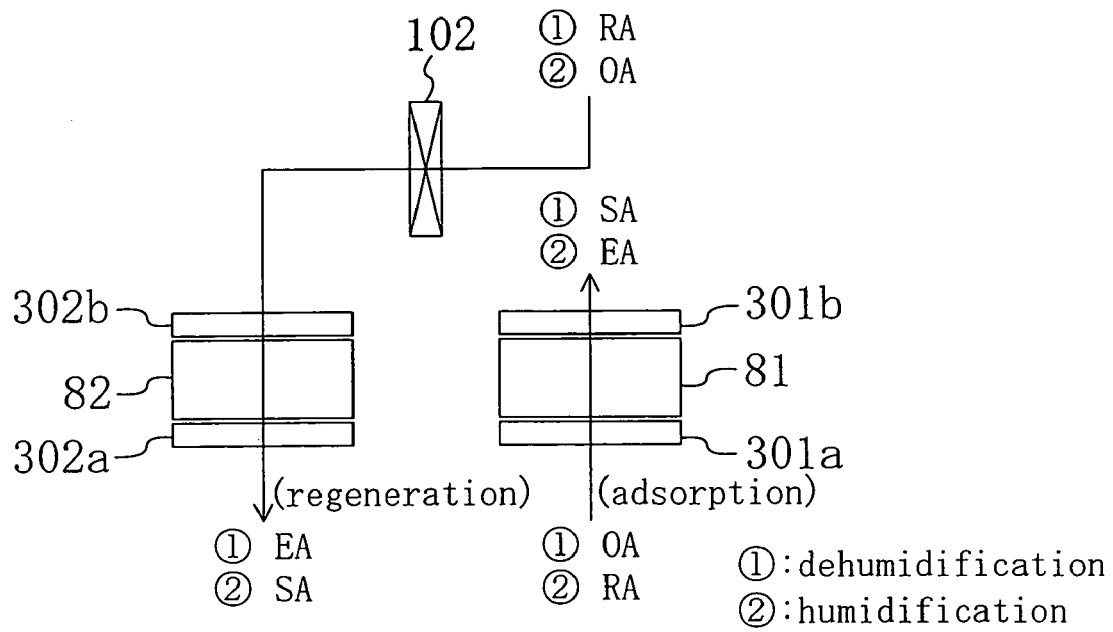
FIG. 16A is a conceptual view of the main portion showing first operation of a humidity control device according to the first modified example of the third embodiment.
Figure 16B:
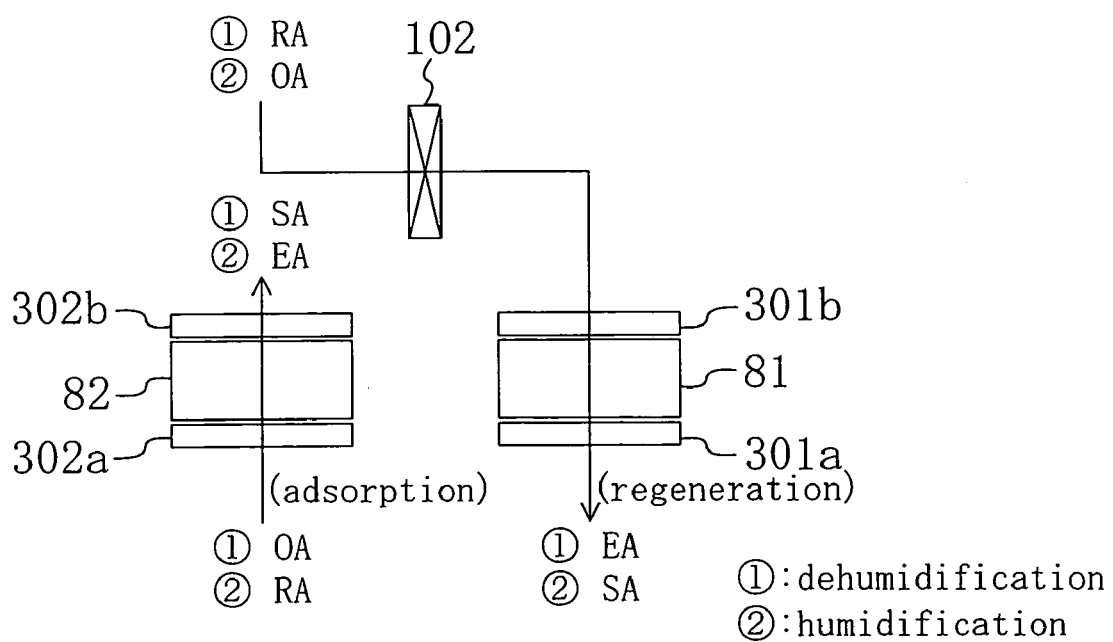
FIG. 16B is a conceptual view of the main portion showing second operation of the humidity control device according to the first modified example of the third embodiment.

Each adsorption element (81, 82) in the above embodiment includes the humidity control side paths (85) and the cooling side paths (86). However, adsorption elements (81, 82) each including the humidity control side paths (85) only may be employed, as shown in FIG. 16A and FIG. 16B.

Second Modified Example

Figure 17A:
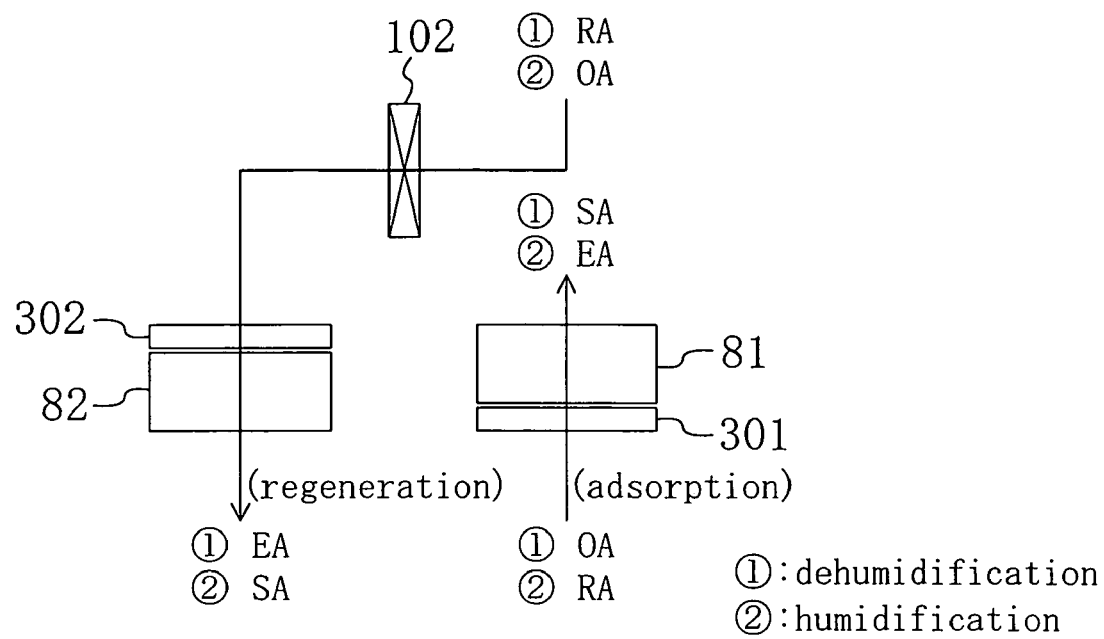
FIG. 17A is a conceptual view of the main portion showing first operation of a humidity control device according to the second modified example of the third embodiment.
Figure 17B:
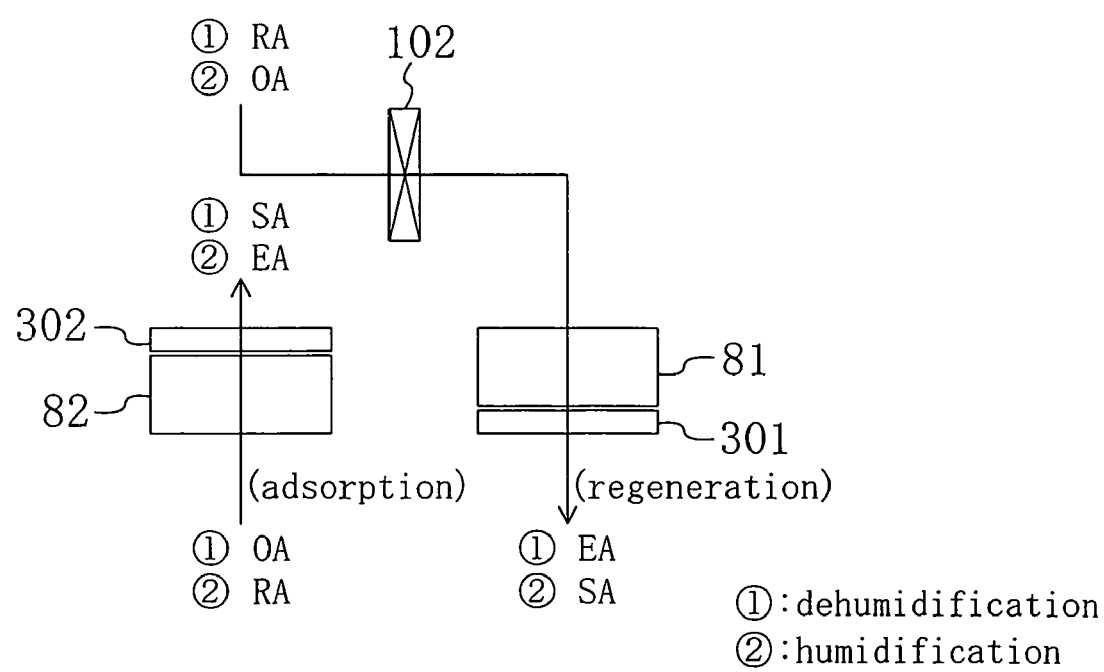
FIG. 17B is a conceptual view of the main portion showing second operation of the humidity control device according to the second modified example of the third embodiment.

As shown in FIG. 17A and FIG. 17B, it is possible to provide the first filter (301) on the lower face of one (81) of the adsorption elements while providing the second filter (302) on the upper face of the other adsorption element (82).

Other Embodiments of the Invention

The embodiments of the present invention are not limited to the above embodiments, and the other embodiments are possible, of course.

Modified Example 1

Figure 18A:
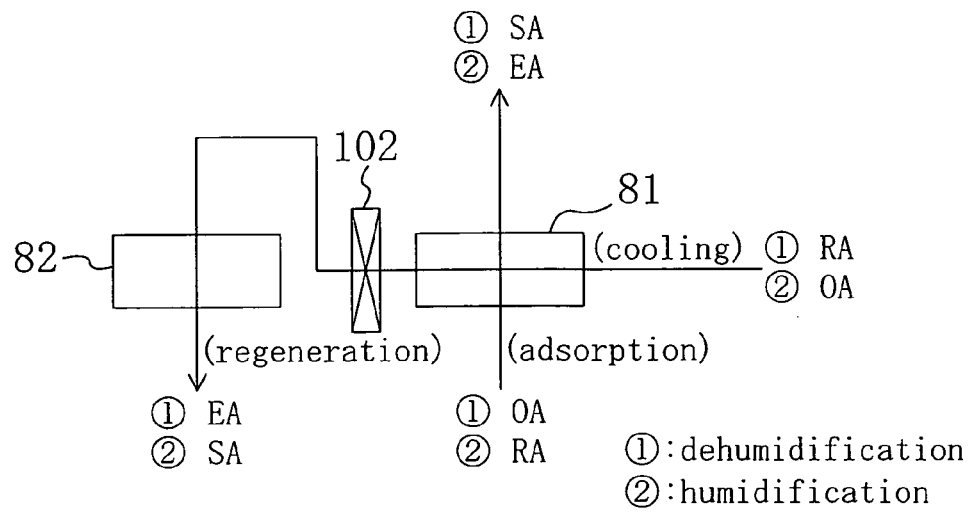
FIG. 18A is a view showing an air flowing state during first operation of a ventilation system according to Modified Example 1.
Figure 18B:
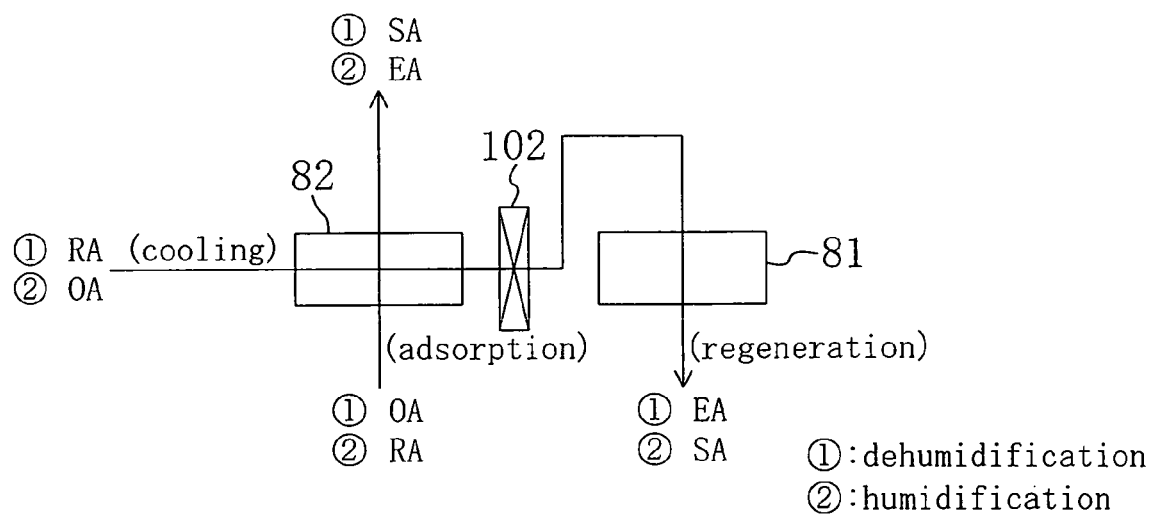
FIG. 18B is a view showing an air flowing state during second operation of the ventilation system according to Modified Example 1.

The air flowing states in the above embodiments are as shown in FIG. 18A and FIG. 18B, but the air flowing states in the humidity control device according to the present invention is not limited to the above states. Other air flowing states will be described below by giving some examples. Wherein, the filters are not illustrated in FIG. 18 to FIG. 28, but the filters may be arranged on the upper face or the lower face of the adsorption elements. Further, it is possible to arrange the filters on both the upper and lower faces of the adsorption elements.

Figure 19A:
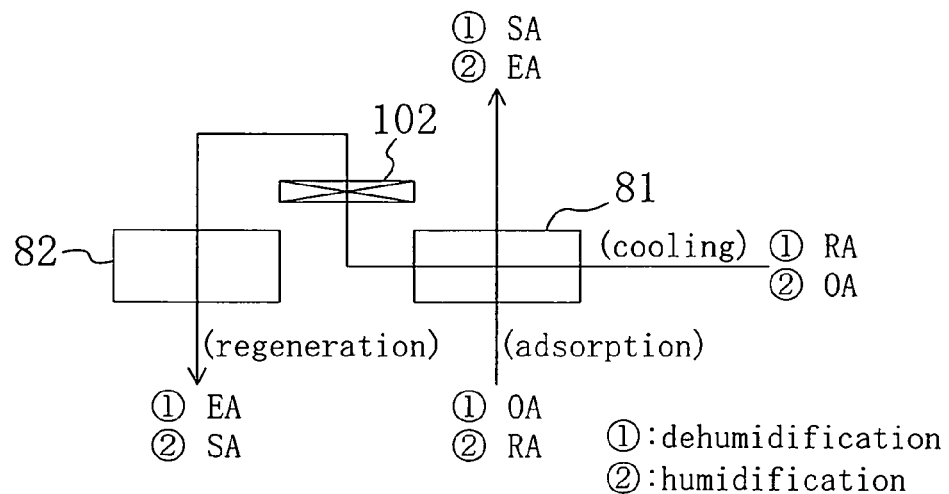
FIG. 19A is a view showing an air flowing state during first operation of a ventilation system according to Modified Example 1.
Figure 19B:
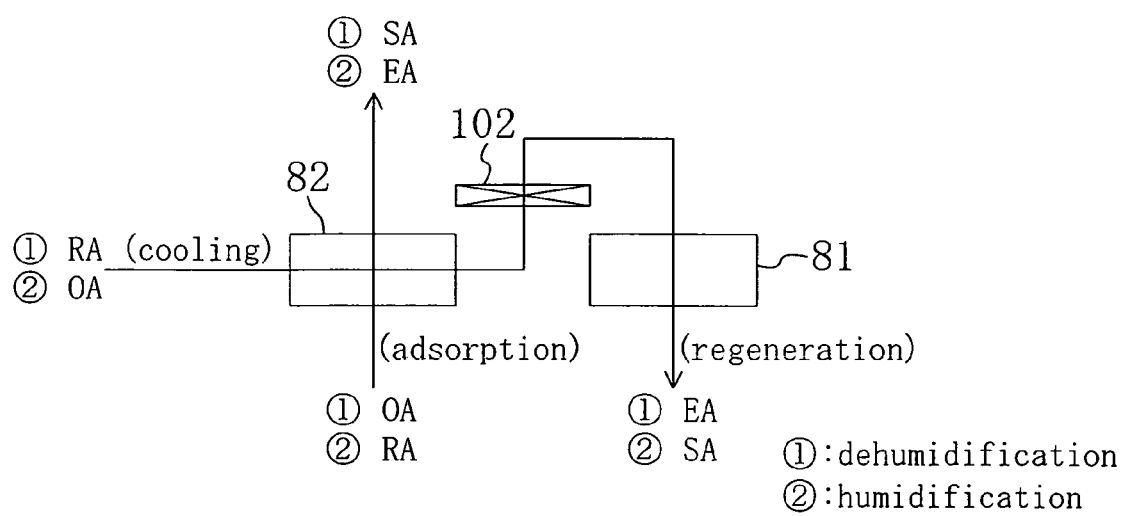
FIG. 19B is a view showing an air flowing state during second operation of the ventilation system according to Modified Example 1.

The example illustrated in FIG. 19A and FIG. 19B is that: the first adsorption element (81) and the second adsorption element (82) are arranged transversely, and the regeneration heat exchanger (102) is arranged transversely between the first adsorption element (81) and the second adsorption element (82).

In this example, the first operation and the second operation are performed alternately. During the first operation in the present example, one of the airs flows upward through the humidity control side paths (85) of the first adsorption element (81) for adsorption, while the other air flows downward through the humidity control side paths (85) of the second adsorption element (82) for regeneration (see FIG. 19A). During the second operation, one of the air flows downward through the first adsorption element (81) for regeneration, while the other air flows upward through the humidity control side paths (85) of the second adsorption element (82) for adsorption (see FIG. 19B).

Figure 20A:
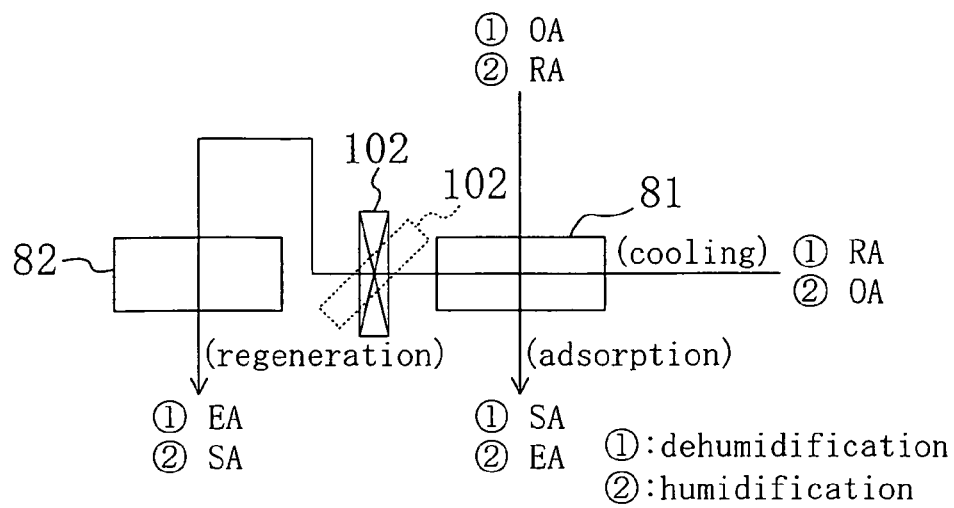
FIG. 20A is a view showing an air flowing state during first operation of a ventilation system according to Modified Example 1.
Figure 20B:
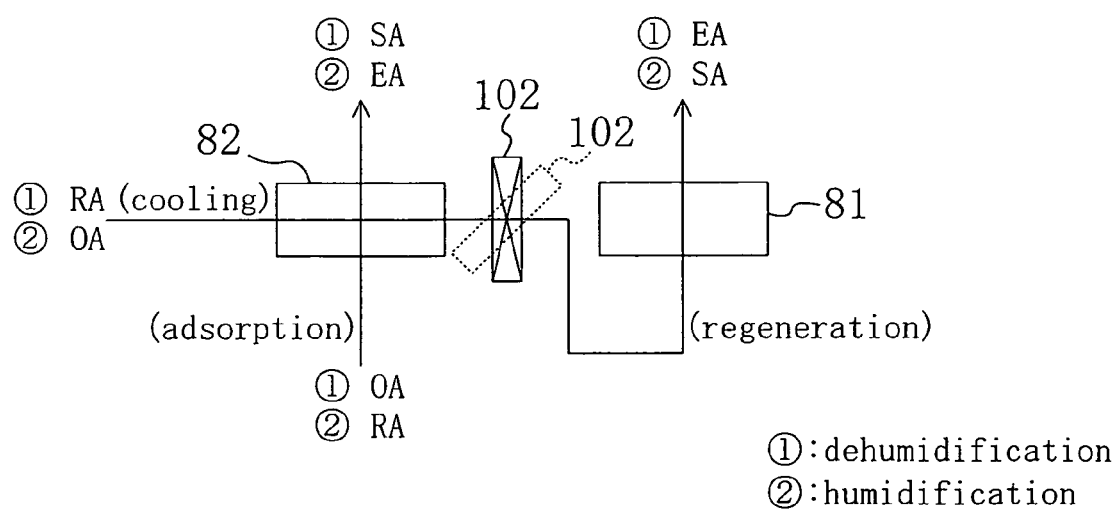
FIG. 20B is a view showing an air flowing state during second operation of the ventilation system according to Modified Example 1.

The example illustrated in FIG. 20A and FIG. 20B is that: the first adsorption element (81) and the second adsorption element (82) are arranged transversely, and the regeneration heat exchanger (102) is arranged vertically between the first adsorption element (81) and the second adsorption element (82). It is noted that the regeneration heat exchanger (102) may be arranged obliquely, of course, as shown by the broken lines.

In the present modified example, also, the first operation and the second operation are performed alternately. During the first operation in the present example, one of the airs flows downward through the humidity control side paths (85) of the first adsorption element (81) for adsorption, while the other air flows downward through the humidity control side paths (85) of the second adsorption element (82) for regeneration (see FIG. 20A). During the second operation, one of the airs flows upward through the humidity control side paths (85) of the first adsorption element (81) for regeneration, while the other air flows upward through the humidity control side paths (85) of the second adsorption element (82) for adsorption (see FIG. 20B).

Figure 21A:
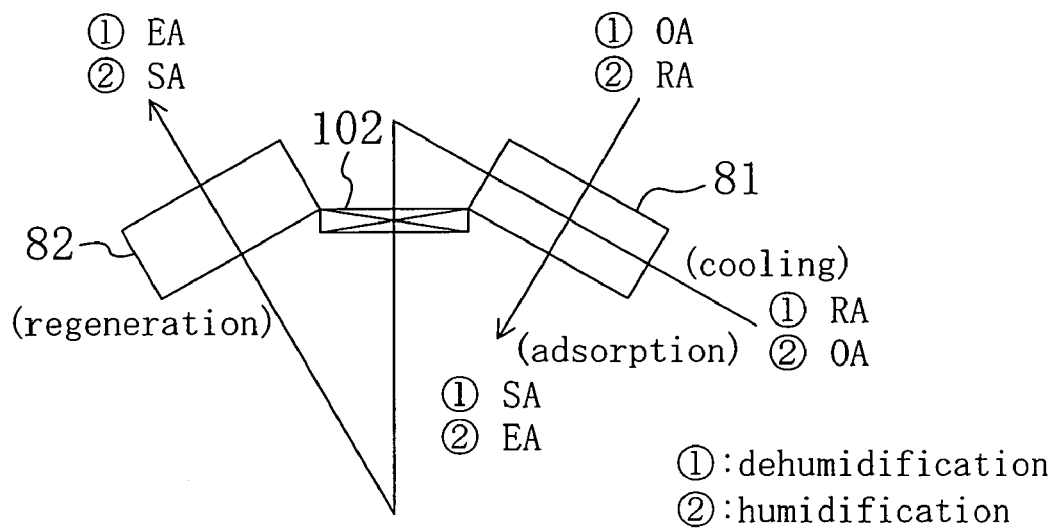
FIG. 21A is a view showing an air flowing state during first operation of a ventilation system according to Modified Example 1.
Figure 21B:
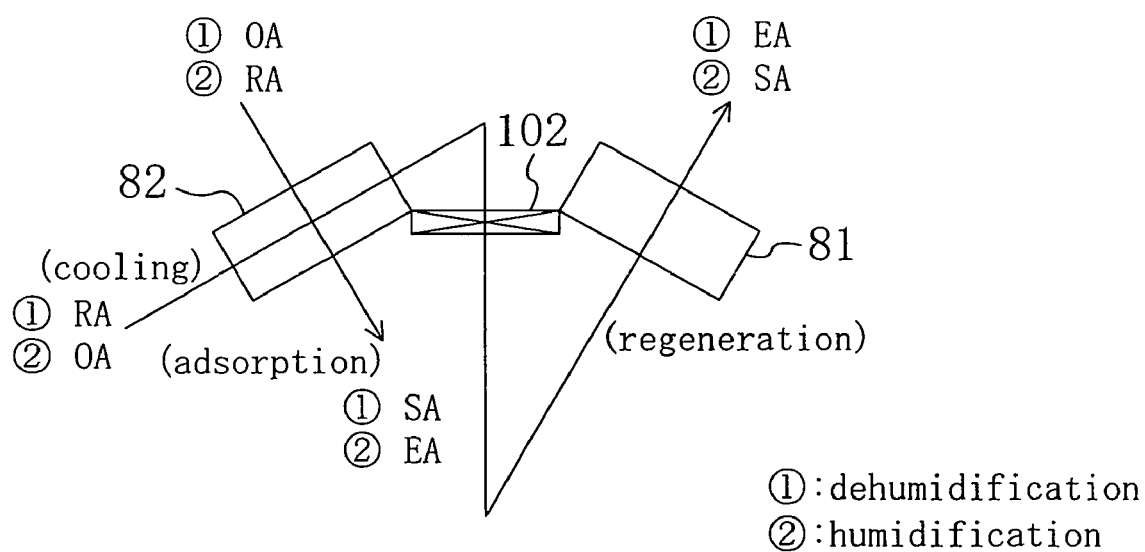
FIG. 21B is a view showing an air flowing state during second operation of the ventilation system according to Modified Example 1.

The example illustrated in FIG. 21A and FIG. 21B is that: the first adsorption element (81) and the second adsorption element (82) are inclined opposite to each other in the shape of an inverted separate V. The regeneration heat exchanger (102) is arranged transversely between the first adsorption element (81) and the second adsorption element (82).

In the present example, also, the first operation and the second operation are performed alternately. During the first operation in the present example, one of the airs flows obliquely downward through the humidity control side paths (85) of the first adsorption element (81) for adsorption, while the other air flows obliquely upward through the humidity control side paths (85) of the second adsorption element (82) for regeneration (see FIG. 21A). During the second operation, one of the airs flows obliquely upward through the humidity control side paths (85) of the first adsorption element (81) for regeneration, while the other air flows obliquely downward through the humidity control side paths (85) of the second adsorption element (82) for adsorption (see FIG. 21B).

Figure 22A:
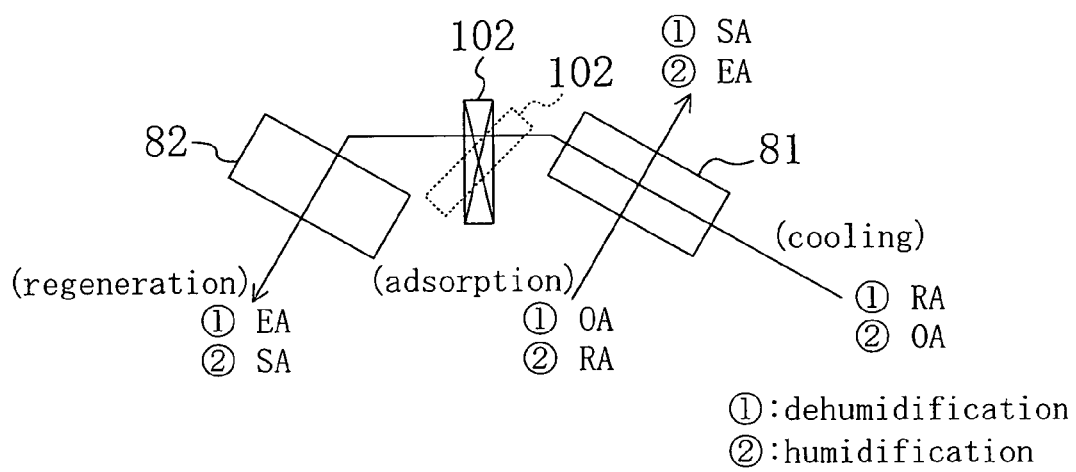
FIG. 22A is a view showing an air flowing state during first operation of a ventilation system according to Modified Example 1.
Figure 22B:
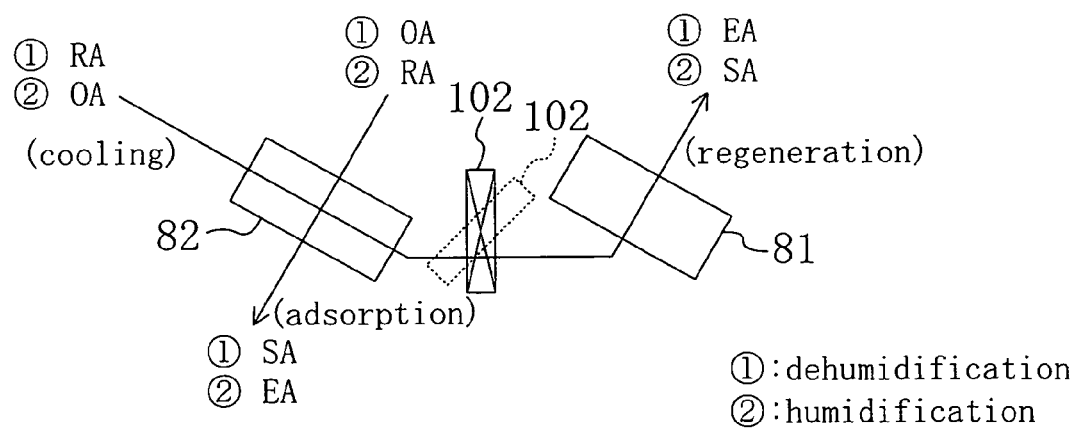
FIG. 22B is a view showing an air flowing state during second operation of the ventilation system according to Modified Example 1.

The example illustrated in FIG. 22A and FIG. 22B is that: the first adsorption element (81) and the second adsorption element (82) are inclined in the same direction, and the regeneration heat exchanger (102) is arranged vertically therebetween. It is noted that the regeneration heat exchanger (102) may be, of course, arranged obliquely, as shown by the broken lines.

In the present example, also, the first operation and the second operation are performed alternately. During the first operation in the present example, one of the airs flows obliquely upward through the humidity control side paths (85) of the first adsorption element (81) for adsorption, while the other air flows obliquely downward through the humidity control side paths (85) of the second adsorption element (82) for regeneration (see FIG. 22A). During the second operation, one of the airs flows obliquely upward through the humidity control side paths (85) of the first adsorption element (81) for regeneration, while the other air flows obliquely downward through the humidity control side paths (85) of the second adsorption element (82) for adsorption (see FIG. 22B).

Figure 23A:
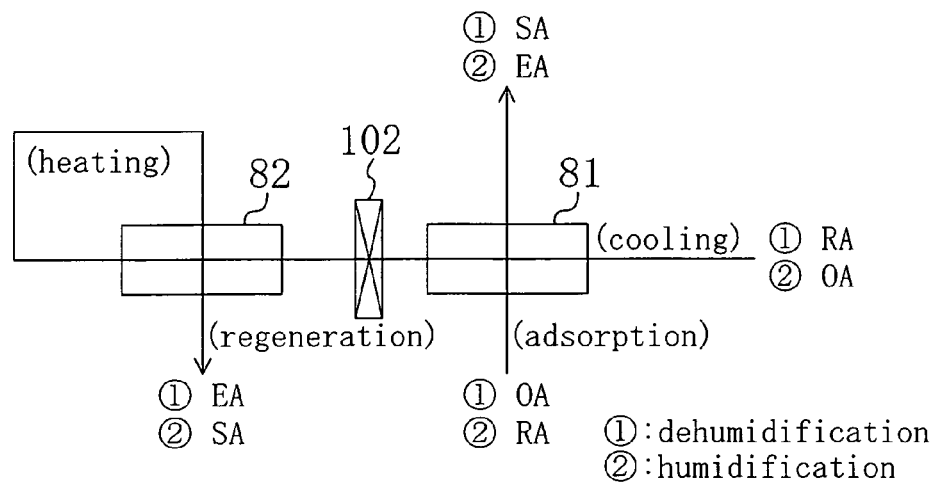
FIG. 23A is a view showing an air flowing state during first operation of a ventilation system according to Modified Example 1.
Figure 23B:
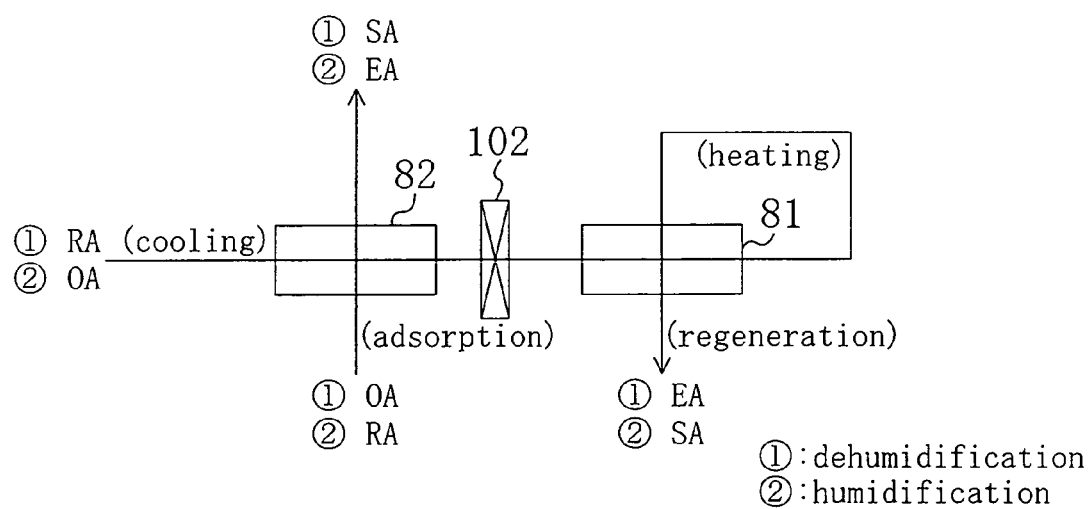
FIG. 23B is a view showing an air flowing state during second operation of the ventilation system according to Modified Example 1.

The example illustrated in FIG. 23A and FIG. 23B is that: the first adsorption element (81) and the second adsorption element (82) are arranged transversely, and the regeneration heat exchanger (102) is arranged vertically between the first adsorption element (81) and the second adsorption element (82).

In the present example, also, the first operation and the second operation are performed alternately. During the first operation in the present example, one of the airs flows upward through the humidity control side paths (85) of the first adsorption element (81) for adsorption, while the other air flows downward through the humidity control side paths (85) of the second adsorption element (82) for regeneration (see FIG. 23A). During the second operation, one of the airs flows downward through the humidity control side paths (85) of the first adsorption element (81) for regeneration, while the other air flows upward through the humidity control side paths (85) of the second adsorption element (82) for adsorption (see FIG. 23B).

Figure 24A:
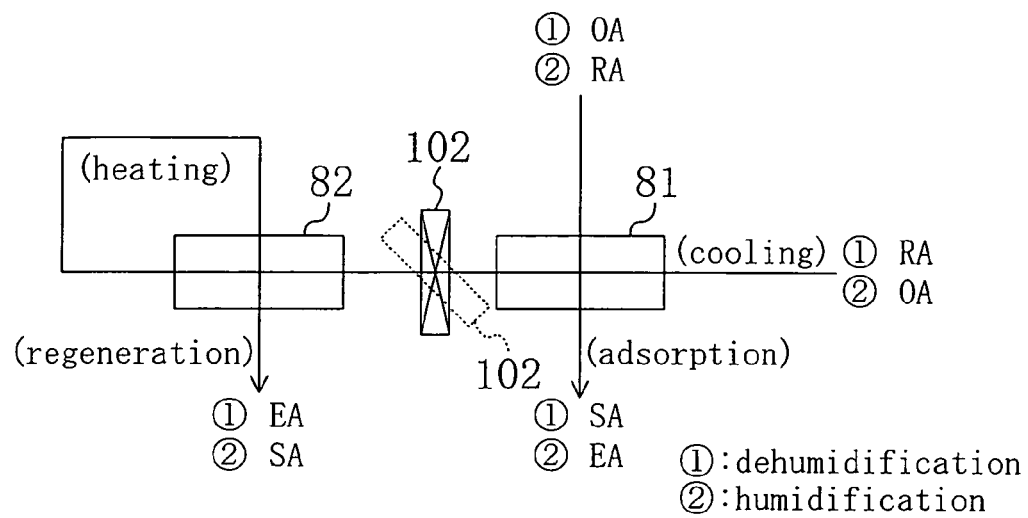
FIG. 24A is a view showing an air flowing state during first operation of a ventilation system according to Modified Example 1.
Figure 24B:
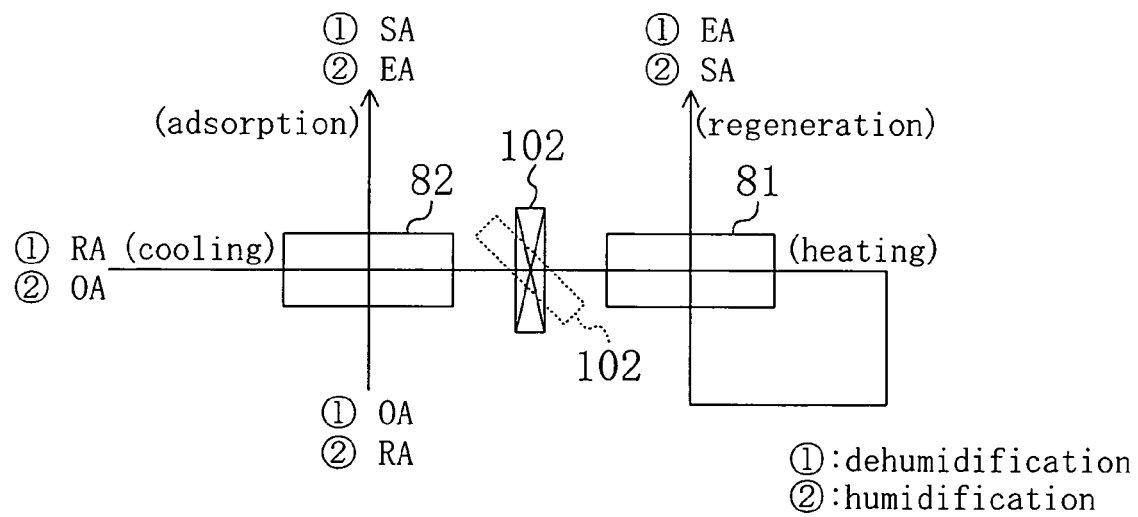
FIG. 24B is a view showing an air flowing state during second operation of the ventilation system according to Modified Example 1.

The example illustrated in FIG. 24A and FIG. 24B is that: the first adsorption element (81) and the second adsorption element (82) are arranged transversely, and the regeneration heat exchanger (102) is arranged vertically between the first adsorption element (81) and the second adsorption element (82). It is noted that the regeneration heat exchanger (102) may be arranged obliquely, of course, as indicated by the broken lines.

In the present example, also, the first operation and the second operation are performed alternately. During the first operation in the present example, one of the airs flows downward through the humidity control side paths (85) of the first adsorption element (81) for adsorption, while the other air flows downward through the humidity control side paths (85) of the second adsorption element (82) for regeneration (see FIG. 24A). During the second operation, one of the airs flows upward through the humidity control side paths (85) of the first adsorption element (81) for regeneration, while the other air flows upward through the humidity control side paths (85) of the second adsorption element (82) for adsorption (see FIG. 24B).

Figure 25A:
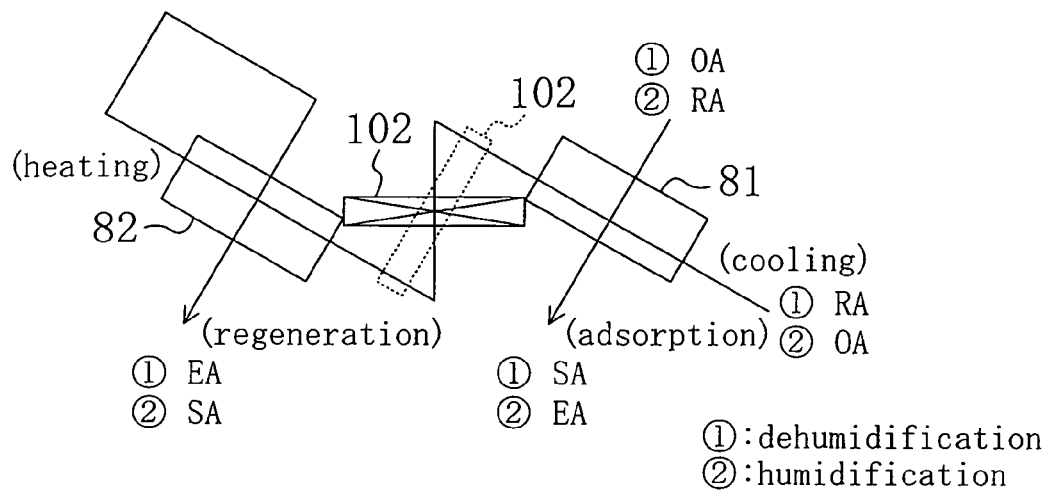
FIG. 25A is a view showing an air flowing state during first operation of a ventilation system according to Modified Example 1.
Figure 25B:
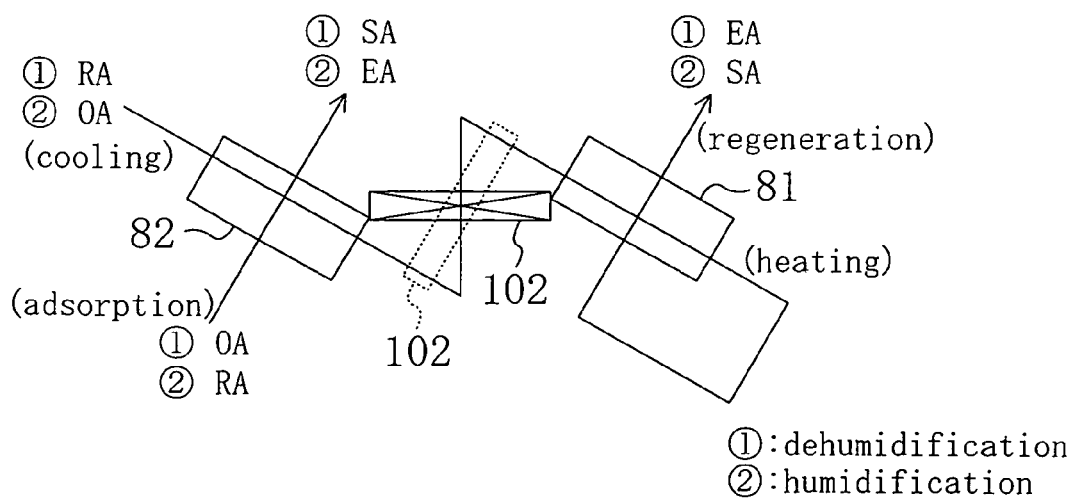
FIG. 25B is a view showing an air flowing state during second operation of the ventilation system according to Modified Example 1.

The example illustrated in FIG. 25A and FIG. 25B is that: the first adsorption element (81) and the second adsorption element (82) are inclined in the same direction, and the regeneration heat exchanger (102) is arranged transversely therebetween. It is noted that the regeneration heat exchanger (102) may be arranged obliquely, of course, as indicated by the broken lines.

In the present example, also, the first operation and the second operation are performed alternately. During the first operation in the present example, one of the airs flows obliquely downward through the humidity control side paths (85) of the first adsorption element (81) for adsorption, while the other air flows obliquely downward through the humidity control side paths (85) of the second adsorption element (82) for regeneration (see FIG. 25A). During the second operation, one of the airs flows obliquely upward through the humidity control side paths (85) of the first adsorption element (81) for regeneration, while the other air flows obliquely upward through the humidity control side paths (85) of the second adsorption element (82) for adsorption (see FIG. 25B).

Figure 26A:
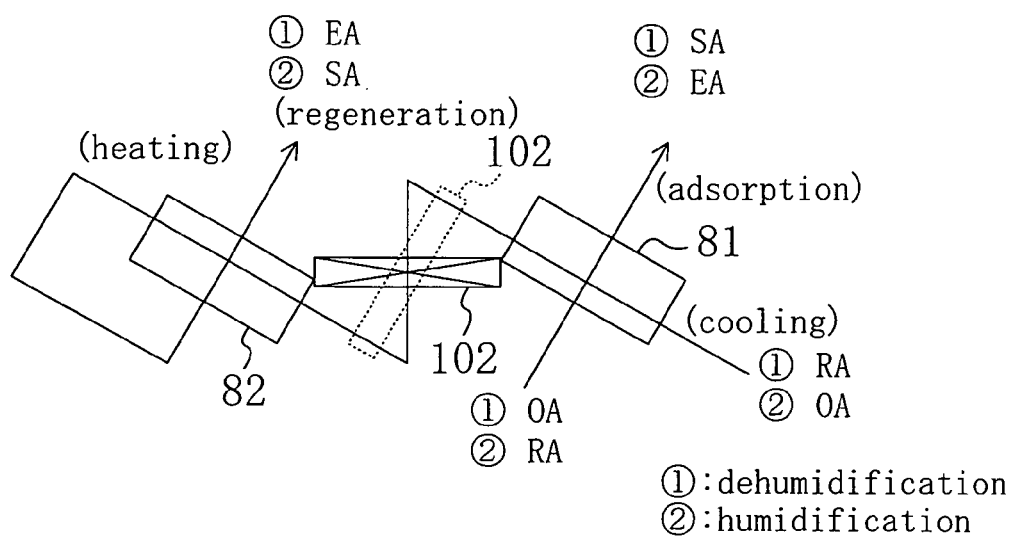
FIG. 26A is a view showing an air flowing state during first operation of a ventilation system according to Modified Example 1.
Figure 26B:
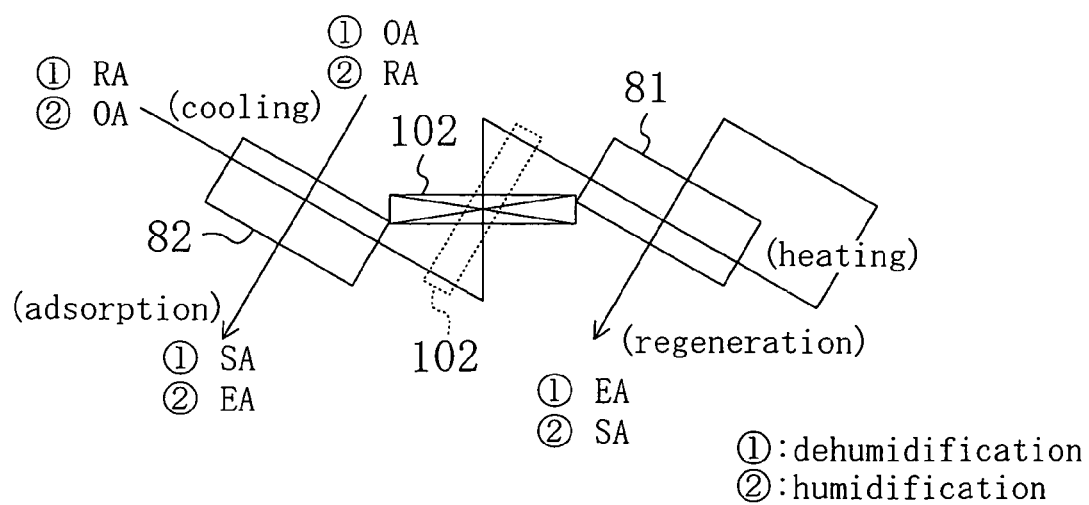
FIG. 26B is a view showing an air flowing state during second operation of the ventilation system according to Modified Example 1.

The example illustrated in FIG. 26A and FIG. 26B is that: the first adsorption element (81) and the second adsorption element (82) are inclined in the same direction, and the regeneration heat exchanger (102) is arranged transversely therebetween. It is noted that the regeneration heat exchanger (102) may be arranged obliquely, of course, as indicated by the broken lines.

In the present example, also, the first operation and the second operation are performed alternately. During the first operation in the present example, one of the airs flows obliquely upward through the humidity control side paths (85) of the first adsorption element (81) for adsorption, while the other air flows obliquely upward through the humidity control side paths (85) of the second adsorption element (82) for regeneration (see FIG. 26A). During the second operation, one of the airs flows obliquely downward through the humidity control side paths (85) of the first adsorption element (81) for regeneration, while the other air flows obliquely downward through the humidity control side paths (85) of the second adsorption element (82) for adsorption (see FIG. 26B).

Figure 27A:
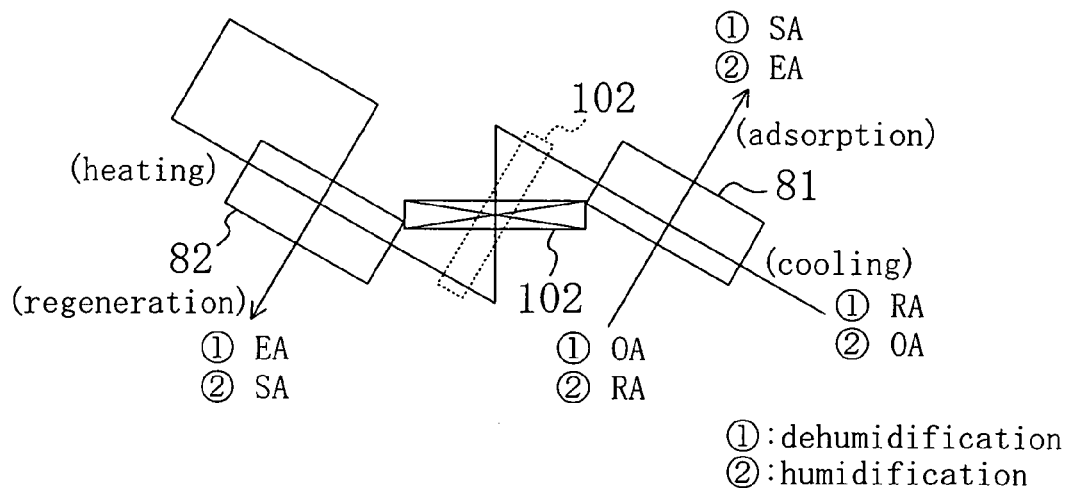
FIG. 27A is a view showing an air flowing state during first operation of a ventilation system according to Modified Example 1.
Figure 27B:
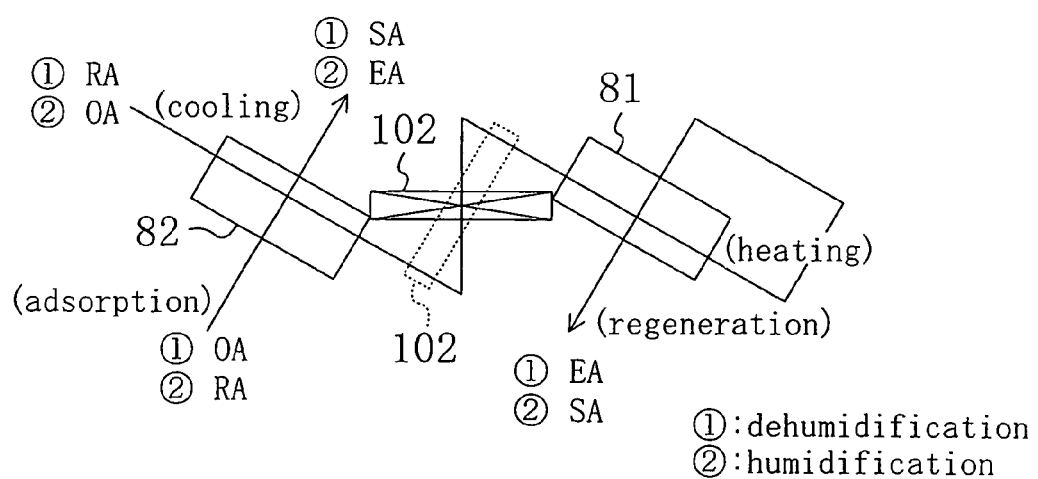
FIG. 27B is a view showing an air flowing state during second operation of the ventilation system according to Modified Example 1.

The example illustrated in FIG. 27A and FIG. 27B is that: the first adsorption element (81) and the second adsorption element (82) are inclined in the same direction, and the regeneration heat exchanger (102) is arranged transversally therebetween. It is noted that the regeneration heat exchanger (102) may be arranged obliquely, of course, as indicated by the broken lines.

In the present example, also, the first operation and the second operation are performed alternately. During the first operation in the present example, one of the airs flows obliquely upward through the humidity control side paths (85) of the first adsorption element (81) for adsorption, while the other air flows obliquely downward through the humidity control side paths (85) of the second adsorption element (82) for regeneration (see FIG. 27A). During the second operation, one of the airs flows obliquely downward through the humidity control side paths (85) of the first adsorption element (81) for regeneration, while the other air flows obliquely upward through the humidity control side paths (85) of the second adsorption element (82) for adsorption (see FIG. 27B).

Figure 28A:
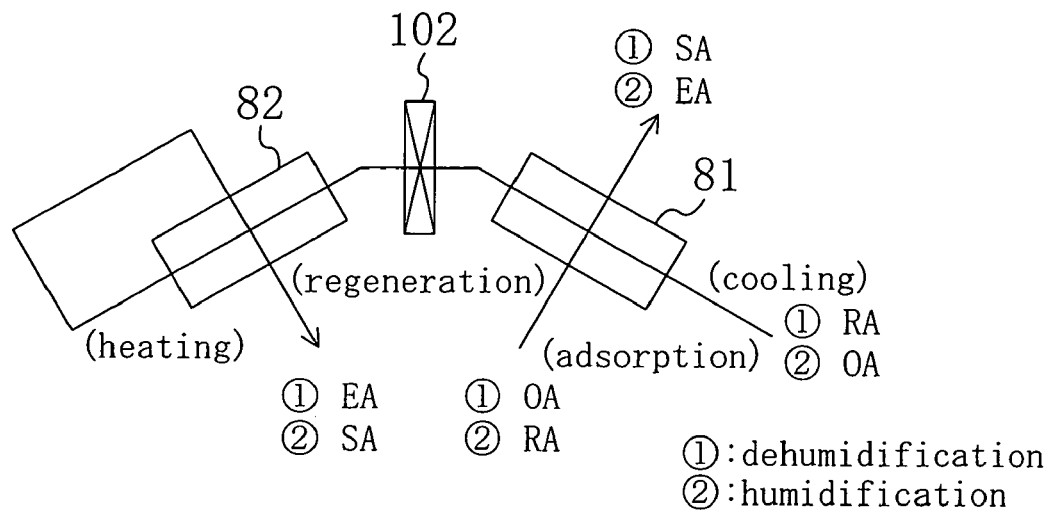
FIG. 28A is a view showing an air flowing state during first operation of the ventilation system according to Modified Example 1.
Figure 28B:
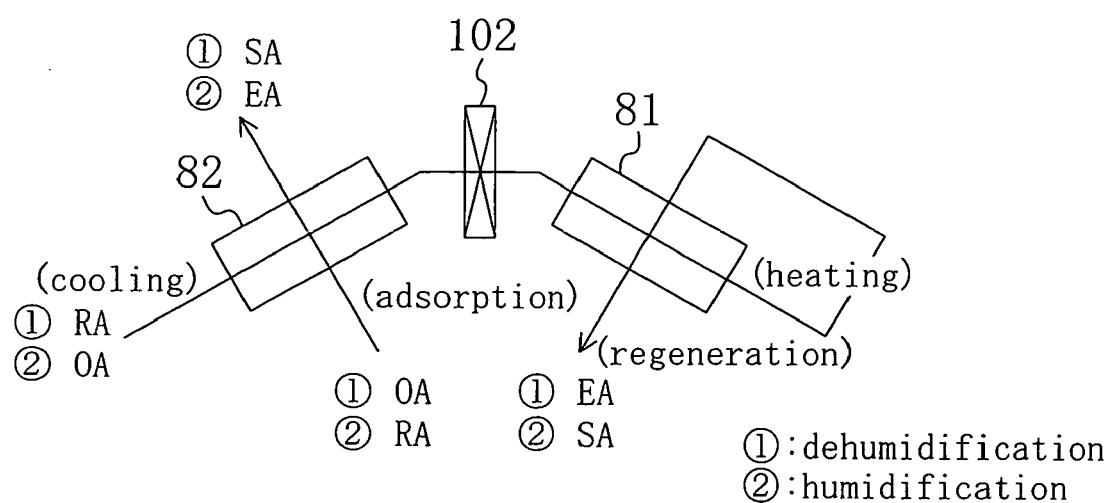
FIG. 28B is a view showing an air flowing state during second operation of the ventilation system according to Modified Example 1.

The example illustrated in FIG. 28A and FIG. 28B is that: the first adsorption element (81) and the second adsorption element (82) are inclined opposite to each other in the shape of an inversed separate V. The regeneration heat exchanger (102) is arranged vertically between the first adsorption element (81) and the second adsorption element (82).

In the present example, also, the first operation and the second operation are performed alternately. During the first operation in the present example, one of the airs flows obliquely upward through the humidity control side paths (85) of the first adsorption element (81) for adsorption, while the other air flows obliquely downward through the humidity control side paths (85) of the second adsorption element (82) for regeneration (see FIG. 28A). During the second operation, one of the airs flows obliquely downward through the humidity control side paths (85) of the first adsorption element (81) for regeneration, while the other air flows obliquely upward through the humidity control side paths (85) of the second adsorption element (82) for adsorption (see FIG. 28B).

Wherein, in each of the above embodiments and the modified examples, the regeneration heat exchanger (102) may be mere heating means for heating air, and is not limited to a heat exchanger for performing heat exchange between the refrigerant and air. For example, the above heating means may be a hot water coil, an electric heater, and the like.

Modified Example 2

Each of the above embodiments applies the present invention to a humidity control device that performs ventilation of indoor air and humidity control on air to be supplied indoors. However, applicable objects of the present invention are not limited to the humidity control devices of this kind.

First, the present invention is applicable also to humidity control devices that perform humidity control on room air only. In the humidity control devices of this kind, the first operation and the second operation are performed alternately in each of dehumidification operation and humidification operation.

Figure 29A:
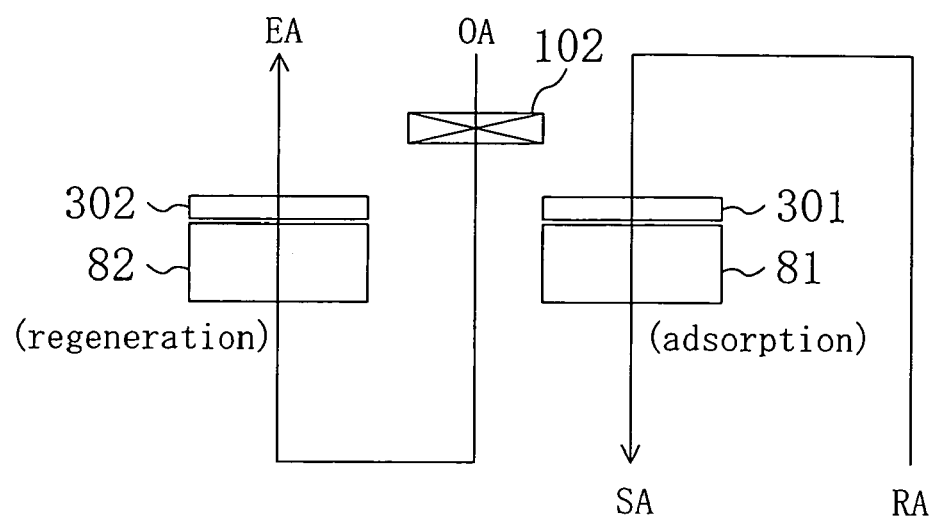
FIG. 29A is a view showing an air flowing state during first operation in dehumidification of a ventilation system according to Modified Example 2.

As shown in FIG. 29A, during the first operation in the dehumidification operation, room air is cleaned by the first filter (301), and then, flows into the first adsorption element (81). The room air is, then, dehumidified by the first adsorption element (81), and is returned into the room. On the other hand, outdoor air is heated by the regeneration heat exchanger (102), and then, flows into the second adsorption element (82) so that the high-temperature outdoor air regenerates the second adsorption element (82). The outdoor air flowing out from the second adsorption element (82) passes through the second filter (302). At this time, dust and the like are removed from the second filter (302). Then, the outdoor air is discharged outdoors together with the dust and the like removed from the second filter (302).

Figure 29B:
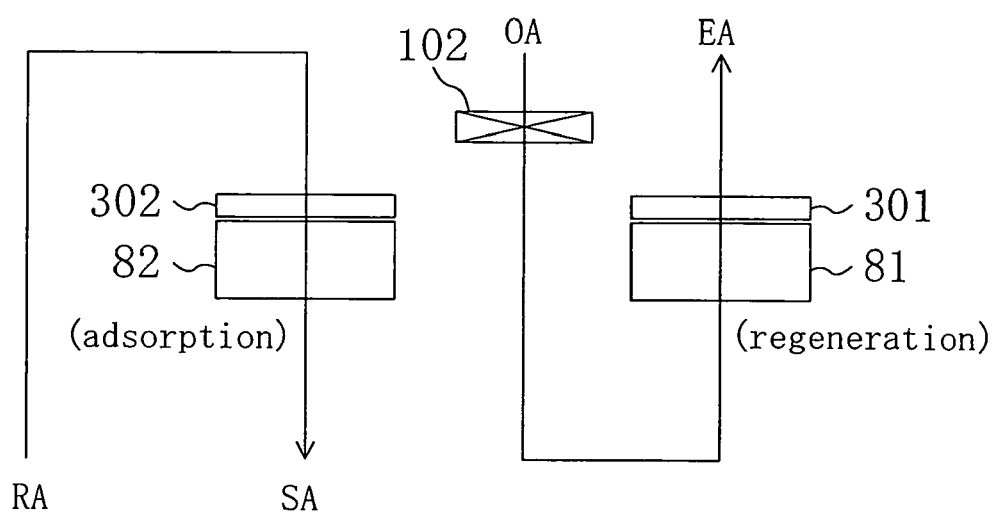
FIG. 29B is a view showing an air flowing state during second operation in dehumidification of the ventilation system according to Modified Example 2.

As shown in FIG. 29B, during the second operation in the dehumidification operation, room air is cleaned by the second filter (302), and then, flows into the second adsorption element (82). The room air is, then, dehumidified by the second adsorption element (82), and is returned into the room. On the other hand, outdoor air is heated by the regeneration heat exchanger (102), and then, flows into the first adsorption element (81) so that the high-temperature outdoor air regenerates the first adsorption element (81). The outdoor air flowing out from the first adsorption element (81) passes through the first filter (301). At this time, dust and the like is removed from the first filter (301). Then, the outdoor air is discharged outdoors together with the dust and the like removed from the first filter (301).

Figure 30A:
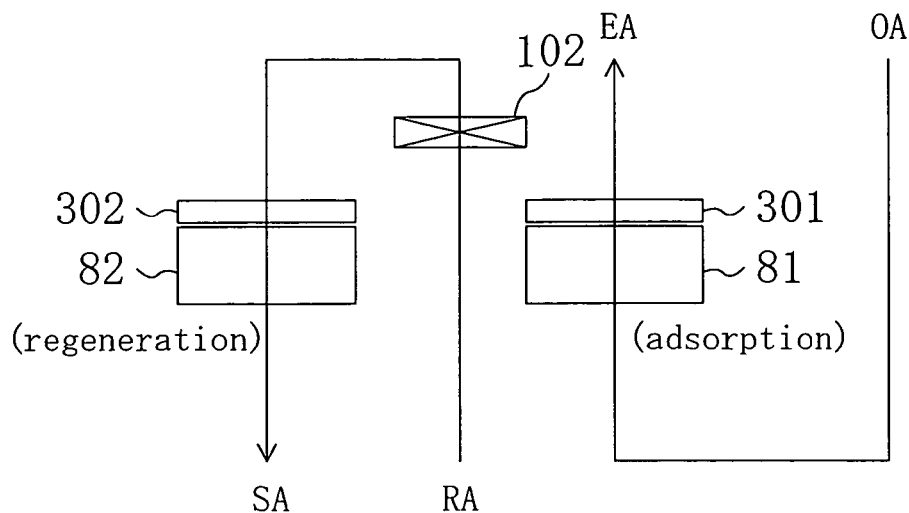
FIG. 30A is a view showing an air flowing state during first operation in humidification of the ventilation system according to Modified Example 2.

As shown in FIG. 30A, during the first operation in the humidification operation, room air is heated by the regeneration heat exchanger (102). The heated room air is cleaned by the second filter (302), and then, flows into the second adsorption element (82) so that the high-temperature room air regenerates the second adsorption element (82). Then, moisture desorbed from the second adsorption element (82) is provided to the room air, and the humidified room air is returned into the room. On the other hand, the outdoor air is dehumidified when passing through the first adsorption element (81). The outdoor air of which moisture is removed flows out from the first adsorption element (81), and passes through the first filter (301). At this time, dust and the like are removed from the first filter (301). Thereafter, the outdoor air is discharged outdoors together with the dust and the like removed from the first filter (301).

Figure 30B:
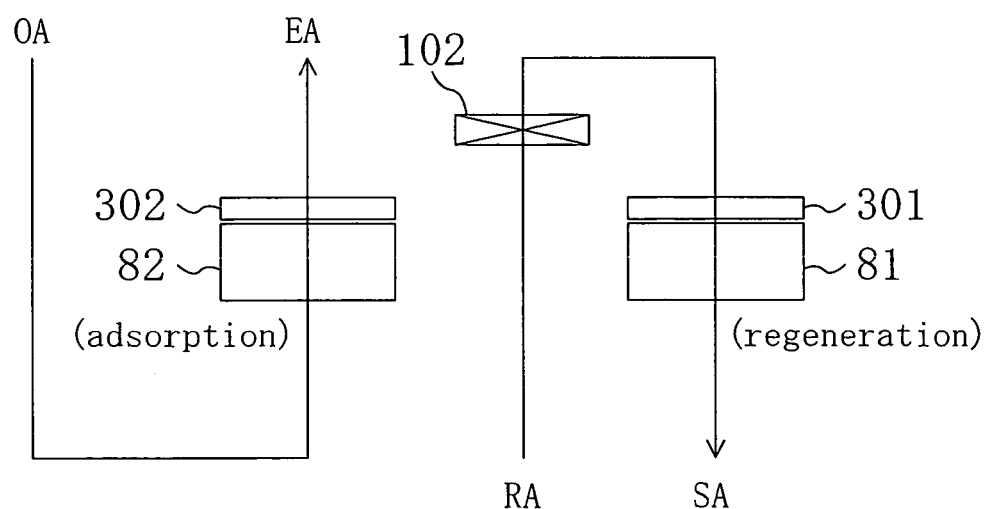
FIG. 30B is a view showing an air flowing state during second operation in humidification of the ventilation system according to Modified Example 2.

As shown in FIG. 30B, during the second operation in the humidification operation, room air is heated by the regeneration heat exchanger (102). The heated room air is cleaned by the first filter (301), and then, flows into the first adsorption element (81) so that the high-temperature room air regenerates the first adsorption element (81). Then, moisture desorbed from the first adsorption element (81) is provided to the room air, and the humidified room air is returned into the room. On the other hand, outdoor air is dehumidified when passing through the second adsorption element (82). The outdoor air of which moisture is removed flows out from the second adsorption element (82), and passes through the second filter (302). At this time, dust and the like is removed from the second filter (302). Thereafter, the outdoor air is discharged outdoors together with the dust and the like removed from the second filter (302).

Further, the present invention is applicable to humidity control devices that perform introduction of outdoor air into a room and humidity control of the outdoor air to be introduced into the room. The humidity control devices of this kind perform the first operation and the second operation alternately in each of the dehumidification operation and the humidification operation.

Figure 31A:
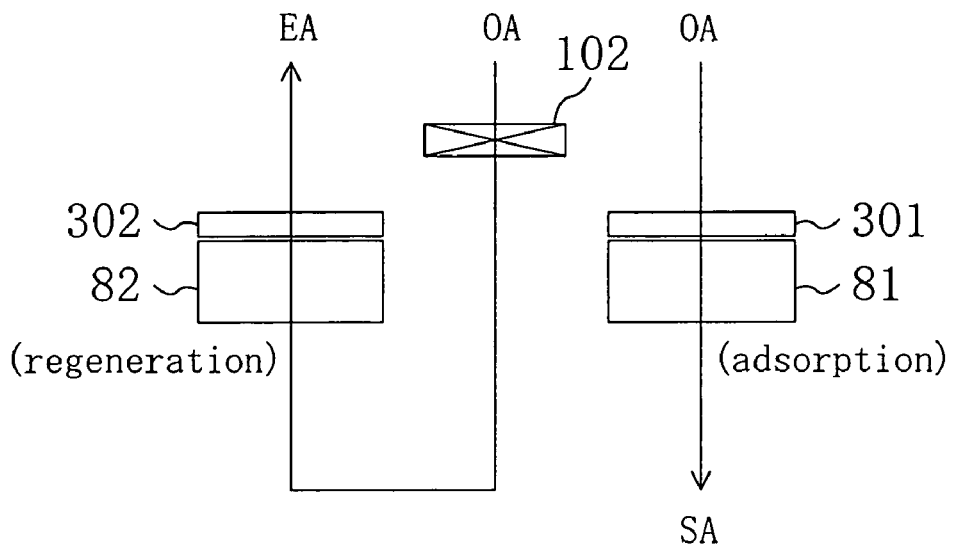
FIG. 31A is a view showing an air flowing state during first operation in dehumidification of a ventilation system according to Modified Example 2.

As shown in FIG. 31A, during the first operation in the dehumidification operation, outdoor air is cleaned by the first filter (301), and then, flows into the first adsorption element (81). The outdoor air is supplied indoors after dehumidification by the first adsorption element (81). Independently therefrom, the outdoor air is heated by the regeneration heat exchanger (102), and then, flows into the second adsorption element (82) so that the high-temperature outdoor air regenerates the second adsorption element (82). This outdoor air flows out from the second adsorption element (82), and then, passes through the second filter (302). At this time, dust and the like are removed from the second filter (302). Thereafter, the outdoor air is discharged outdoors together with the dust and the like removed from the second filter (302).

Figure 31B:
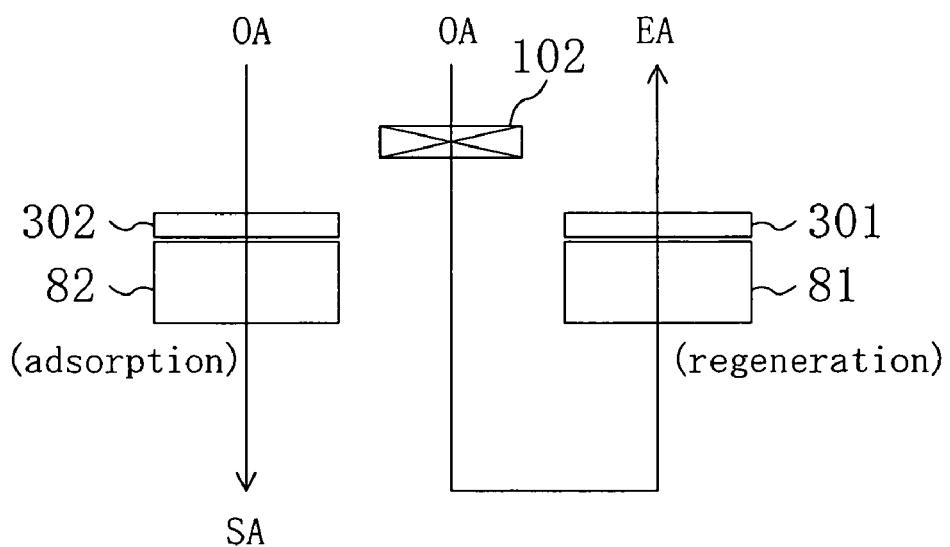
FIG. 31B is a view showing an air flowing state during second operation in dehumidification of the ventilation system according to Modified Example 2.

As shown in FIG. 31B, during the second operation in the dehumidification operation, outdoor air is cleaned by the second filter (302), and then, flows into the second adsorption element (82). The outdoor air is supplied indoors after dehumidification by the second adsorption element (82). Independently therefrom, the outdoor air is heated by the regeneration heat exchanger (102), and then, flows into the first adsorption element (81) so that the high-temperature outdoor air regenerates the first adsorption element (81). This outdoor air flows out from the first adsorption element (81), and then, passes through the first filter (301). At this time, dust and the like are removed from the first filter (301). Thereafter, the outdoor air is discharged outdoors together with the dust and the like removed from the first filter (301).

Figure 32A:
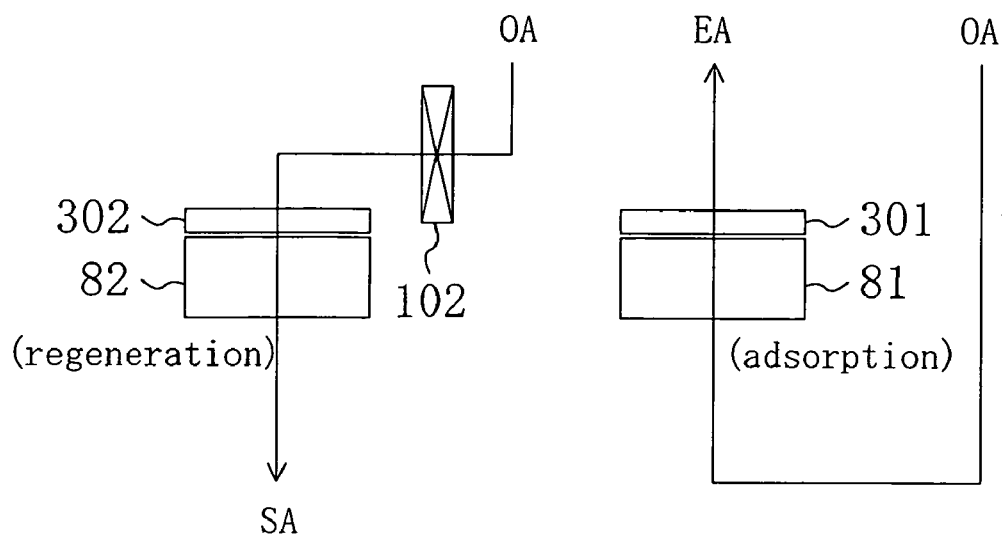
FIG. 32A is a view showing an air flowing state during first operation in humidification of the ventilation system according to Modified Example 2.

As shown in FIG. 32A, during the first operation in the humidification operation, outdoor air is heated by the regeneration heat exchanger (102). The heated outdoor air is cleaned by the second filter (302), and then, flows into the second adsorption element (82) so that the high-temperature outdoor air regenerates the second adsorption element (82). Then, moisture desorbed from the second adsorption element (82) is provided to the outdoor air, and then, the humidified outdoor air is supplied indoors. Independently therefrom, the outdoor air is dehumidified when passing through the first adsorption element (81). The outdoor air of which moisture is removed flows out from the first adsorption element (81), and then, passes through the first filter (301). At this time, dust and the like are removed from the first filter (301). Thereafter, the outdoor air is discharged outdoors together with the dust and the like removed from the first filter (301).

Figure 32B:
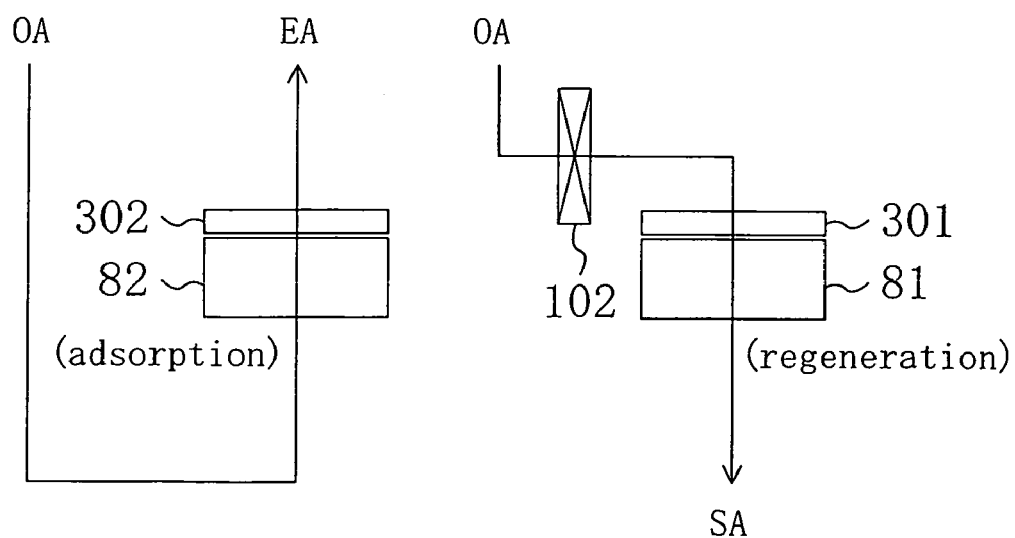
FIG. 32B is a view showing an air flowing state during second operation in humidification of the ventilation system according to Modified Example 2.

As shown in FIG. 32B, during the second operation in the humidification operation, outdoor air is heated by the regeneration heat exchanger (102). The heated outdoor air is cleaned by the first filter (301), and then, flows into the first adsorption element (81) so that the high-temperature outdoor air regenerates the first adsorption element (81). Then, moisture desorbed from the first adsorption element (81) is provided to the outdoor air, and then, the humidified outdoor air is supplied indoors. Independently therefrom, the outdoor air is dehumidified when passing through the second adsorption element (82). This outdoor air of which moisture is removed flows out from the second adsorption element (82), and then, passes through the second filter (302). At this time, dust and the like are removed from the second filter (302). Thereafter, the outdoor air is discharged outdoors together with the dust and the like removed from the second filter (302).

Further, the present invention is applicable to humidity control devices that perform room air discharge to outdoors and humidity control of the room air. The humidity control devices of this kind perform the first operation and the second operation alternately in each of the dehumidification operation and the humidification operation.

Figure 33A:
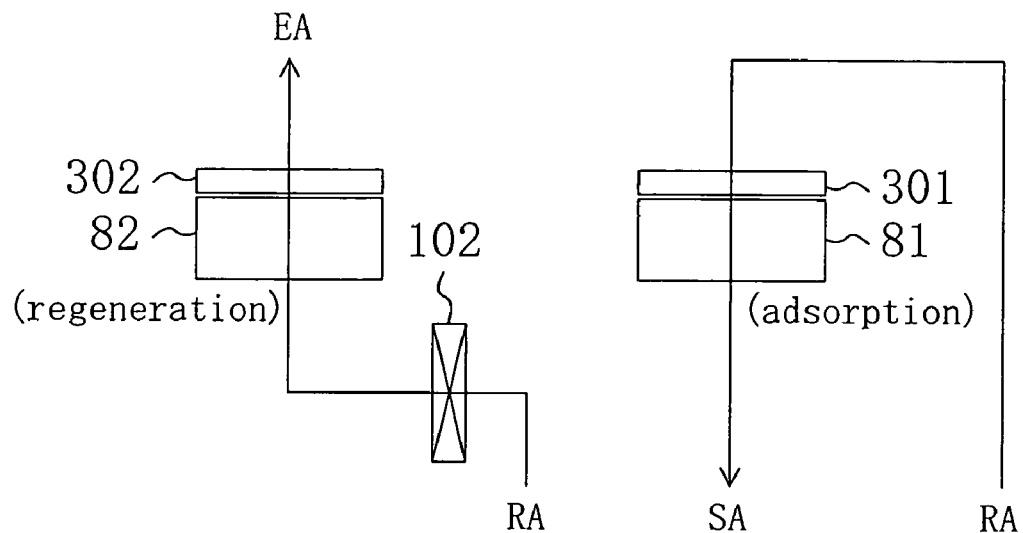
FIG. 33A is a view showing an air flowing state during first operation in dehumidification of a ventilation system according to Modified Example 2.

As shown in FIG. 33A, during the first operation in the dehumidification operation, room air is cleaned by the first filter (301), and then, flows into the first adsorption element (81). The room air is returned into the room after dehumidification by the first adsorption element (81). Independently therefrom, the room air is heated by the regeneration heat exchanger (102), and then, flows into the second adsorption element (82) so that the high-temperature room air regenerates the second adsorption element (82). This outdoor air flows out from the second adsorption element (82), and then, passes through the second filter (302). At this time, dust and the like are removed from the second filter (302). Thereafter, the room air is discharged outdoors together with the dust and the like removed from the second filter (302).

Figure 33B:
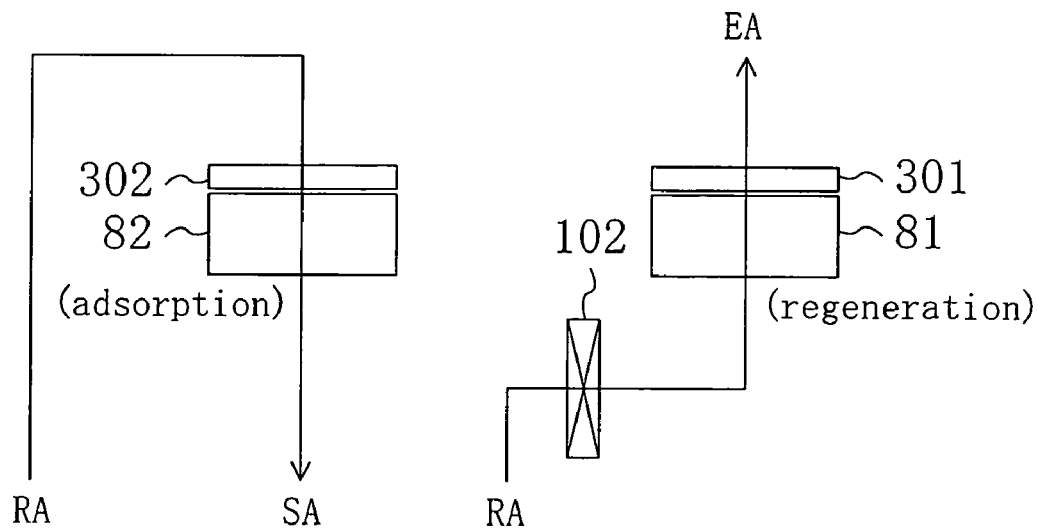
FIG. 33B is a view showing an air flowing state during second operation in dehumidification of the ventilation system according to Modified Example 2.

As shown in FIG. 33B, during the second operation in the dehumidification operation, room air is cleaned by the second filter (302), and then, flows into the second adsorption element (82). The room air is returned into the room after dehumidification by the second adsorption element (82). Independently therefrom, the room air is heated by the regeneration heat exchanger (102), and then, flows into the first adsorption element (81) so that the high-temperature room air regenerates the first adsorption element (81). This room air flows out from the first adsorption element (81), and then, passes through the first filter (301). At this time, dust and the like are removed from the first filter (301). Thereafter, the room air is discharged outdoors together with the dust and the like removed from the first filter (301).

Figure 34A:
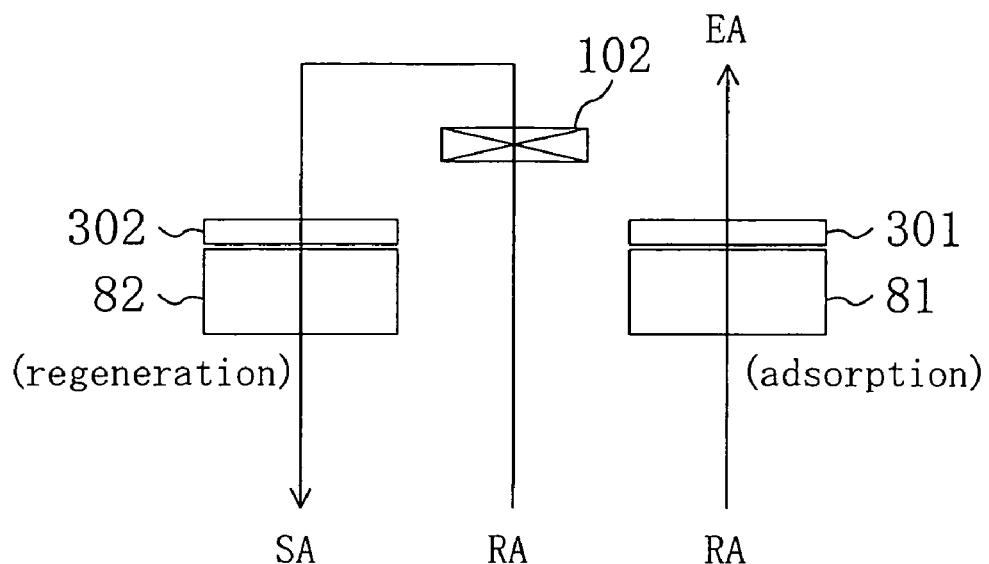
FIG. 34A is a view showing an air flowing state during first operation in humidification of the ventilation system according to Modified Example 2.

As shown in FIG. 34A, during the first operation in the humidification operation, room air is heated by the regeneration heat exchanger (102). The heated room air is cleaned by the second filter (302), and then, flows into the second adsorption element (82) so that the high-temperature room air regenerates the second adsorption element (82). Then, moisture desorbed from the second adsorption element (82) is provided to the room air, and then, the humidified room air is returned into the room. Independently therefrom, the room air is dehumidified when passing through the first adsorption element (81). This room air of which moisture is removed flows out from the first adsorption element (81), and then, passes through the first filter (301). At this time, dust and the like are removed from the first filter (301). Thereafter, the room air is discharged outdoors together with the dust and the like removed from the first filter (301).

Figure 34B:
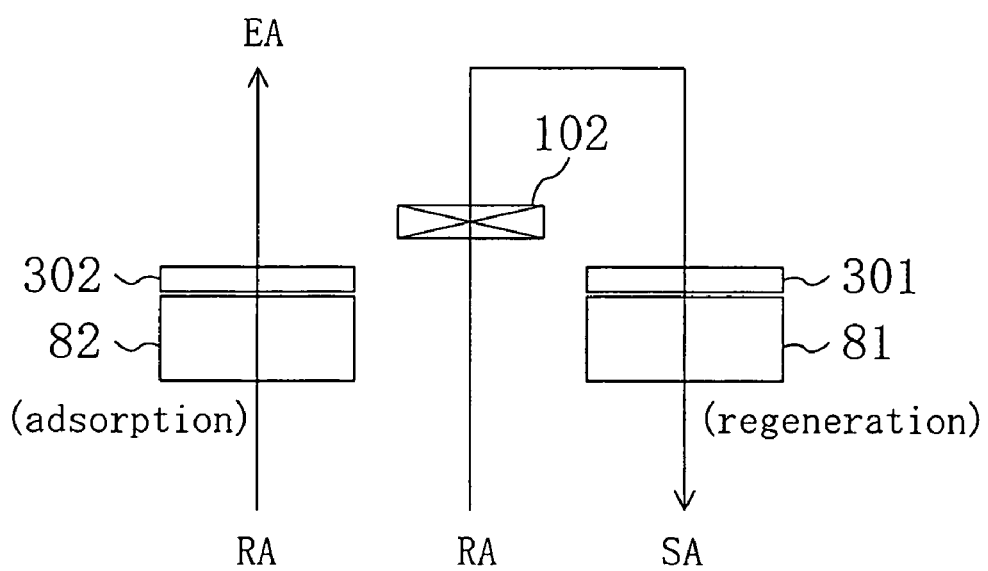
FIG. 34B is a view showing an air flowing state during second operation in humidification of the ventilation system according to Modified Example 2.

As shown in FIG. 34B, during the second operation in the humidification operation, room air is heated by the regeneration heat exchanger (102). The heated room air is cleaned by the first filter (301), and then, flows into the first adsorption element (81) so that the high-temperature room air regenerates the first adsorption element (81). Then, moisture desorbed from the first adsorption element (81) is provided to the room air, and then, the humidified room air is returned into the room. Independently therefrom, the room air is dehumidified when passing through the second adsorption element (82). This room air of which moisture is removed flows out from the second adsorption element (82), and then, passes through the second filter (302). At this time, dust and the like are removed from the second filter (302). Thereafter, the room air is discharged outdoors together with the dust and the like removed from the second filter (302).

Modified Example 3

Each of the above embodiments applies the present invention to a humidity control device that includes the adsorption elements (81, 82) as the air conditioning elements for performing ventilation and humidity control. However, applicable objects of the present invention are not limited to the humidity control devices of this kind. For example, the present invention is applicable to a ventilation system (3) including a total heat exchanger (363) as the air conditioning element. Herein, the ventilation system (3) to which the present invention is applied will be described.

Figure 35A:
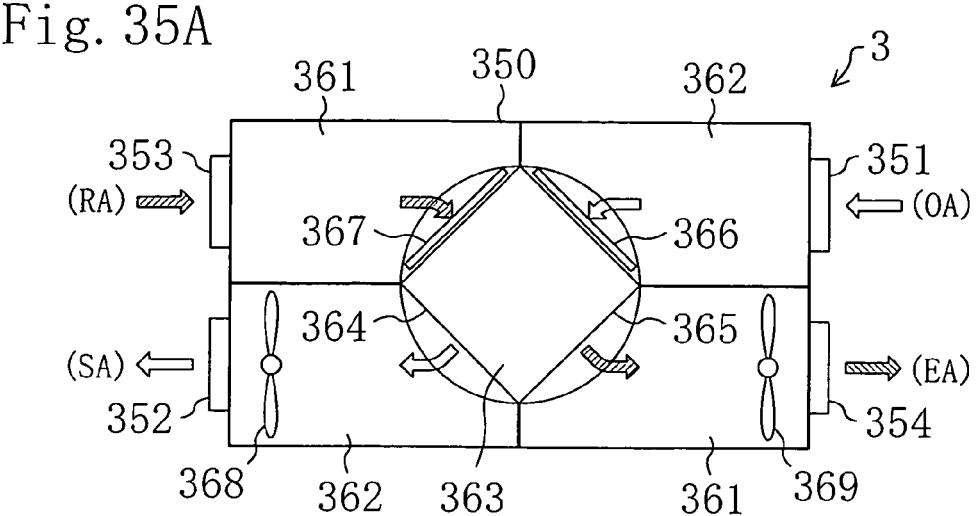
FIG. 35A is a schematic constitutional view showing a constitution and a state during normal operation of a ventilation system according to Modified Example 3.
Figure 35B:
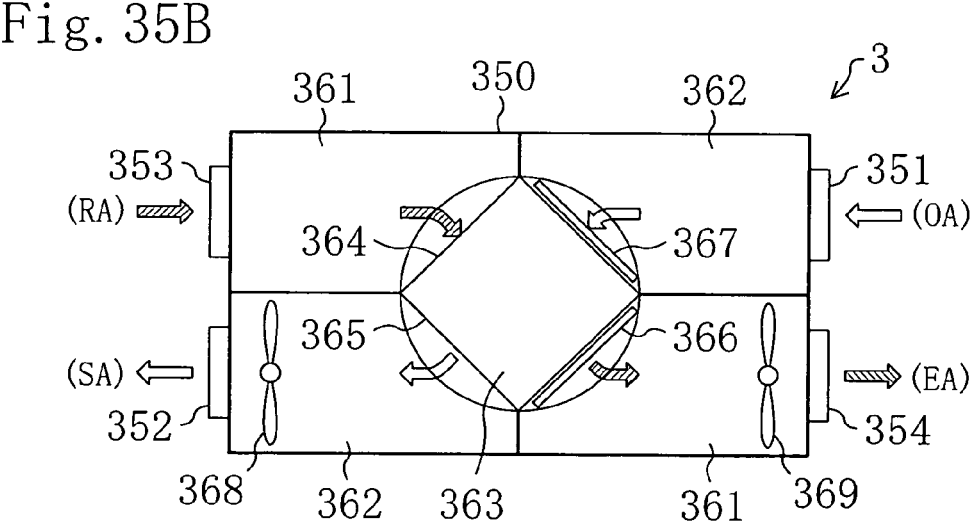
FIG. 35B is a schematic constitutional view showing a constitution and a state during cleaning operation of the ventilation system according to Modified Example 3.
Figure 35C:
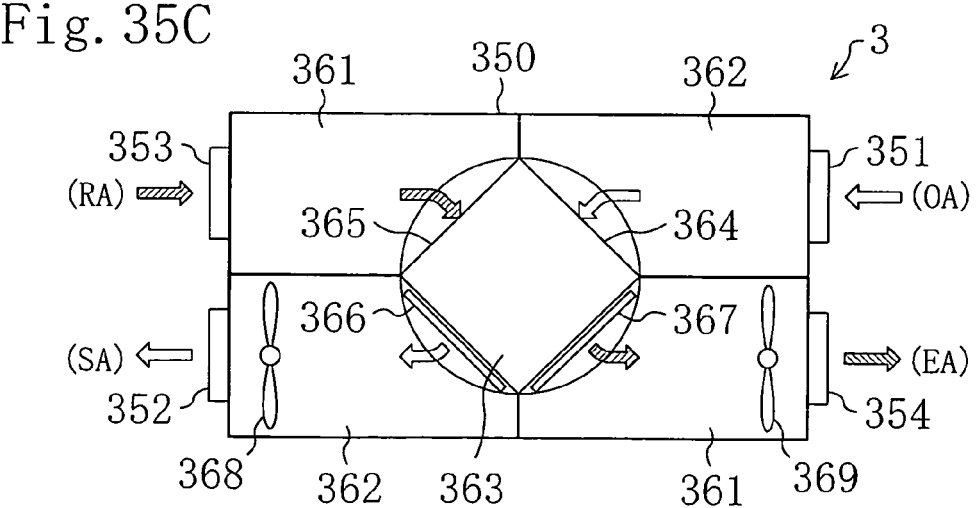
FIG. 35C is a schematic constitutional view showing a constitution and a state during cleaning operation of the ventilation system according to Modified Example 3.

As shown in FIG. 35A through FIG. 35C, the total heat exchanger (363) is accommodated inside a hollow casing (350) in a flat, rectangular solid shape in the ventilation system (3).

In the casing (350), an outdoor air intake port (351) and an air exhaust port (354) are formed in a right end face in FIG. 35A. The inside of the casing (350) communicates with an outdoor space as the first space through the outdoor air intake port (351) and the air exhaust port (354). On the other hand, an air supply port (352) and an room air intake port (353) are formed in a left end face of the casing (350) in FIG. 35A. The inside of the casing (350) communicates with an indoor space as the second space through the air supply port (352) and the room air intake port (353).

Figure 36:
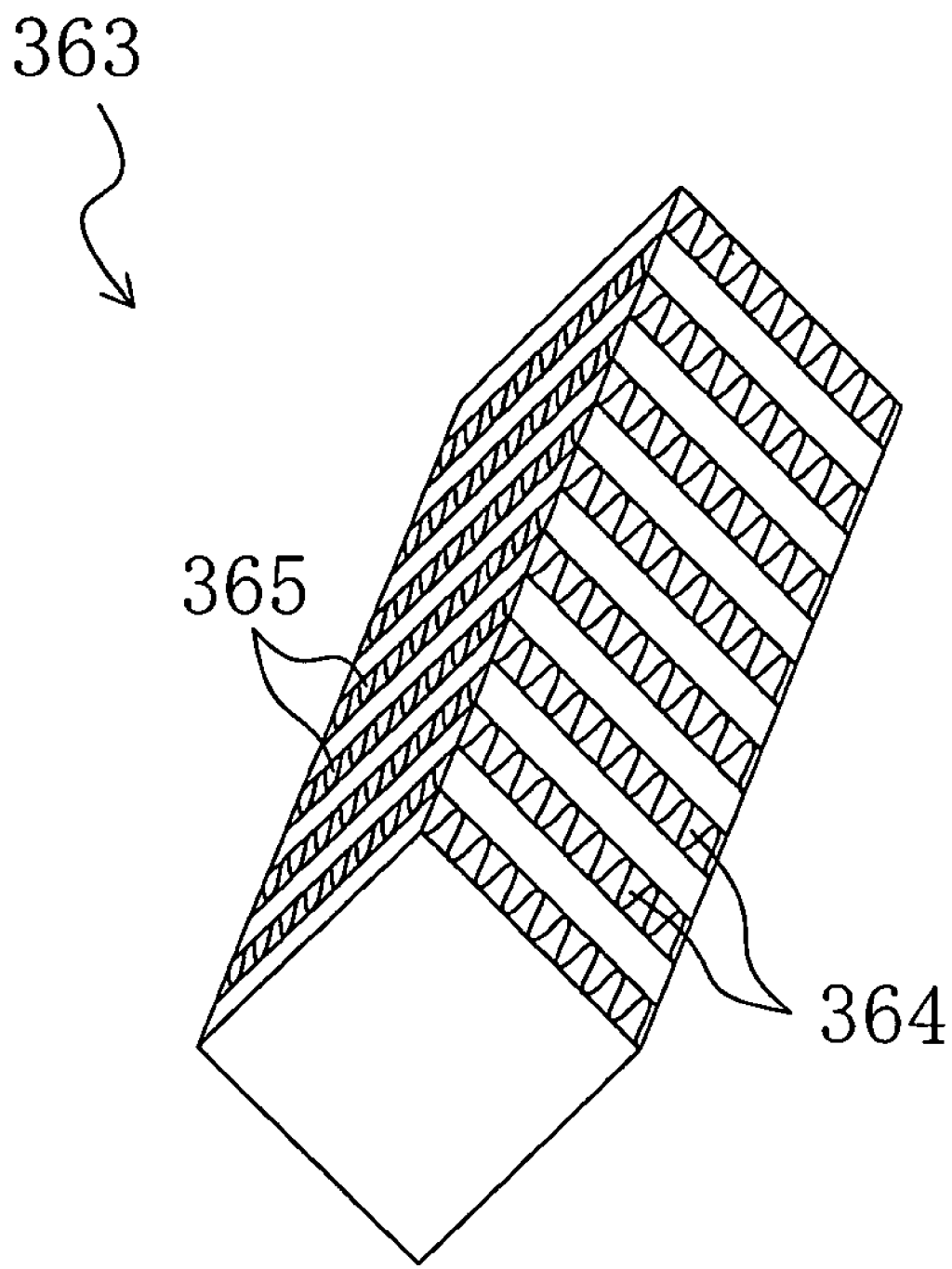
FIG. 36 is a schematic perspective view of a total heat exchanger.

The total heat exchanger (363) is formed in a square pole shaped having square end faces, as shown in FIG. 36. In the total heat exchanger (363), a plurality of first passages (364) and a plurality of second passages (365) are formed alternately in the longitudinal direction. The first passages (364) open at each of a pair of opposing faces, and the second passages (365) open at each of another pair of opposing faces. Each partition between the first passages (364) and the second passages (365) is made of a material having moisture permeability, such as paper.

In the casing (350), the total heat exchanger (363) is arranged in the middle in the transverse direction in FIG. 35A so that the longitudinal direction thereof goes along the depth direction of the casing (350) (i.e., a direction perpendicular to the paper of FIG. 35A). Further, the total heat exchanger (363) is rotatable around the axial center thereof.

A first filter (366) and a second filter (367) are mounted to the total heat exchanger (363). The first filter (366) is arranged so as to cover one of the side faces at which the first passages (364) open in the total heat exchanger (363). On the other hand, the second filter (367) is arranged so as to cover one of the side faces at which the second passages (365) open in the total heat exchanger (363).

The right and left spaces on the respective sides of the total heat exchanger (363) in the casing (350) are partitioned transversely. In the right space on the right side of the total heat exchanger (363), the upper space continues to the outdoor air intake port (351) and the lower space continues to the air exhaust port (354). Also, an air exhaust fan (369) as air conveying means is provided in this lower space. On the other hand, in the left space on the left side of the total heat exchanger (363), the upper space continues to the room air intake port (353), and the lower space continues to the air supply port (352). Also, an air supply fan (368) as air conveying means is provided in the lower space. In the casing (350), the upper left and lower right spaces on the respective sides of the total heat exchanger (363) compose an air exhaust path (361) as the first air path, and the upper right and lower left spaces on the respective sides of the total heat exchanger (363) compose an air supply path (362) as the second air path.

As shown in FIG. 35A, during normal operation, the posture of the total heat exchanger (363) is set so that the first filter (366) is located on the outdoor air intake port (351) side and the second filter (367) is located on the room air intake port (353) side.

When the air supply fan (368) is driven, outdoor air taken into the casing (350) from the outdoor air intake port (351) flows into the air supply path (362). The outdoor air is cleaned by the first filter (366), and then, flows into the first passages (364) of the total heat exchanger (363). On the other hand, when the air exhaust fan (369) is driven, room air taken into the casing (350) from the room air intake port (353) flows into the air exhaust path (361). The room air is cleaned by the second filter (367), and then, flows into the second passages (365) of the total heat exchanger (363)

The total heat exchanger (363) performs exchange of heat and moisture between the introduced outdoor air and room air. For example, for indoor heating in winter season, heat and moisture move from the room air to the outdoor air. Then, the room air of which heat and moisture are removed is discharged outdoors from the air exhaust port (354), while the outdoor air to which heat and moisture are provided is supplied indoors from the air supply port (352). In reverse, for indoor cooling in summer season, heat and moisture move from the outdoor air to the room air. Then, the outdoor air from which heat and moisture are removed is supplied indoors from the air supply port (352), while the room air to which heat and moisture are provided is discharged outdoors from the air discharge port (354).

In cleaning operation, the posture of the total heat exchanger (363) is set as shown in FIG. 35B first. Specifically, the total heat exchanger (363) is rotated clockwise by 90 degrees from the state shown in FIG. 35A so that the first filter (366) is located on the air exhaust port (354) side and the second filter (367) is located on the outdoor air intake port (351) side.

Under this state, room air flowing in the air exhaust path (361) passes through the total heat exchanger (363), and then, the first filter (366). Dust and the like captured at the first filter (366) are removed from the first filter (366) by the flow of the room air, to be discharged outdoors from the air exhaust port (354) together with the room air. During this operation, the second filter (367) captures dust and the like in the outdoor air.

Subsequently, the posture of the total heat exchanger (363) is set as shown in FIG. 36C. Specifically, the total heat exchanger (363) is rotated clockwise by 90 degrees from the state shown in FIG. 35B so that the first filter (366) is located on the air supply port (352) side and the second filter (367) is located on the air exhaust port (354) side.

Under this state, room air flowing in the air exhaust path (361) passes through the total heat exchanger (363), and then, the second filter (367). Dust and the like captured at the second filter (367) are removed from the second filter (367) by the flow of the room air, to be discharged outdoors from the air exhaust port (354) together with the room air.

In this way, in the cleaning operation, the posture of the total heat exchanger (363) is changed to the state shown in FIG. 35B and the state shown in FIG. 35C to perform cleaning of the first filter (366) and the second filter (367). Thereafter, the posture of the total heat exchanger (363) is returned to the state shown in FIG. 35A.

Figure 37A:
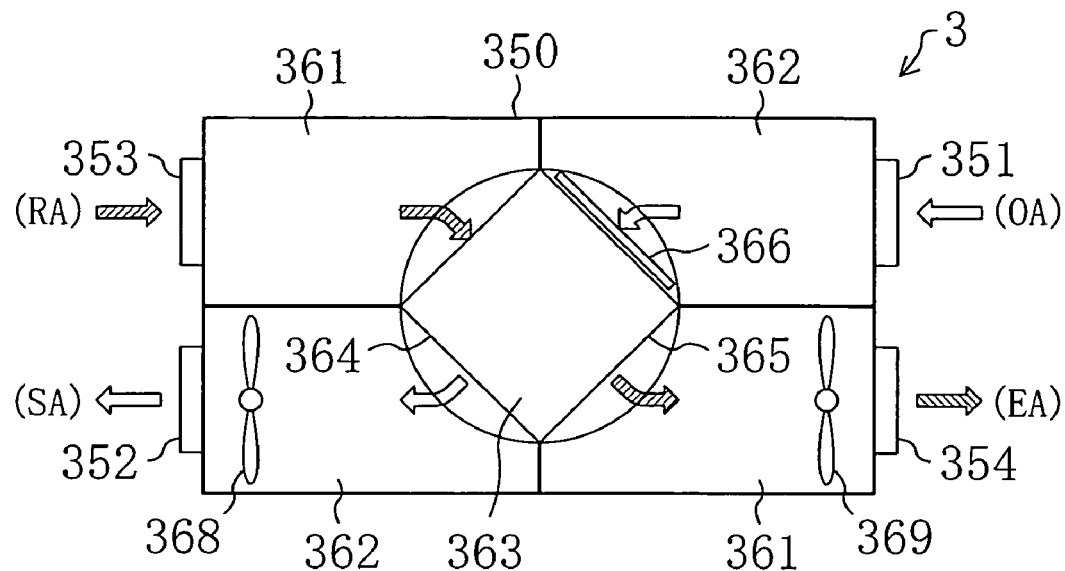
FIG. 37A is a schematic constitutional view showing a constitution and a state during normal operation of a ventilation system according to Modified Example 3.
Figure 37B:
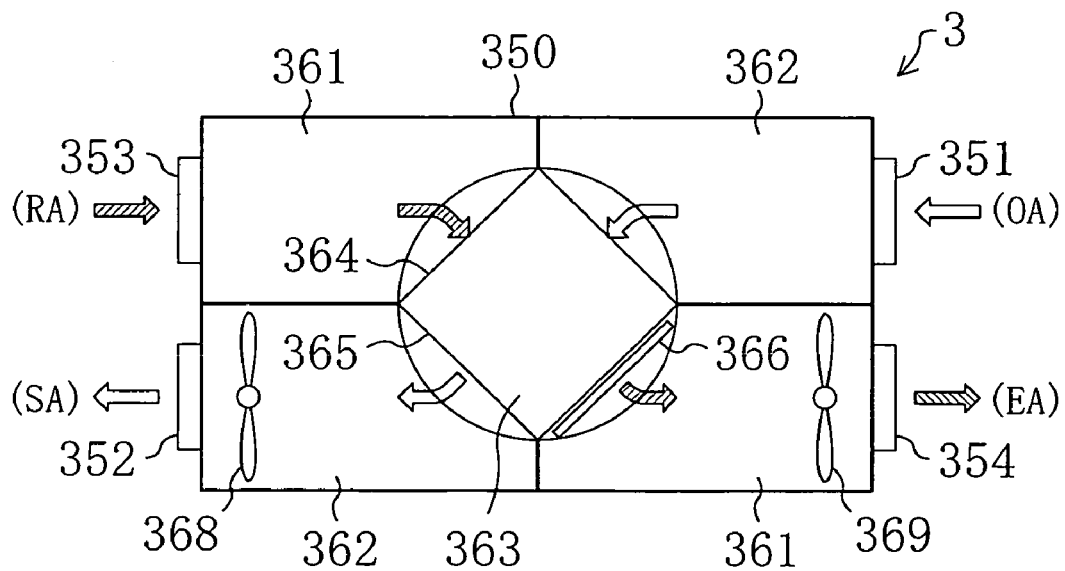
FIG. 37B is a schematic constitutional view showing a constitution and a state during cleaning operation of the ventilation system according to Modified Example 3.

It should be noted that the two filters (366, 367) are mounted to the total heat exchanger (363) in the present modified example, but only one filter (366) may be mounted to the heat exchanger (363) as shown in FIG. 37A and FIG. 37B.

In this case, the posture of the total heat exchanger (363) is set so that the filter (366) is located on the outdoor air intake port (351) side (see FIG. 37A.) during the normal operation. On the other hand, the posture of the total heat exchanger (363) is changed so that the filter (366) is located on the air exhaust port (354) side (see FIG. 37B.) in the cleaning operation. In short, the total heat exchanger (363) is rotated clockwise by 90 degrees from the state shown in FIG. 37A.

Under this state, room air flowing in the air exhaust path (361) passes through the total heat exchanger (363), and then, the filter (366). Dust and the like captured at the filter (366) is removed from the filter (366) by the flow of the room air, to be discharged outdoors from the air exhaust port (354) together with the room air. It is noted that the air supply fan (368) is preferably halted during the cleaning operation for preventing outdoor air from flowing into the total heat exchanger (363) without being subjected to cleaning.

It should be noted that the normal operation and the cleaning operation are exchanged alternately by rotating the total heat exchanger (363) in the above ventilation system (3), but the normal operation and the cleaning operation may be exchanged by changing air flowing routes with the use of a damper or the like. In other words, it is possible that the total heat exchanger (363) is fixed while changing the air flowing routes so as to allow air to flow from the filter (366, 367) to the total heat exchanger (363) during the normal operation and so as to allow air to flow from the total heat exchanger (363) to the filter (366, 367).

Modified Example 4

Each of the above embodiments applies the present invention to a humidity control device that includes the adsorption elements (81, 82) as the air conditioning elements for perforimng ventilation and humidity control. However, applicable objects of the present invention are not limited to the humidity control devices of this kind. For example, the present invention is applicable to a heat exchange system (4) including a sensible heat exchanger (383) as the air conditioning element. The heat exchange system (4) is utilized for cooling, by outdoor air, inside a room that accommodates, for example, a large-scaled electronic instrument having a comparatively large heat generation rate.

Figure 38A:
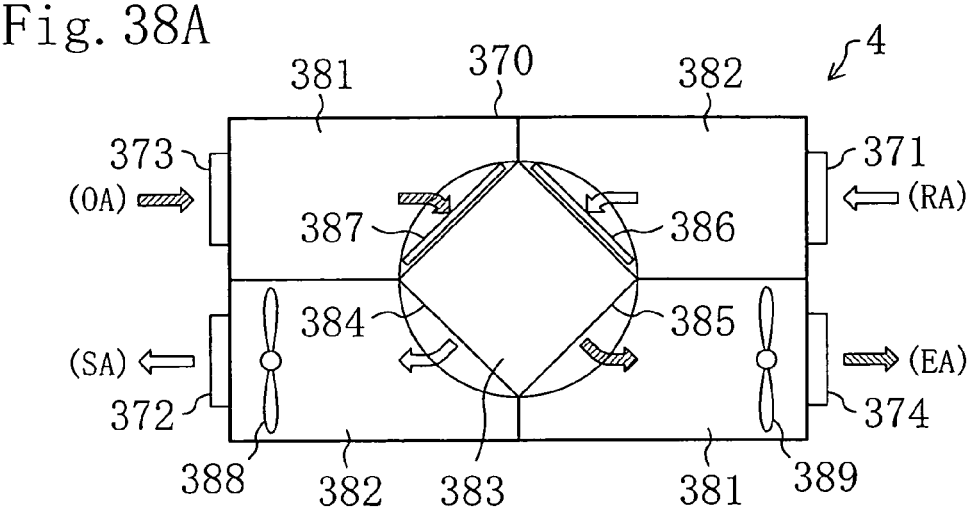
FIG. 38A is a schematic constitutional view showing a constitution and a state during normal operation of a heat exchanger according to Modified Example 3.
Figure 38B:
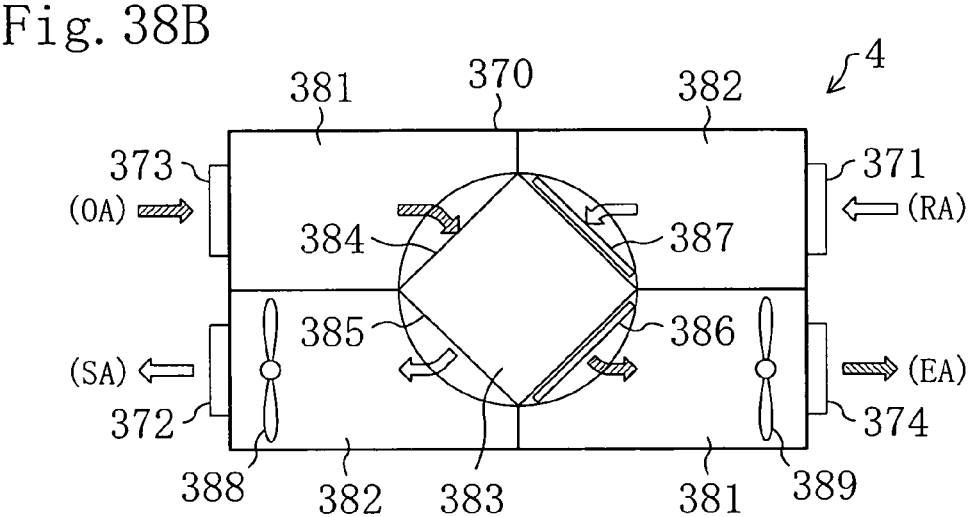
FIG. 38B is a schematic constitutional view showing a constitution and a state during cleaning operation of the heat exchanger according to Modified Example 3.
Figure 38C:
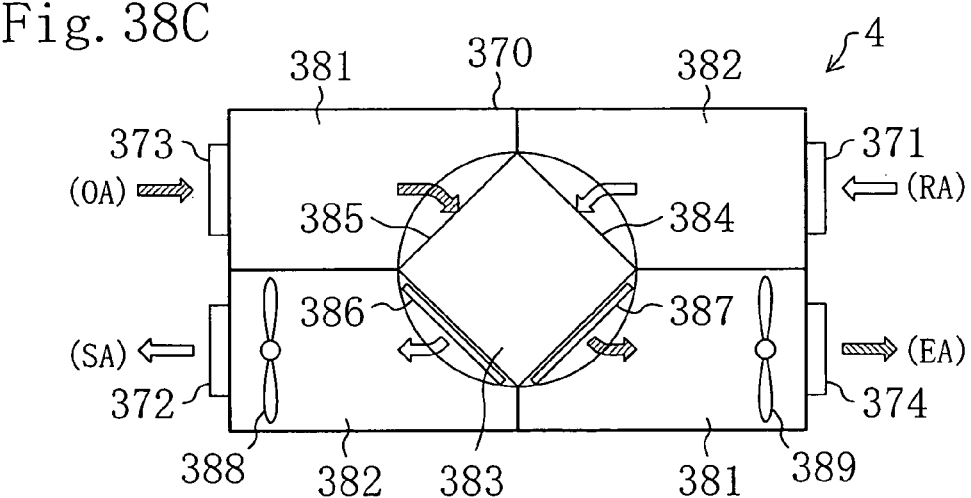
FIG. 38C is a schematic constitutional view showing a constitution and a state during cleaning operation of the heat exchanger according to Modified Example 3.
Figure 39:
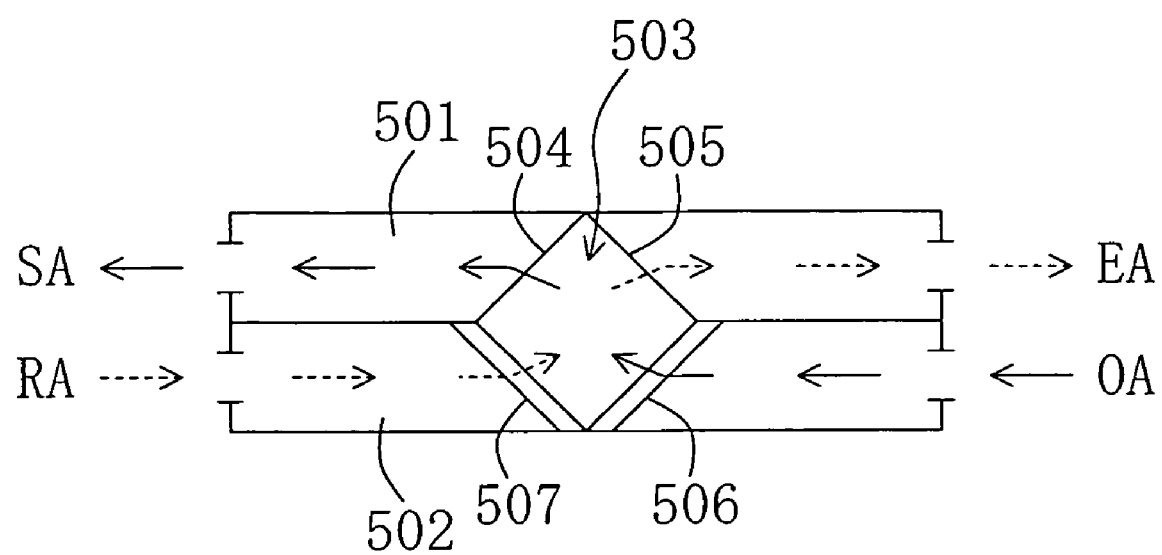
FIG. 39 is a schematic constitutional view of a conventional ventilation system.

As shown in FIG. 38A, through 38C, the heat exchange system (4) to which the present invention is applied has substantially the same construction as that of the ventilation system (3) in the Modified Example 3. The different features of the heat exchange system (4) in the present modified example from the ventilation system (3) of Modified Example 3 will be described here mainly.

Similar to that in Modified Example 3, a casing (370) of the heat exchange system (4) is formed in a rectangular solid shape. In the casing (370), a room air inlet (371) and an air exhaust port (374) are formed in the end face on the right side of FIG. 38A, and an outdoor air inlet (373) and an air supply port (372) are formed in the left end face on the left side of FIG. 38A.

In the casing, (370), the sensible heat exchanger (383) is provided. The sensible heat exchanger (383) has the same construction as that of the total heat exchanger (363) in Modified Example 3. Specifically, the sensible heat exchanger (383) is formed in a square pole shape as a whole, and includes a plurality of first passages (384) and a plurality of second passages (385). Wherein, in the sensible heat exchanger (383), each partition between the first passages (384) and the second passages (383) is made of a material having no moisture permeability, such as a resin plate. The sensible heat exchanger (383) performs heat exchange between air flowing in the first passages (384) and air flowing in the second passages (385).

The sensible heat exchanger (383) is provided in the casing with the posture thereof set likewise the total heat exchanger (363) of Modified Example 3. Further, the sensible heat exchanger (383) is rotatable around the axial center, similar to the total heat exchanger (363) of Modified Example 3. In the sensible heat exchanger (383), also, a first filter (386) is mounted so as to cover one of the side faces at which the first passages (384) open, and a second filter (387) is mounted so as to cover one of the side faces at which the second passages (385) open.

The inside of the casing (370) is divided into four spaces, likewise the ventilation system (3) of Modified Example 3. The upper right space continuing to a room air inlet (371) and the lower left space continuing to an air supply port (372) compose a room air path (382) as the air path, and the upper left space continuing to an outdoor air inlet (373) and the lower right space continuing to an air exhaust air port (374) compose an outdoor air path (381) as the air path. Further, in the casing (370), a room air fan (388) is provided in the lower left space, and an outdoor air fan (389) is provided in the lower right space (389). The room air fan (383) and the outdoor air fan (389) compose air conveying means.

As shown in FIG. 38A, during normal operation, the posture of the sensible heat exchanger (383) is set so that the first filter (386) is located on the room air inlet (371) side and the second filter (387) is located on the outdoor air inlet (373) side. Under this state, room air cleaned by the first filter (386) and outdoor air cleaned by the second filter (387) are introduced into the sensible heat exchanger (383). Then, the room air that has passed through the sensible heat exchanger (383) is sent into a room, while the outdoor air that has passed through the sensible heat exchanger (383) is discharged outdoors.

In cleaning operation, the posture of the sensible heat exchanger (383) is first set as shown in FIG. 38B. Specifically, the sensible heat exchanger (383) is rotated clockwise by 90 degrees from the state shown in FIG. 38A so that the first filter (386) is located on the air exhaust port (374) side, while the second filter (387) is located on the room air inlet (371) side. Under this state, outdoor air passes through the sensible heat exchanger (383), and then, the first filter (386). Dust and the like captured at the first filter (386) are removed from the first filter (386) by the flow of the outdoor air, to be discharged from the exhaust air port (374) outdoors together with the outdoor air.

Subsequently, the posture of the sensible heat exchanger (383) is set as shown in FIG. 38C. Specifically, the sensible heat exchanger (383) is rotated clockwise by 90 degrees from the state shown in FIG. 38B so that the first filter (386) is located on the air supply port (372) side while the second filter (387) is located on the air exhaust port (374) side. Under this state, outdoor air passes through sensible heat exchanger (383), and then, the second filter (387). Dust and the like captured at the second filter (387) are removed from the second filter (387) by the flow of the outdoor air, to be discharged from the air exhaust port (374) outdoors together with the outdoor air.

INDUSTRIAL APPLICABILITY

As described above, the present invention is useful for ventilation systems for subjecting outdoor air to treatment and supplying indoors.

What is claimed is:

1. An air conditioner, comprising:
   air paths (53, 54, ...) that communicate with either or both of a first space (311) and a second space (312);
   an air conditioning element (81, 82, ...) for adjusting at least one of temperature and humidity of air flowing in the air paths (53, 54, ...) toward the second space (312);
   a filter (301, 302, ...) for capturing a foreign matter in air flowing in the air paths (53, 54, ...) from the first space (311) toward the air conditioning element (81, 82, ...); and
   air conveying means (95, 96) that conveys the air in the air paths (53, 54, ...),
   wherein the air of which at least one of temperature and humidity is adjusted is supplied to the second space (312), and
   normal operation in which air passes in the air paths (53, 54, ...) through the filter (301, 302, ...), and then, through the air conditioning element (81, 82, ...), to be supplied to the second space (312); and cleaning operation in which air passes in the air paths (53, 54, ...) through the air conditioning element (81, 82, ...), and then, through the filter (301, 302, ...), to be discharged to the first space (311) are performable.

2. The air conditioner of claim 1, wherein an adsorption element (81, 82) having an adsorbent is provided as the air conditioning element,
   the air paths (53 to 56) communicate with both the first space (311) and the second space (312),
   the air conveying means (95, 96) conveys air from the first space (311) to the second space (312) and conveys air from the second space (312) to the first space (311), and
   adsorption operation as the normal operation, in which the air from the first space (311) flows through the filter (301, 302) and the adsorption element (81, 82) in this order to allow the adsorption element (81, 82) to adsorb moisture in the air, and then, is supplied to the second space (312); and regeneration operation as the cleaning operation in which the air from the second space (312) flows through the adsorption element (81, 82) and the filter (301, 302) in this order to regenerate the adsorption element (81, 82) by the air, and then, is discharged to the first space (311) are performed selectively.

3. The air conditioner of claim 1, wherein an adsorption element (81, 82) having an adsorbent is provided as the air conditioning element,
   the air paths (53 to 56) communicate with both the first space (311) and the second space (312),
   the air conveying means (95, 96) conveys air from the first space (311) to the second space (312) and conveys air from the second space (312) to the first space (311),
   a first space side filter (301a, 302a) as the filter is provided on the first space (311) side of the adsorption element (81, 82) in the air paths (53 to 56),
   a second space side filter (301b, 302b) is provided on the second space (312) side of the adsorption element (81, 82) in the air paths (53 to 56), and
   adsorption operation as the normal operation in which the air from the first space (311) flows through the first space side filter (301a, 302a), the adsorption element (81, 82), and the second space side filter (301b, 302b) in this order to allow the adsorption element (81, 82) to adsorb moisture in the air, and then, is supplied to the second space (312); and regeneration operation as the cleaning operation in which the air from the second space (312) flows through the second space side filter (301b, 302b), the adsorption element (81, 82), and the first space side filter (301a, 302a) in this order to regenerate the adsorption element (81, 82) by the air, and then, is discharged to the first space (311) are performed selectively.

4. The air conditioner of claim 2 or 3, wherein the first space serves as an outdoor space (311), while the second space serves as an indoor space (312), and
   the adsorption operation dehumidifies the indoor space (312).

5. The air conditioner of claim 1, wherein an adsorption element (81, 82) having an adsorbent is provided as the air conditioning element,
   the air paths (53 to 56) communicate with both the first space (311) and the second space (312),
   the air conveying means (95, 96) conveys air from the first space (311) to the second space (312) and conveys air from the second space (312) to the first space (311), and
   regeneration operation as the normal operation in which the air from the first space (311) flows through the filter (301, 302) and the adsorption element (81, 82) in this order to regenerate the adsorption element (81, 82) by the air, and then, is supplied to the second space (312); and adsorption operation as the cleaning operation in which the air from the second space (312) flows through the adsorption element (81, 82) and the filter (301, 302) in this order to allow the adsorption element (81, 82) to adsorb moisture in the air, and then is discharged to the first space (311) are performed selectively.

6. The air conditioner of claim 1, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), a first space side filter (301a, 302a) as the filter is provided on the first space (311) side of the adsorption element (81, 82) in the air paths (53 to 56), a second space side filter (301b, 302b) is provided on the second space (312) side of the adsorption element (81, 82) in the air paths (56 to 56), and regeneration operation as the normal operation in which the air from the first space (311) flows through the first space side filter (301b, 302b), the adsorption element (81, 82), and the second space side filter (301a, 302a) in this order to regenerate the adsorption element (81, 82) by the air, and then, is supplied to the second space (312); and adsorption operation as the cleaning operation in which the air from the second space (312) flows through the second space side filter (301a, 302a), the adsorption element (81, 82), and the first space side filter (301b, 302b) in this order to allow the adsorption element (81, 82) to adsorb moisture in the air, and then, is discharged to the first space (311) are performed selectively.

7. The air conditioner of claim 5 or 6, wherein the first space serves as an outdoor space (311), while the second space serves as an indoor space (312), and the regeneration operation humidifies the indoor space (312).

8. The air conditioner of claim 1, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), and first adsorption operation as the normal operation in which the air from the first space (311) flows through the filter (301, 302) and the adsorption element (81, 82) in this order to allow the adsorption element (81, 82) to adsorb moisture in the air, and then, is supplied to the second space (312);

first regeneration operation as the cleaning operation in which the air from the second space (312) flows through the adsorption element (81, 82) and the filter (301, 302) in this order to regenerate the adsorption element (81, 82) by the air, and then is discharged to the first space (311);

second adsorption operation as the cleaning operation in which the air from the second space (312) flows through the adsorption element (81, 82) and the filter (301, 302) in this order to allow the adsorption element (81, 82) to adsorb moisture in the air, and then is discharged to the first space (311); and second regeneration operation as the normal operation in which the air from the first space (311) flows through the filter (301, 302) and the adsorption element (81, 82) in this order to regenerate the adsorption element (81, 82) by the air, and then, is supplied to the second space (312) are performed selectively.

9. The air conditioner of claim 1, wherein an adsorption element (81, 82) having an adsorbent is provided as the air conditioning element, the air paths (53 to 56) communicate with both the first space (311) and the second space (312), the air conveying means (95, 96) conveys air from the first space (311) to the second space (312) and conveys air from the second space (312) to the first space (311), a first space side filter (301a, 302a) as the filter is provided on the first space (311) side of the adsorption element (81, 82) in the air paths (53 to 56), a second space side filter (301b, 302b) is provided on the second space (312) side of the adsorption element (81, 82) in the air paths (53 to 56), and first adsorption operation as the normal operation in which the air from the first space (311) flows through the first space side filter (301a, 302a), the adsorption element (81, 82), and the second space side filter (301b, 302b) in this order to allow the adsorption element (81, 82) to adsorb moisture in the air, and then, is supplied to the second space (312);

first regeneration operation as the cleaning operation, in which the air from the second space (312) flows through the second space side filter (301b, 302b), the adsorption element (81, 82), and the first space side filter (301a, 302a) in this order to regenerate the adsorption element (81, 82) by the air, and then is supplied to the first space (311);

second adsorption operation as the cleaning operation in which the air from the second space (312) flows through the second space side filter (301b, 302b), the adsorption element (81, 82), and the first space side filter (301a, 302a) in this order to allow the adsorption element (81, 82) to adsorb moisture in the air, and then is supplied to the first space (311); and second regeneration operation as the normal operation in which the air from the first space (311) flows through the first space side filter (301a, 302a), the adsorption element (81, 82), and the second space side filter (301b, 302b) in this order to regenerate the adsorption element (81, 82) by the air, and then, is supplied to the second space (312) are performed selectively.

10. The air conditioner of claim 8 or 9, wherein the first space serves as an outdoor space (311), while the second space serves as an indoor space (312), and the first adsorption operation dehumidifies the indoor space (312), while the second regeneration operation humidifies the indoor space (312).

11. The air conditioner of claims 2, 3, 5, 6, 8, or 9, wherein the first adsorption element (81) and the first filter (301) are provided in the first air path (53, 54), while the second adsorption element (82) and the second filter (302) are provided in the second air path (55, 56), and first operation in which the adsorption operation for the first adsorption element (81) and the regeneration operation for the second adsorption element (82) are performed simultaneously; and second operation in which the regeneration operation for the first adsorption element (81) and the adsorption operation for the second adsorption element (82) are performed simultaneously are performed alternately.

12. The air conditioner of claim 1, wherein air flows from the first space (311) to the second space (312) in the first air path (251), while air flows from the second space (312) to the first space (311) in the second air path (252), a rotating rotary adsorption element (253) that has an adsorbent and is arranged so as to cross the first air path (251) and the second air path (252) is provided as the air conditioning element, a rotary filter (254) for rotating integrally with the rotary adsorption element (253) which is arranged on the first space (311) side of the rotary adsorption element (253) so as to cross the first air path (251) and the second air path (252) is provided as the filter, and operation in which air flows through the rotary filter (254) and the rotary adsorption element (253) in this order in the first air path (251) to allow the rotary adsorption element (253) to adsorb moisture in the air, and then, is supplied to the second space (312) is performed as the normal operation, and simultaneously therewith, operation, in which air flows through the rotary adsorption element (253) and the rotary filter (254) in this order in the second air path (252) to regenerate the rotary adsorption element (253) by the air, and then, is discharged to the first space (311), is performed as the cleaning operation.

13. The air conditioner of claim 1, wherein air flows from the second space (312) to the first space (311) in the first air path (251), while air flows from the first space (311) to the second space (312) in the second air path (252), a rotating rotary adsorption element (253) that has an adsorbent and is arranged so as to cross the first air path (251) and the second air path (252) is provided as the air conditioning element, a rotary filter (254) for rotating integrally with the rotary adsorption element (253) which is arranged on the first space (311) side of the rotary adsorption element (253) so as to cross the first air path (251) and the second air path (252) is provided as the filter, and operation in which air flows through the rotary adsorption element (253) and the rotary filter (254) in this order in the first air path (251) to allow the rotary adsorption element (253) to adsorb moisture in the air, and then, is discharged to the first space (311), is performed as the normal operation, and simultaneously therewith, operation in which air flows through the rotary filter (254) and the rotary adsorption element (253) in this order to in the second air path (252) regenerate the rotary adsorption element (253) by the air, and then, is supplied to the second space (312) is performed as the cleaning operation.

14. The air conditioner of claim 12 or 13, wherein the first space serves as an outdoor space (311), while the second space serves as an indoor space (312).

15. The air conditioner of claim 1, wherein air flows from the second space (312) to the first space (311) in the first air path (361), while air flows from the first space (311) to the second space (312) in the second air path, and a total heat exchanger (363) for exchanging heat and moisture between the air flowing in the first air path (251) and the air flowing in the second air path (252) is provided as the air conditioning element.

* * * * *